US 012259097B2

(12) United States Patent
Bertken et al.

(10) Patent No.: US 12,259,097 B2
(45) Date of Patent: Mar. 25, 2025

(54) ADAPTIVE FLASHLIGHT CONTROL MODULE

(71) Applicant: IDEAPOND LLC, San Diego, CA (US)

(72) Inventors: Dennis Bertken, San Diego, CA (US); Austin M. Fox, Bend, OR (US); Orlando A. Crespo, San Diego, CA (US); William D. Parsons, Monument, CO (US)

(73) Assignee: Infinity X1 LLC, San Diego, CA (US)

( * ) Notice: Subject to any disclaimer, the term of this patent is extended or adjusted under 35 U.S.C. 154(b) by 808 days.

(21) Appl. No.: 17/227,774

(22) Filed: Apr. 12, 2021

(65) Prior Publication Data
US 2021/0254800 A1 Aug. 19, 2021

Related U.S. Application Data

(63) Continuation of application No. 16/792,832, filed on Feb. 17, 2020, now Pat. No. 11,006,503, which is a
(Continued)

(51) Int. Cl.
F21L 4/02 (2006.01)
F21V 14/06 (2006.01)
(Continued)

(52) U.S. Cl.
CPC ............ *F21L 4/027* (2013.01); *F21V 14/065* (2013.01); *F21V 23/0414* (2013.01);
(Continued)

(58) Field of Classification Search
None
See application file for complete search history.

(56) References Cited

U.S. PATENT DOCUMENTS 6,801,836 B2 10/2004 Schanin
7,220,016 B2 5/2007 Matthews et al.
(Continued)

FOREIGN PATENT DOCUMENTS

BE 1017666 3/2009
CN 102927540 B 9/2014
(Continued)

OTHER PUBLICATIONS

MAG Instrument, Inc.—Maglite, Maglite XL100 LED Flashlight, Black, Amazon Marketplace (Link: https://www.amazon.com/Maglite-XL100-LED-Flashlight-Black/dp/B001RQH1EO/ref=cm_cr_arp_d_product_top?ie=UTF8), Sep. 14, 2004 (Date first available).
(Continued)

*Primary Examiner* — Crystal L Hammond
(74) *Attorney, Agent, or Firm* — Wang Hardoon, P.C.

(57) ABSTRACT

A portable lighting device control module configured to adjust lighting operations of a portable lighting device. In some examples, the control module may interpret real-time user gestures and external conditions of the portable lighting device to modifying lighting operations. The control module installed within a portable lighting device may be configured to permit automatic dimming of LEDs, enable a low power standby mode in absence of motion being detected, automatic mode adjustments in response to low battery determination, adjustment to lantern mode when a bump gesture is detected, continuous alternation between modes within lantern mode by detecting subsequent bump gestures, exiting lantern mode by detecting orientation, locking the lighting operation to a specific mode by determining orienting as either upwards or downwards, switching between modes by performing twist and return gestures, switching between modes by performing whip gestures, instantaneously dim-
(Continued)

Auto Dimming ming the light intensity by twisting the portable lighting device.

20 Claims, 30 Drawing Sheets

Related U.S. Application Data continuation of application No. 16/097,948, filed as application No. PCT/US2017/031152 on May 4, 2017, now Pat. No. 10,616,976.

(60) Provisional application No. 62/444,777, filed on Jan. 10, 2017, provisional application No. 62/331,947, filed on May 4, 2016.

(51) Int. Cl.

| | |
|---|---|
| *F21V 23/04* | (2006.01) |
| *F21Y 115/10* | (2016.01) |
| *H04Q 9/00* | (2006.01) |
| *H05B 45/20* | (2020.01) |
| *H05B 45/37* | (2020.01) |
| *H05B 45/3725* | (2020.01) |
| *H05B 47/105* | (2020.01) |
| *H05B 47/11* | (2020.01) |
| *H05B 47/115* | (2020.01) |

(52) U.S. Cl.
CPC .......... *F21V 23/0464* (2013.01); *H04Q 9/00* (2013.01); *H05B 45/20* (2020.01); *H05B 45/37* (2020.01); *H05B 45/3725* (2020.01); *H05B 47/105* (2020.01); *H05B 47/11* (2020.01); *H05B 47/115* (2020.01); *F21Y 2115/10* (2016.08); *G08C 2201/32* (2013.01); *Y02B 20/30* (2013.01); *Y02B 20/40* (2013.01)

(56) References Cited

U.S. PATENT DOCUMENTS

| | | | |
|---|---|---|---|
| 7,928,955 B1 | 4/2011 | Bell | |
| 8,203,581 B2 | 6/2012 | Garcia et al. | |
| 8,297,775 B2 | 10/2012 | Wright et al. | |
| 8,564,220 B2 | 10/2013 | Matthews et al. | |
| 8,692,473 B2 | 4/2014 | West | |
| 8,890,435 B2 | 11/2014 | Bora et al. | |
| 8,981,650 B2 | 3/2015 | Burayez et al. | |
| 9,022,612 B2 | 5/2015 | Maglica et al. | |
| 9,046,260 B2 | 6/2015 | Dial | |
| 9,060,407 B2 | 6/2015 | West | |
| 9,125,255 B2 | 9/2015 | Ramer et al. | |
| 9,140,444 B2 | 9/2015 | Connor | |
| 9,247,598 B2 | 1/2016 | Maglica et al. | |
| 9,363,860 B1 | 6/2016 | Lowchareonkul | |
| 9,474,128 B2 | 10/2016 | Hoang | |
| 9,497,819 B2 | 11/2016 | Sluis et al. | |
| 9,866,941 B2 | 1/2018 | Förstner | |
| 2002/0154379 A1 | 10/2002 | Tonar et al. | |
| 2011/0012534 A1 | 1/2011 | West et al. | |
| 2011/0012535 A1 | 1/2011 | West et al. | |
| 2013/0250545 A1* | 9/2013 | Dial ........................ | F21V 33/00 362/222 |
| 2014/0062297 A1* | 3/2014 | Bora ...................... | H05B 45/10 315/297 |
| 2014/0211460 A1 | 7/2014 | Macor | |
| 2015/0170584 A1* | 6/2015 | Casper .................. | H05B 45/14 345/690 |
| 2016/0088707 A1* | 3/2016 | Van De Sluis ...... | H05B 47/115 315/297 |
| 2017/0038059 A1 | 2/2017 | Naumann | |

FOREIGN PATENT DOCUMENTS

| | | |
|---|---|---|
| CN | 103062633 B | 3/2015 |
| DE | 102007021054 A1 | 11/2008 |
| EP | 2345864 A2 | 7/2011 |
| EP | 2498583 B1 | 5/2017 |
| ES | 2828998 | 5/2021 |
| FR | 2785737 A1 | 5/2000 |
| JP | 5570018 B2 | 8/2014 |
| WO | 2015042324 A1 | 3/2015 |

OTHER PUBLICATIONS

MAG Instrument, Inc.—Maglite, Maglite XL200 LED 3-Cell AAA Flashlight, Black, Amazon Marketplace (Link: https://www.amazon.com/Maglite-XL200-3-Cell-Flashlight-Black/dp/B005EHL608), Jul. 25, 2011 (Date first available).

PLX Devices Inc., Luxor 2—The Flashlight Perfected, Kickstarter Publication (Link: https://www.kickstarter.com/projects/plxdevices/luxor-2-the-flashlight-perfected), 2016, US.

\* cited by examiner

Auto Dimming

Auto Off (Normal)/Intelligence

Auto Off (Normal)/Intelligence

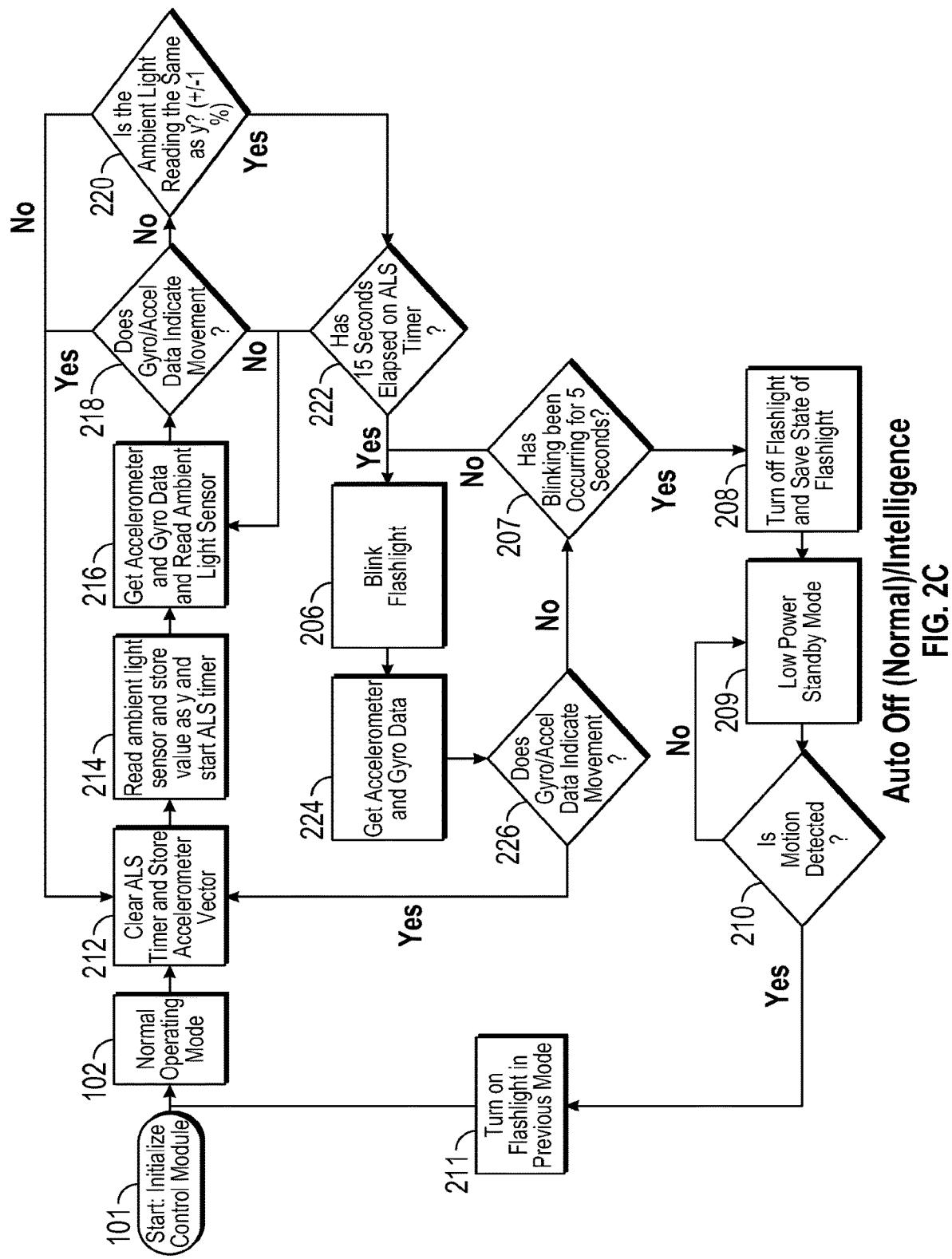
FIG. 2C Auto Off (Normal)/Intelligence

Battery Intelligence

Lantern Mode

Lock Beams Entering (Orientation & Twist/Return)

Lock Beams Entering

Lock Beams Operation and Exiting

Lock Beams Operation and Exiting (Accelerometer)

Twist & Return

Twist & Return

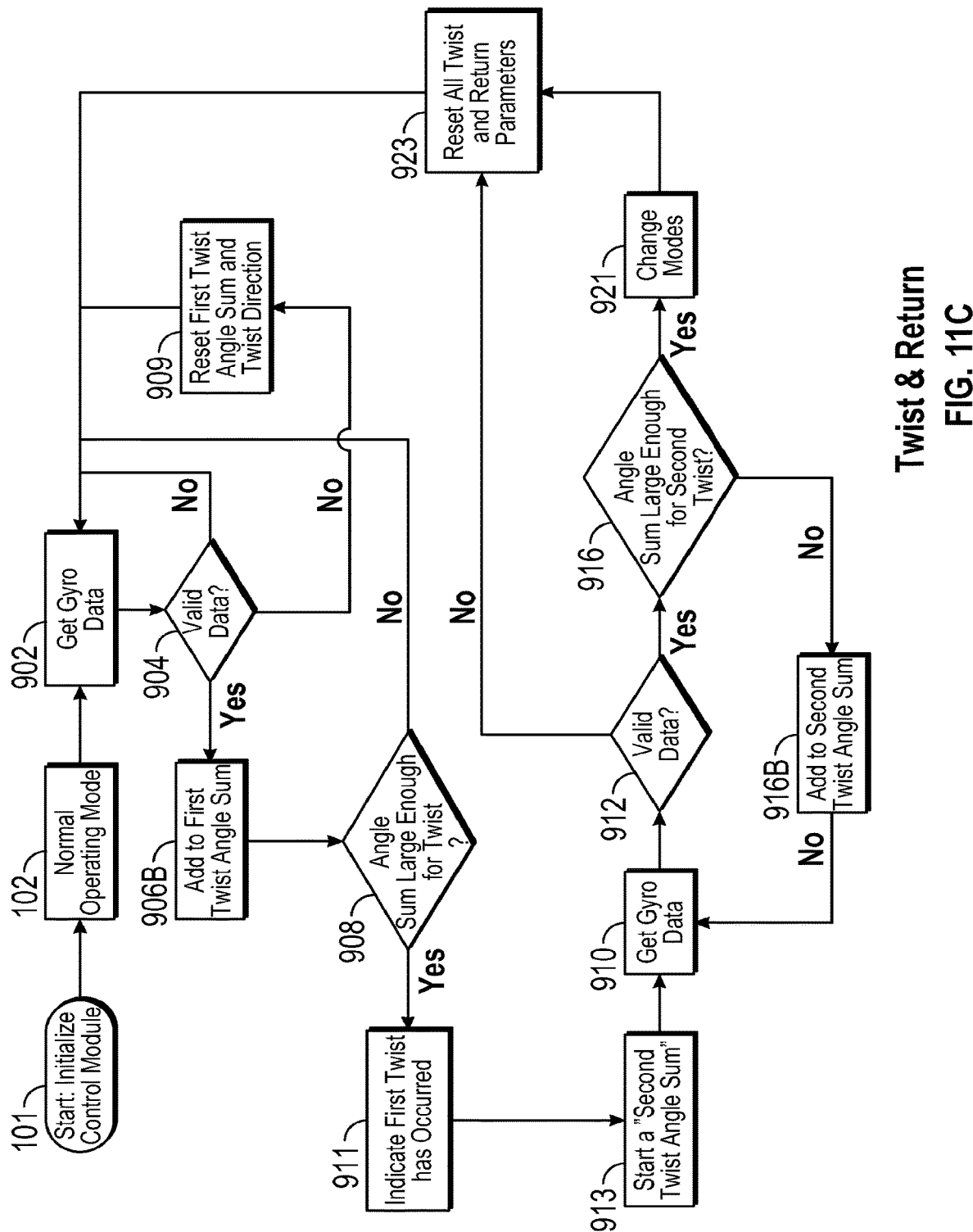
FIG. 11C Twist & Return

Twist to Dim

Twist to Dim

Switch Modes Through Battery Disconnect

Switch Modes Through Battery Disconnect

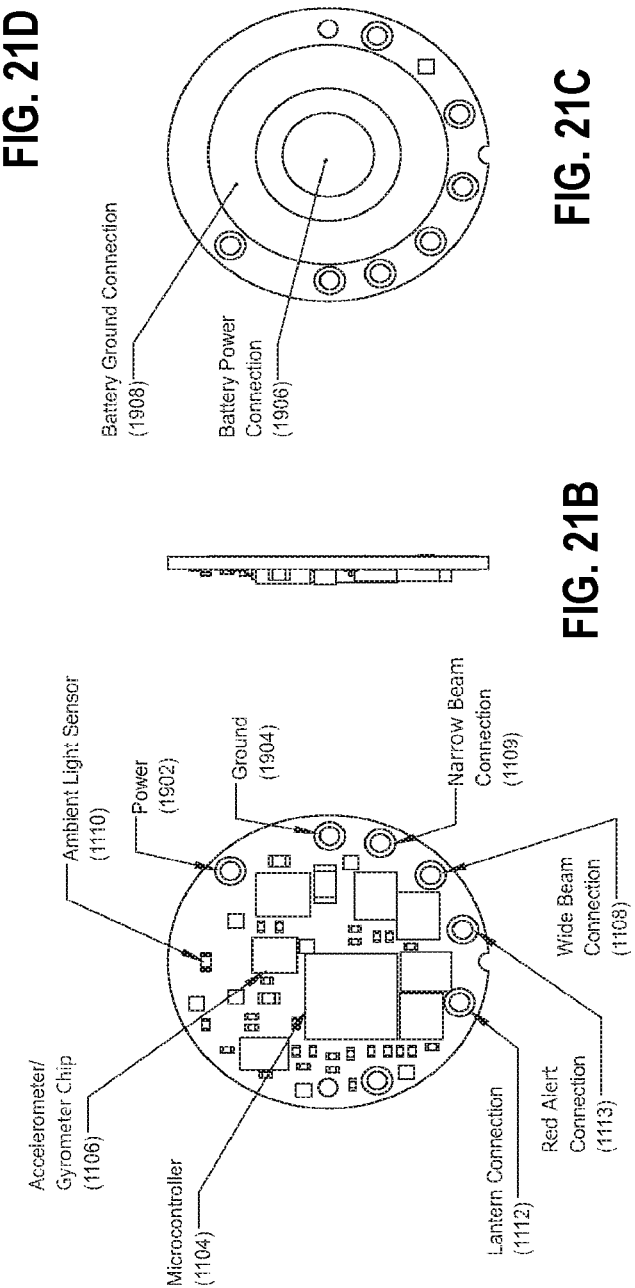

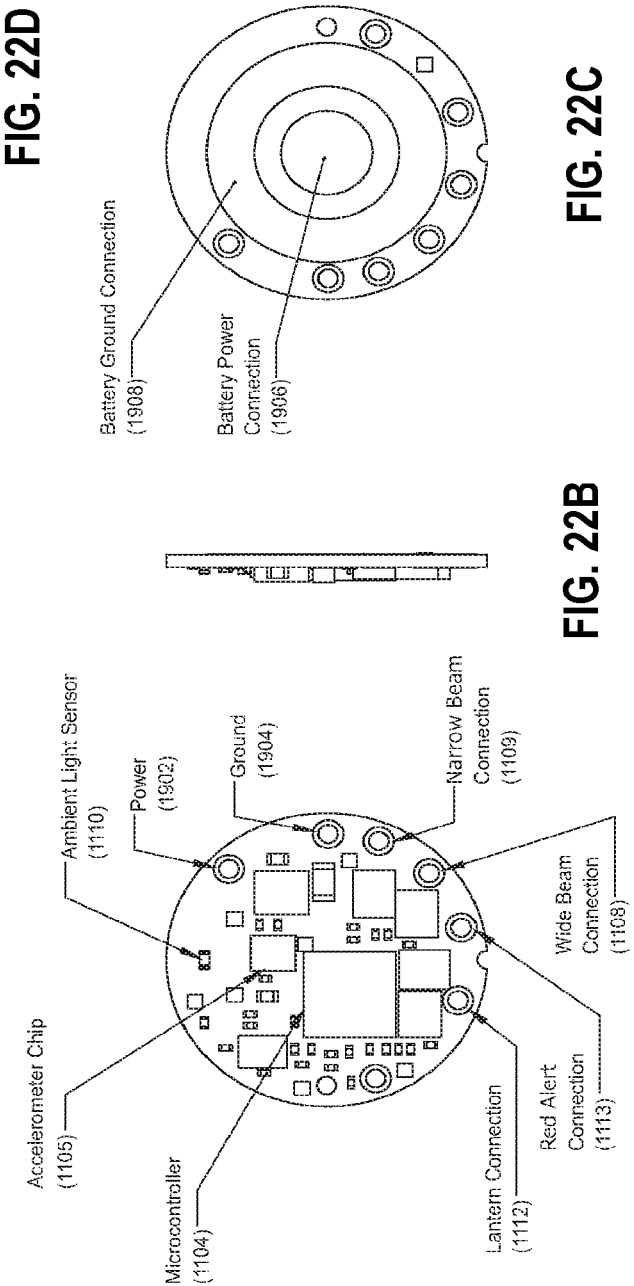

ADAPTIVE FLASHLIGHT CONTROL MODULE

FIELD OF INVENTION

The present disclosure relates to a portable lighting device control module adapted to accept user gestures as a means to control the lighting device operations.

BACKGROUND

A significant problem with portable lighting devices is that a user cannot easily transition from one mode of operation to another mode of operation without clicking a button on the user interface of the flashlight body to request for the mode change. Another significant problem with portable lighting devices is that the light intensity cannot be easily managed by the user, resulting in too little light or too much light at a specific instance of use. Another significant problem is that portable lighting devices are frequently accidentally left on, and the battery depleted as a result. Flashlights may be configured to turn off due to non-use after a specific duration, but their re-initiation results in the flashlight being returned into a pre-programmed power-up sequence mode, which sometimes isn't to the user's expectations. Another significant problem with flashlights is that they do not have a means to adjust power consumption based on remaining battery life automatically.

Also, dual flashlight/lantern lighting devices on the market today cannot transition from a flashlight device to a lantern device without pressing a button on the user interface of the lighting device body to request such adjustment. Finally, lighting devices cannot easily maintain light intensity without having to click a button to lock a certain setting desired by a user.

SUMMARY

Aspects of the present disclosure include a lighting control module for use with a multipurpose lighting device. In some examples, the lighting control module comprises: a microcontroller having a plurality of lighting device output modes stored in memory; one or more sensors, each being configured to detect motion of the multipurpose lighting device and transmit data to the microcontroller. In some examples, the lighting control module is configured to receive power from a battery of the multipurpose lighting device, and the microcontroller is configured to select a first mode of the plurality of lighting device output modes and adjust an intensity of one or more light sources of the multipurpose lighting device using pulse width modulation brightness controls responsive to the data received from the one or more sensors.

In one embodiment of the disclosure, a lighting control module for use with a multipurpose lighting device comprising a microcontroller having stored within a memory a plurality of lighting device output modes, a battery power connection and a battery ground connection configured to receive power from a battery, an ambient light sensor configured to measure light intensity external to the lighting control module and transmit an ambient light sensor output to the microcontroller, an accelerometer/gyroscopic sensor configured to measure motion and orientation of the multipurpose lighting device and transmit an accelerometer/gyroscopic sensor output to the microcontroller. In addition, the control module further comprising a first directional connection and second directional connection configured to communicate with the first light source, a first area light connection and a second area light connection configured to communicate with the second light source. Moreover, the microcontroller having program logic configured to select one of the plurality of output modes and to initiate either the first light source or the second light source, and adjust the one selected output mode using pulse width modulation brightness controls responsive to the ambient light sensor output and the accelerometer/gyroscopic sensor output.

The microcontroller within the control module configured to detect absence of motion for a specified duration to enter into a standby mode to reduce power consumption and presence of motion for a specified duration to enter into normal operating mode in absent of a switch actuation to toggle between standby mode and normal operating mode.

The ambient light sensor within the control module being further configured to continuously output the ambient light sensor output to the microcontroller, wherein the microcontroller continuously adjusts brightness of the first light source or second light source irrespective of the one selected output mode, unless disabled by the program logic.

The microcontroller within the control module further includes logic operative to receive the accelerometer/gyroscopic sensor output and ignore the ambient light sensor output if the accelerometer/gyroscopic sensor output matches a preprogrammed profile.

The microcontroller within the control module further includes logic operative to power on the multipurpose lighting device if the lighting device was previously in a dormant state and external motion, outside the lighting device, is detected by the ambient light sensor.

The microcontroller within the control module further includes logic operative to toggle between output modes responsive to a match of accelerometer/gyroscopic sensor output with preprogramed profiles stored in the memory of the microcontroller absent the pressing of an external button interface to change the light mode.

The microcontroller within the lighting control module proceeds to a specific light mode, from the variety of light modes available, based upon specific gestures sensed by the accelerometer/gyroscopic sensor within the lighting control module, absent pressing of an external button interface to change the light mode.

In one embodiment of the disclosure, a method of operating a lighting device, the method comprising detecting within a module incorporated into the lighting device a gesture movement of the lighting device and an external movement proximal to the lighting device, selectively powering a first light source and a second light source within the module responsive to detection by the module of a predefined one or more gesture movements performed by a user of the lighting device, selectively placing the module in a hibernation state if no gesture movement and no external movement is detected by the module for a designated period of time, selectively setting an output mode and adjusting light output to either the first light source or the second light source based upon an output gesture movement detected by the module, selectively setting a light mode within the output mode based upon a light mode gesture movement detected by the module.

The method further comprising detecting external movement proximal to the lighting device via an ambient light sensor incorporated into the module and continuously adjusting brightness of the first light source or second light source responsive to outputs from the ambient light sensor and superseding a previously set light mode.

The method further comprising selectively ignoring a plurality of detected external movements proximal to the lighting device and disallowing continuous dimming if a predefined gesture movement of the lighting device is detected.

The method further comprising the step of providing power to the module to power the first light source or second light source when external movement proximal to lighting device is detected when the lighting device is in a dormant state.

The method further comprising: toggling between output modes responsive to a match of the detected gesture movement of the lighting device with two or more predefined gestures absent the pressing of an external button interface to change the light mode.

The method further comprising: proceeding to a specific light mode responsive to a match of the detected gesture movement of the lighting device with one of a plurality of predefined gestures sensed by an inertial sensor within the integrated module, without pressing of an external button interface to change the light mode.

The method further comprising proceeding to a next light mode in succession to a last light mode for which the device was operating with upon power up sequence if the portable lighting device was shut-off previously prior to a save last mode timer being satisfied.

In one embodiment of the disclosure, a lighting control module and a multipurpose lighting device comprising a lighting device housing having a head end and a back end, an integrated module with microcontroller mounted as a unit within the head of the housing and connected to at least one LED board.

The LED board comprising: an ambient light sensor configured to measure external light intensity through an empty cavity and transmit its output to the microcontroller.

The integrated module comprising: an accelerometer/gyroscopic sensor configured to measure motion and orientation of the multipurpose lighting device, and transmit its output to the microcontroller, a narrow beam connection and wide beam connection configured to communicate with the LED board, the microcontroller having program logic and memory configured to adjust light modes using pulse width modulation brightness controls responsive to inputs received from the ambient light sensor and the accelerometer/gyroscopic sensor.

The lighting control module and a multipurpose lighting device further comprising at least one wide beam LED connected to the wide beam connector within the integrated module, at least one narrow beam LED connected to the narrow beam connector within the integrated module, at least one white LED connected to the lantern beam connector within the integrated module, at least one red LED connected to the red alert beam connector within the integrated module The lighting control module and a multipurpose lighting device, wherein the head end of the housing is comprised of a scoping lens configured to allow manual wide bean and narrow beam adjustments.

The lighting control module and a multipurpose lighting device, wherein the LED board further comprises a wide beam LED and a narrow beam LED.

The lighting control module and a multipurpose lighting device, wherein the head end of the housing maintaining the empty cavity, the empty cavity having a hole on one end and the ambient light sensor on the opposite end attached to the LED board.

The lighting control module and a multipurpose lighting device, wherein the ambient light sensor within the LED board can transmit its real-time measurements to the lighting control module and allow the microcontroller to dynamically adjust light intensity of the narrow beam LED or wide beam LED.

In one embodiment of the disclosure, the control module having a microcontroller, an inertial sensor (accelerometer and/or gyroscopic sensor) and a motion sensor (PAIR, Microwave, etc.) integrated therein in order to detect motion external to the portable lighting device maintaining the control module. On an exemplary embodiment, a portable lighting device may initiate a standby mode to reduce power consumption if the inertial sensors detect absence of motion, and the microcontroller can be pre-programmed to wake up the portable lighting device into Normal Operating Mode if a motion sensor (PAIR, Microwave, or alternative motion sensor) detects motion occurring outside the portable lighting device, such as a hand wave in close proximity to the portable lighting device that is laying down on a flat surface or mounted onto a surface for easy access.

BRIEF DESCRIPTION OF DRAWINGS

These and other features will now be described with reference to the drawings summarized below. These drawings and the associated description are provided to illustrate a preferred embodiment of the invention, and not to limit the scope of the invention.

FIG. 2C is an exemplary technical flow diagram describing the auto-off intelligence feature of the portable light device control module;

FIG. 11C is a flowchart of an exemplary method of twist and return feature of the portable lighting device;

FIG. 21A is a front view of an exemplary embodiment of the control module having both an accelerometer and a gyroscopic sensor;

FIG. 21B is a side view of an exemplary embodiment of the control module having both an accelerometer and a gyroscopic sensor;

FIG. 21C is a back view of an exemplary embodiment of the control module having both an accelerometer and a gyroscopic sensor;

FIG. 21D is a perspective view of an exemplary embodiment of the control module having both an accelerometer and a gyroscopic sensor;

FIG. 22A is a front view of an exemplary embodiment of the control module having an accelerometer only;

FIG. 22B is a side view of an exemplary embodiment of the control module having an accelerometer only;

FIG. 22C is a back view of an exemplary embodiment of the control module having an accelerometer only; and FIG. 22D is a perspective view of an exemplary embodiment of the control module having an accelerometer only.

DETAILED DESCRIPTION

Figure 1:
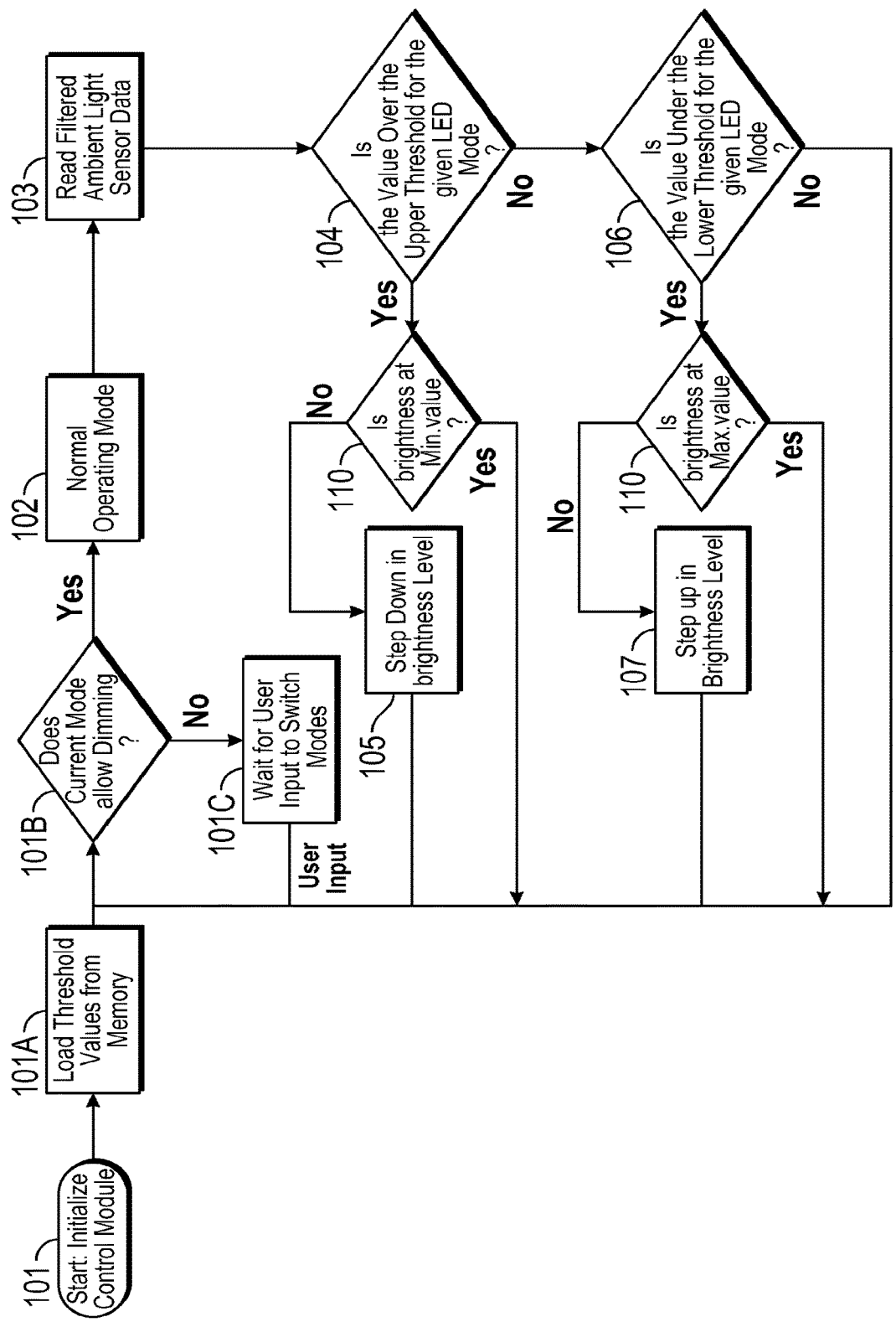
FIG. 1 is a flowchart of an exemplary method of auto-dimming of the portable light device control module.

Specific embodiments of the invention will now be described with references to the drawings. These embodiments are intended to illustrate, and not limit, the present invention.

One non-limiting advantage of the portable lighting device control module is that an ambient light sensor (or light sensitive phototransistor) may be configured to read a LED reflection value and adjust light intensity based on threshold values stored within the microcontroller.

Another non-limiting advantage of the portable lighting device control modules is that an accelerometer and microcontroller in combination can detect non-motion, initiate a time-out sequence to alert the user of upcoming low power standby mode, reduce power consumption by degrading to a low power standby mode. If the user ignores the time-out sequence, the current mode is stored in memory, so that if it's powered-on by the user in subsequent use, the current mode will be restored.

Another non-limiting advantage of the portable lighting device control module is integrated battery intelligence allows the microcontroller to automatically adjust or pre-configure power consumption of the lighting device based on remaining battery life measured by the processor.

Another non-limiting advantage of the portable lighting device control module is the ability to transition from a Normal Operating Mode to a Lantern Mode by placing the lighting device in downward facing position and bumping the portable lighting device to transition between a Lantern Mode and Alert Mode. Wherein bumping gesture is comprised of the user forcefully pushing the downward facing portable lighting device downwards and a quick abrupt halt in motion.

Another non-limiting advantage of the portable lighting device control module is the ability to maintain a certain setting, essentially lock a setting into the configuration, by simply pointing upwards for 2 seconds to lock in Bright Lock Mode or downward for 2 seconds to lock in Dim Lock Mode. Alternatively, to simply point the portable lighting device in upwards and perform a twist gesture in order to lock in Bright Lock Mode or downwards and perform a twist gesture in order to lock in Dim Lock Mode. To exit a Dim Lock Mode or Bright Lock Mode, the user may maintain the lighting device in a horizontal orientation, and either whip the flashlight or perform a twist gesture to return to Normal Operating Mode.

Another non-limiting advantage of the portable lighting device control modules is the ability to adjust from Wide Beam to Narrow Beam by using a Twist & Return gesture. The portable lighting device will be twisted either to the right or the left, while pointing forward, and the user will twist the lighting device back into its original position resulting in light beam adjustment between Wide Beam to Narrow Beam.

Another non-limiting advantage of the portable lighting device control module is the ability to adjust the light intensity by twisting the portable lighting device. In one embodiment of the "twist to dim" capability, the user may have the portable lighting device in a horizontal orientation, pointed forward, and twist in either right or left direction. As a result, the light intensity will be increased or decreased in real-time based on the angle of rotation provided by the user. In another embodiment of the "twist to dim" capability, the user may have a portable lighting device in a downward orientation, and allow the user to twist either right or left direction. As a result, the light intensity will be increased or decreased in real-time based on the angle of rotation provided by the user. Alternative initial orientations of the portable lighting device are also contemplated and would function the same way.

The portable lighting device or flashlight may be comprised of three distinct components: (1) the head, (2) the control module, and (3) the power pack, of which each will be describe in turn. The head is a unit which contains the LED(s) and heatsinks necessary to provide both narrow beam and wide beam functionality. The head may also contain a distance sensor to determine distance to target. The head may also contain an ambient light sensor in order to adjust light intensity based on the environmental and surrounding lighting conditions. The control module may comprise the microcontroller (MCU), and other sensors necessary to provide control over the LED(s) in the head unit. The power pack unit may contain the switch and the batteries required to power the control unit and the LED(s) for the flashlight functionality. The adaptive flashlight may be comprised of ultra-low power components. Usage of ultra-low power MCU's and sensors is preferred in order to maximize useful flashlight life. A gyroscopic sensor may be used in order to measure a change in angle. It can be used to detect the amount of twisting/spinning that occurs in any axis and also the speed at which the device is twisting/spinning. An accelerometer sensor may be used in order to recognize orientation, user acceleration and pointed direction. A distance sensor may be used in order to recognize distance to target and increase or decrease light intensity base on distance to prevent oversaturating near targets. An example would be reducing the light intensity and increasing spread for reading a manual, or when the light is pointed at a distant target, intensity would increase and spread would decrease to concentrate the light on the distant target. At least three methods are identified in order to achieve this objective: (a) Laser: Laser distance sensing using Class 1 NIR (Near Infrared) or Red dot laser, (b) Ultrasonic-distance sensing using sound, (c) Ambient light sensor—Creating a feedback loop using an ambient light sensor that reduces output to the LED's until a certain threshold is achieved. A plurality of thresholds may be configured in the Control Modules in order to automatically dim the light intensity based on ambient light sensor reading of surrounding light values.

The size of the flashlight device may be reasonably close to the traditional flashlights found in the consumer market. A head diameter of 2" or less may be desirable. The control module may ideally be as small as possible, on a printed circuit board of no more than 0.5"×1.0". The control module may be configured to fit within a standard flashlight barrel size of approximately 1.25". Moreover, the control module is desired to be powered by two to four alkaline batteries, a Li-ion battery pack, or an external power source. The power pack may comprise multiple models featuring 2 to 9 alkaline batteries. Alternatively, the power pack may use Li-ion rechargeable battery pack that fits within any size barrel.

Maintaining use of the flashlight in extreme situation is extremely important. The control module may be a separate and self-contained unit that is adapted to fit into any head and battery pack combination. In the event control module malfunctions, it can be removed, and a new replacement control module may be affixed to the head and power pack combination assembly.

Weatherproofing is another desire functionality of the adaptive flashlight. The adaptive flashlight may be IP67 compliant. The flashlight is configured to be able to be functional even if immersed between 15 cm and 1 m of liquid. The flashlight should be functional if it comes into contact with dust or excessive dust. Either the external casing for the flashlight can provide this weatherproofing capability or the control module will be sealed in such a way as to allow this level of water protection.

The beam control desired is the ability to provide a focused beam to a useful distance of approximately 100' (25' wide at 100'). Ability to provide 120-degree wide beam coverage. The light intensity output may be approx. 100-10000 Lumens depending on the flashlight model. Also, the casing may maintain minimal moving parts to increase reliability, whereby the only moving external user component may be a switch to turn-on and turn-off the flashlight device. To maximize battery life, when the flashlight is switched to "off" mode, there may be no power to any components as a result.

The control modules may support multiple threads and allow multiple input signals from multiple sensors or modules and still perform optimally without delay or disregard any input signal requests it receives at the said time.

In one embodiment of the disclosure, the accelerometer, and the gyroscope contained onboard the control module may be the LSM330D IC. The LSM330D is a system-in-package featuring a 3D digital accelerometer and a 3D digital gyroscope. The datasheet for the LMS330D is incorporated by reference herein in its entirety. In another embodiment of the disclosure, the accelerometer and the gyroscope contained onboard the control module may be the Bosch BMI160 IC. The datasheet for the Bosch BMI160 IC is incorporated by reference in its entirety.

In one embodiment of the disclosure, the accelerometer only configuration of the control modules, may comprise the ST Micro LIS2DH12. The datasheet for the ST Micro LIS2DH12 is incorporated by reference in its entirety.

The provided accelerometer provides positive and negative readings of the acceleration in 3 axes (X, Y and Z). The MCU reads these readings through the I2C interface. Since the Accelerometer and Gyroscope both reside on the same chip, they use the same I2C interface to communicate. The MCU addresses which IC it wants to communicate with and then either receives or transmits to that IC. I2C interface is typically used for attaching lower-speed peripheral ICs to processors and microcontrollers in short-distance, intra-board communication The provided gyroscopic sensor reads rotation about three axes (X, Y, and Z) in degrees/second and transmits that data to the microcontroller. The rotation can be positive or negative depending on if the rotation is clockwise or counter clockwise on the axis being read. The LSM330D receives and transmits signals to and from the microcontroller (MKL04Z32VFK4) using an I2C interface.

The provided ambient light sensor may be the TEMT6200FX01 ambient light sensor, a silicon NPN epitaxial planar phototransistor in a miniature transparent 0805 package for surface mounting. It is sensitive to visible light much like the human eye and has peak sensitivity at 550 nm. The datasheet for the TEMT6200FX01 is incorporated by reference herein in its entirety.

The microcontroller may be the Kinetis KL04 32 KB Flash, 48 MHz Cortex-MO+ Based Microcontroller. The datasheet for the MKL04Z32VFK4 is incorporated by reference herein in its entirety. The microcontroller may be the STMicro STM32F030F4P6. The datasheet for STMicro microcontroller is incorporated by reference here in its entirety.

FIG. 1 is a technical flow diagram describing the auto-dimming feature of the portable light device control module. The method as shown in FIG. 1 may be implemented in an ambient light sensor 1110 or phototransistor (not shown) that is in communication with a microcontroller 1104, which is in communication with LED's as described in connection with FIGS. 13-17.

In some situations, a user may desire for the portable light device to automatically adjust light intensity based on external conditions exhibited by the user. Accordingly, the user may desire that the portable lighting device LED intensity is adjusted upwards if the portable lighting device is being used outdoors during the evening to point at an open space ahead of the user. Whereas, the user may desire that the portable light device LED intensity is adjusted downwards if the portable lighting device is being used outdoors during the evening to read a manual.

One non-limiting advantage of the auto-dimming features is the ability to sense a light bounce back or reflection from the LED's, to compare the value with a stored threshold value, and adjust the LED light intensity to suit the needs of the user in real-time.

In one embodiment of the disclosure, an auto-dimming capability of the adaptive flashlight control module using an ambient light sensor and automatic voltage detection module. In one embodiment of the auto-dimming capability, the ambient light sensor will have multiple thresholds range values pre-configured therein. As a result, the ambient light sensor detects the environmental light source, comprised of surrounding light and the reflective light received from the pointed to target. The MCU determines if the reflective light received is between a certain range, then a certain level of brightness or light intensity is output by the device, depending on the value read in from the ambient light sensor will determine the light intensity put forth by the device. In an alternative embodiment of the disclosure, the lighting device will automatically be turned on in to bright (high intensity) mode, unless a voltage detection module determines that it's running low on power and must be automatically started in dim (low intensity) mode. In dark environments where surrounding lights cannot be picked up, the ambient light sensor may depend exclusively on the reflectivity of the pointed to object to determine as to whether to adjust the light intensity.

Light intensity detection and adjustment is performed in all device positions or orientations; the control module may be configured to respond to is the ambient light reading it receives and adjusts light intensity as a result thereto.

In one embodiment of the disclosure, the portable lighting device and respective components do not perform regulation on its LEDs, instead they provide constant power to the LED's through the batteries and Pulse Width Modulate (PWD) the LEDs on and off at various Duty Cycles. These different Duty Cycles create discrete output levels which are switched to by the MCU as the environment around the device changes. The portable lighting device and respective components emit a Pulse Width Modulated (PWM) signal with a known Duty Cycle, and the portable lighting device filters out the high frequency components of the incoming light so that it becomes a DC value readable by the MCU. This is done by using a frequency dependent filter on the output of the optical sensor. The optical sensor used within the portable lighting devices was chosen to match the peak output of the output LEDs as well as the known output signal from the device which Is a high frequency PWM signal. Furthermore, the portable lighting device require no input from the user to set power levels or any thresholds. The user simply picks up the device and uses it. There is no control mechanism to define initial settings by the user, all setting a pre-configured and pre-populated threshold values stored in the MCU or Memory.

The portable lighting device does not require the user to press a button in order to elect auto-dimming, rather the auto-dimming feature is engaged or dis-engaged based on the logic pre-programmed into the MCU and receiving input from the ambient light sensor, accelerometer, or optional accelerometer/gyroscopic sensor. Moreover, the portable lighting device electrical components filter the incoming light so that its primarily detects reflection from its own output light source. Also, the portable lighting device electrical components do not include servos or comparators, rather use analog-to-digital converts. The portable lighting device LED's operate at a constant power, but are pulse-width modulated. The portable lighting devices does not have a control mechanism to define the output level of the LED's. The portable lighting device may utilize an optical sensor that captures data from the pulse-width modulated signal and further filters that signal so that only the low-frequency component is provided to the control circuit.

In one embodiment of the disclosure, to sense an ambient light (for example, a Vishay Semiconductors TEMT6200FX01 phototransistor) coupled with an emitter resistor of 510 kOhms may be used. Incoming photons hit the base of the phototransistor and are translated into a base current. This base current is then amplified by the device, allowing a higher current to flow from the collector to the emitter of the device. The emitter resistor limits the current coming from the device and effectively changes the sensitivity range of the device.

The preferred ambient light sensor was chosen to match the peak output of LEDs. The preferred ambient light sensor may be the ALS-PT19-315C/L177/TR8 ambient light sensor, a silicon NPN epitaxial planar phototransistor in a miniature transparent SMD package for surface mounting. It is sensitive to visible light much like the human eye and has peak sensitivity at 550 nm. The filter on the ambient light sensor was chosen so that the primary reflected light source observed is our output light source. Since our output is a PWM waveform, we place a filter on the ambient light sensor that averages our PWM waveform to a DC value that can be read by the MCU. The datasheet for the ALS-PT19-315C/L177/TR8 is incorporated by reference herein in its entirety. In one embodiment of the disclosure, the coupling of an accelerometer, an ambient light sensor and the MCU may allow the MCU to determine if a user is running or engaging in an activity that requires dimming to be temporarily disabled due to the accelerometer transmitting data to the MCU as to the real-time orientation and acceleration of the portable lighting device. Once the user ceases to run or engage an in activity requiring dimming to be temporarily disabled, the mode automatically changes to allow dimming. Threshold values may be required to be stored in the MCU to allow the MCU to make determinations as to when to allow or dis-allow dimming to take place.

The auto-dimming feature uses an ambient light sensor 1110 or phototransistor (not shown) and an ADC input 1111 to the microcontroller (MCU) 1104 to determine the pulse width modulation (PWM) duty cycle 1107 controlling the LED's of the portable lighting device. The ambient light sensor 1110 produces a voltage output that corresponds to the amount of light it is receiving. The voltage output from the ambient light sensor 110 is passed through a low pass filter to filter output to the MCU 1104 into a readable format that the MCU 1104 can comprehend. In one example, the light received is primarily from the reflection from the portable lighting device LEDs. The voltage from the ambient light sensor 1110 is converted to a digital value using the microcontroller 1104 ADC input 1111. Once a value is stored in the MCU 1104, the MCU 1104 then compares it with a series of stored thresholds which are programmed into the MCU 1104. In one embodiment of the disclosure, there may be a low and a high threshold for each mode (Wide/Narrow) and Brightness setting (Full/Mid/Dim) of the portable lighting device. If the value read by the ADC input 1111 is at or above the high threshold for the given mode, the MCU 1104 changes the brightness setting to the one below it (i.e. Full→Mid or Mid→Dim). If the portable lighting device is in Dim mode, it does not have an upper threshold since it is already at the lowest brightness setting. Similarly, if the value read by the ADC input 1111 is at or below the low threshold for the given mode, the MCU 1104 changes the brightness setting to the one above it (i.e. Dim→Mid or Mid→Full). If the portable lighting device is in Full mode, it does not have a lower threshold since it is already at the highest brightness setting.

In an alternative embodiment, the MCU 1104 changes the brightness setting by adding/subtracting 5% to the PWM duty cycle effectively brightening/darkening the LEDs. In example, each time the ambient light reading is above a set threshold it steps down 5% in brightness and each time the reading is below a set lower threshold the brightness is increased 5%. The brightness won't increase if it is already at its maximum level and the brightness will not decrease if it is already at its minimum level.

In block 101, Start: Initialize Control Module indicates the start of the method or process. In block 101A the processor loads threshold values from memory and proceeds to process decision block 101B. In decision block 101B the processor determines if the current mode allows for dimming capabilities, if yes, the process continues to process block 102, if no, the process continues to process block 101C. In process block 101C, the processor waits for user input to switch modes to allow for dimming to take place and the process returns to decision block 101B. In block 102, the Normal Operating Mode is presumed. Alternative Operating Modes are configured into the portable lighting device, which will be discussed in turn. In one embodiment, the Normal Operating Mode may be achieved by power-on startup procedures of the portable lighting device or it may be achieved by intentionally navigating to this operating mode by applying differing users gestures available. After Normal Operating Mode is achieved, the process may continue to process block 103.

In block 103, the MCU 1104 reads filtered ambient light sensor data. The voltage from the ambient light sensor 1110 is converted to a digital value using the microcontroller 1104 ADC input 1111. After the ADC input is read in by the microcontroller, then the process may continue to decision block 104.

In decision block 104, the microcontroller compares the ADC input with the stored value of the Upper threshold for the given LED Mode (i.e. Narrow Beam, Wide Beam, etc.). If it's determined that the ADC input value is over the threshold for a given LED mode, then the process continues to decision block 110. If it's determined that the ADC input value is not over the threshold for a given LED mode, then the process continues to decision block 106.

In decision block 110, microcontroller compares the PWM duty cycle (aka Brightness) with the stored value of the minimum threshold for the given LED Mode (i.e. Narrow Beam, Wide Beam, etc.). If it's determined that the PWM duty cycle (brightness setting) is at the minimum threshold value, then the microcontroller will not decrease it further, but rather return to process block 101B. If it's determined that the ADC input value is not at the minimum threshold value, then the microcontroller will continue to process block 105.

In block 105, the microcontroller changes the brightness setting to the one below it (i.e. Full>>Mid or Mid>>Dim), or by percentage light intensity decrease. In one embodiment, if the brightness setting is at Dim brightness, then it will already be at the lowest value and it will not adjust, otherwise, it will step down in brightness setting. After the microcontroller adjusts the brightness settings, the process returns to process block 101B to begin the process again.

In decision bloc 106, the microcontroller compares the ADC input with the stored value of the Lower threshold for the given LED mode (i.e. Narrow Beam, Wide Beam, etc.). If it's determined that the ADC input value is under the Lower threshold for the given LED mode, then the process continues to decision block 112. If it's determined that the ADC input value is not under the Lower threshold for the given LED mode, then the process returns to block 103.

In decision block 112, microcontroller compares the PWM value input with the stored PWM value of the maximum threshold for the given LED Mode (i.e. Narrow Beam, Wide Beam, etc.). If it's determined that the ADC input value is at max threshold value, then the microcontroller will not increase it further, but rather return to process block 101B. If it's determined that the ADC input value is not at the maximum threshold value, then the microcontroller will continue to process block 107.

In block 107, the microcontroller changes the brightness setting to the one above it (i.e. Dim>>Mid or Mid>>Full). If the brightness setting is at Full brightness, then it will already be at the highest value, and it will not adjust, otherwise, the brightness setting will be adjusted to step up in brightness. After the microcontroller adjusts the brightness settings, the process returns to the process block 101B to begin the process again.

In general, the Ambient Light Sensor will be able to detect changes in environmental conditions for the portable lighting device, whether it's being pointed into an open space, or if it's being pointed to an object in close proximity, or if it's Front End LED's light intensity is obstructed by a physical object in extreme close proximity. The Ambient Light Sensor will measure the reflection value received, convert it into an ADC input for the MCU, wherein the MCU will adjust the PWM brightness value directed to the LED in response to the ADC input received. It's important to note, that during a Locked mode (i.e. Bright Lock Mode or Dim Lock Mode), the dimming feature is disabled, and the ambient light sensor measurements are not considered by the MCU to maintain the light intensity requested by the user in Locked mode.

Figure 2A:
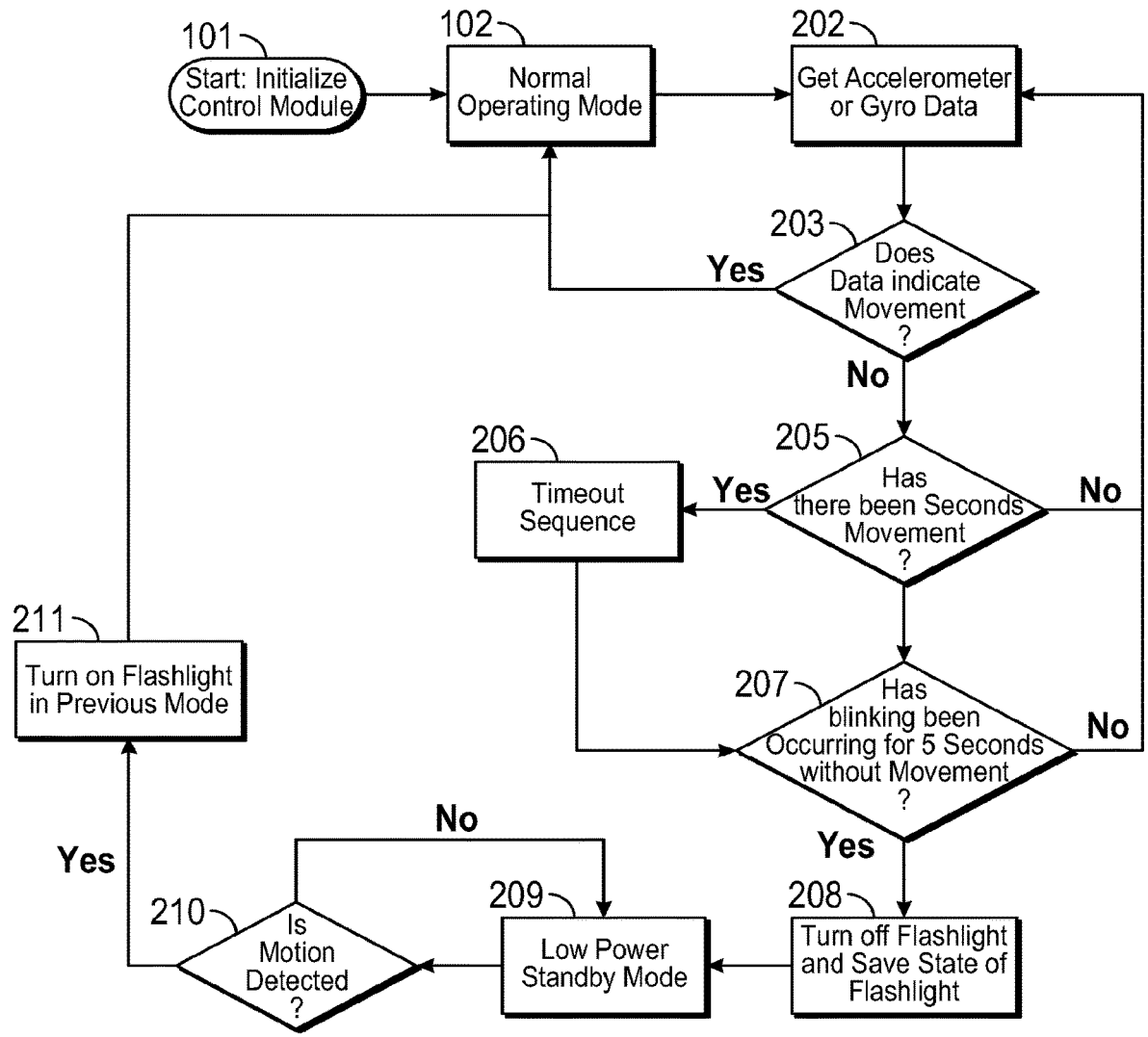
FIG. 2A is a flowchart of an exemplary method of auto-off intelligence feature of the portable light device control module.

FIG. 2A is a technical flow diagram describing the auto-off intelligence feature of the portable light device control module. The method shown in FIG. 2A may be implemented by means of an Accelerometer 1105 or Accelerometer/Gyro 1106 that is in communication with a microcontroller 1104, which is in communication with LED's as described in connection with FIGS. 13-17.

In some situations, a user may desire for the portable light device to automatically shut-off and store previous settings based on non-usage for a specified amount of time. Accordingly, the user may desire that the portable lighting device warns the user before automatic shut-off sequence being initiated, and also store all prior setting in the event of a user restore request upon subsequent usage.

One non-limiting advantage of the auto-off intelligence features is the ability to determine non-movement of the portable lighting device, which is in anticipation of auto-shut off, warn the user of pending shutting off sequence, and store the user's last used setting while maintaining the control module at low power consumption mode until eventual actual shut-off by user or re-initiation of usage while in low power consumption mode by detecting movement.

In one embodiment of the disclosure, an auto turn-off capability of the adaptive flashlight control module whereby the flashlight device will automatically stop emitting while the internal circuitry remains operating if the control modules having a sensor is able to detect non-movement for a configurable amount of time, and optionally, warn the user of its intent to stop emitting if input is not received within a configurable amount of time from the user to maintain the device in an on status. In one exemplary embodiment, the control module sensing no motion for approximately 15 seconds will begin to blink to indicate to the user its intent to automatically stop emitting. The blinking or warning may be configured to last 4 seconds (or any pre-configured amount of time), and then the flashlight device will automatically stop emitting its LED's to conserve power. In one exemplar embodiment of the disclosure, the user may click a button, touch a touch pad, or shake the flashlight device to indicate to the control module the user's intent to not turn off the LED(s) after a warning has been displayed. In one another embodiment, if the flashlight device is touched while the blinking/warning is occurring, it will enter a "stay on" status in which the device will stay on until it detects an orientation that is outside at least 10 to 40-degree cone about its original orientation, or significant motion may be required during the blink state to activate "stay on" status. At this point, it returns to its normal operation where it uses a configurable timeout value. Moreover, after the flashlight device has turned off and the LED's are off, in one embodiment of the disclosure, the user may pick up the flashlight again (causing motion) to turn it back on. The motion sensors configured within the control module may include an accelerometer sensor, a gyroscopic sensor, or a motion sensor, or configurable combination of these enumerated sensors.

The auto-off intelligence feature uses the accelerometer/gyro 1106 or accelerometer 1105 to detect if the portable lighting device is moving or not. This is done by comparing the vector sum of the three accelerometer axes with thresholds defined in the MCU 1104. If the MCU 1104 does not detect motion, a first timer is started. If no motion occurs before that timer runs out, the timeout sequence 206 is started. The timeout sequence 206 starts with the MCU 1104 blinking the LEDs to warn the user that the portable lighting device is about to turn off After blinking, the MCU 1104 saves the current state of the portable lighting device (Mode, Brightness) and turns off all peripherals (except the accelerometer 1105 or accelerometer/gyro 1106 which is left in low power mode capable of only sending an interrupt signal if a motion threshold set in the portable lighting device is reached). The MCU 1104 is then in a Low Power State where it waits for the interrupt generated by the accelerometer 1105 or accelerometer/gyro 1106. If this interrupt (i.e. motion) is detected, then the MCU 1104 turns back on in the mode that it was previously in and resumes its normal operation.

In block 101, Start: Initialize Control Module indicates the start of the method or process. In block 102, the Normal Operating Mode is presumed. Alternative Operating Modes are configured into the portable lighting device, which will be discussed in turn. In one embodiment, the Normal Operating Mode may be achieved upon power-on startup procedures of the portable lighting device or it may be achieved by intentionally navigating to this operating mode by applying differing users gestures available. After Normal Operating Mode is achieved, the process may continue to process block 202.

In block 202, the microcontroller receives motion detection data from either: an accelerometer, accelerometer/gyro, or gyroscopic sensor, hereafter referred to as motion sensors. After the microcontroller receives the motion detection data from the sensor, then the process may continue to decision block 203.

In decision block 203, the microcontroller performs internal calculations of stored movement threshold values and determines if the movement of the portable lighting device has or has not occurred. If the movement has occurred, then the process returns to block 102, Normal Operating Mode, wherein the MCU determines if a user gesture has been performed as a result of the movement to indicate a request to adjust Mode or Brightness configurations.

If the movement has not been detected, then the process continues to decision block 205, where the microcontroller will initiate a first count-down timer to determine if there has been 15 seconds (or other specific duration) without movement. If the portable lighting device signifies movement within the first count-down timer, then the process returns to block 202 where the microcontroller receives input from an accelerometer or gyroscopic sensor regarding motion and maintains current state. If the MCU continues to receive data and control signals from the accelerometer or gyroscopic sensor indicative of movement, based upon comparison with a stored movement threshold range value stored within the MCU, within the first count-down timer duration, then the process proceeds to block 206.

In block 206, the portable lighting device will begin the timeout sequence and blink to indicate to the user a warning of an upcoming power reduction to reduce battery consumption. After the timeout sequence of block 206 is initiated, the process continues to decision block 207.

In block 207, the microcontroller will initiate a second count-down timer and will determine (from the input received from the motion sensors) whether the movement has or has not occurred during the duration of the second count-down timer. If movement is sensed by the motion sensors within the time frame allocated for the second count-down timer, then the timeout sequence is stopped, the portable lighting device is returned to Normal Operating Mode, and the process is returned to block 202 where real-time motion sensing is again being transmitted to the MCU. If movement is not sensed by the motion sensors within the time frame allocated for the second count-down timer, then the process progresses to block 208.

In block 208, the MCU saves the current state settings and turns off all peripherals except the motion sensors (i.e. accelerometer, accelerometer/gyroscopic sensor). After block 208, the process continues to block 209. In block 208 the motion sensors are in a "wait for motion threshold" value to be achieved within the motion sensor before the motion sensor transmits data and control signal to the MCU to indicate movement. In other words, the "wait for motion threshold" value is programmed to wait for a motion threshold value to be achieved within the motion sensors before transmission of data to the MCU.

In block 209 the MCU initiates a low power standby mode whereby the MCU puts itself into a lower power state where it waits for interrupts generated by the motion sensors to come in. After block 209, the process progresses to decision block 210. In block 210, the motion sensor determines if its internal movement detected threshold value has been met. When the motion sensor detects a value meeting its internal threshold value for motion, then the motion sensor sends a signal to the MCU indicating movement, wherein then the process progresses to block 211. In block 211, the MCU restores the portable lighting device to its previously saved mode and the process returns to block 102.

In general, the intelligent auto-off feature may be initiated while the portable lighting device is deemed in a non-motion status, wherein it would be useful to turn it off to conserve power consumption. The advantage of this feature is the ability for the MCU to store the previous state of the portable lighting device before Low Power Standby Mode, continuing to supply limited power to the MCU and motion sensors during the Low Power Standby Mode. Moreover, if the user turns off the portable lighting device using an available switch, then the saved state of the portable lighting device may not be restored to its previous state upon subsequent power up operation.

Figure 2B:
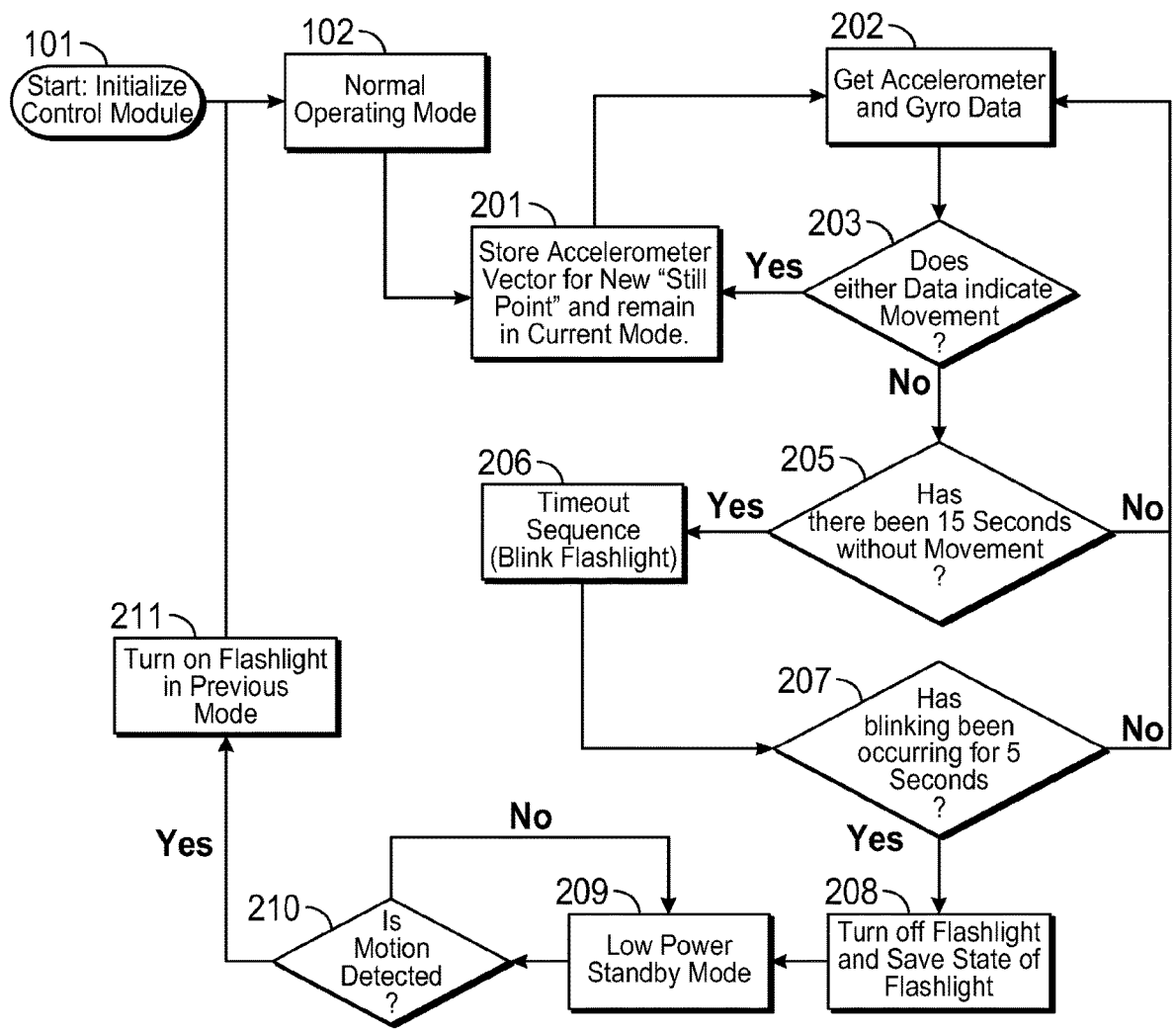
FIG. 2B is an exemplary flowchart of an exemplary method of auto-off intelligence feature of the portable light device control module.

FIG. 2B is an exemplary technical flow diagram describing the auto-off intelligence feature of the portable light device control module. The method shown in FIG. 2B may be implemented by means of an Accelerometer 1105 or Accelerometer/Gyro 1106 that is in communication with a microcontroller 1104, which is in communication with LED's as described in connection with FIGS. 13-17.

In block 101, Start: Initialize Control Module indicates the start of the method or process. In block 102, the Normal Operating Mode is presumed. Alternative Operating Modes are configured into the portable lighting device, which will be discussed in turn. In one embodiment, the Normal Operating Mode may be achieved upon power-on startup procedures of the portable lighting device or it may be achieved by intentionally navigating to this operating mode by applying differing users gestures available. After Normal Operating Mode is achieved, the process may continue to process block 201.

In block 201, the microcontroller stores accelerometer vector received in memory from the accelerometer for a new "still point" (i.e. non-motion vector value) and remain in current mode of operation. After the microcontroller stores the accelerometer vector associated with a new "still point", then the process may continue to process block 202.

In block 202, the microcontroller receives motion detection data from either: an accelerometer, accelerometer/gyro, or gyroscopic sensor, hereafter referred to as motion sensors. After the microcontroller receives the motion detection data from the sensor, then the process may continue to decision block 203.

In decision block 203, the microcontroller performs internal calculations of stored movement threshold values and determines if the movement of the portable lighting device has or has not occurred. If the movement has occurred, then the process returns to block 201, wherein the microcontroller stores the accelerometer vector for new "still point" (i.e. non-motion vector value) and remains in current mode.

If the movement has not been detected, then the process continues to decision block 205, where the microcontroller will initiate a first count-down timer to determine if there has been 15 seconds (or other specific duration) without movement. If the portable lighting device signifies movement within the first count-down timer, then the process returns to block 202 where the microcontroller receives input from an accelerometer or gyroscopic sensor regarding motion and maintains current state. If the MCU continues to receive data and control signals from the accelerometer or gyroscopic sensor indicative of movement, based upon comparison with a stored movement threshold range value stored within the MCU, within the first count-down timer duration, then the process proceeds to block 206.

In block 206, the portable lighting device will begin the timeout sequence and blink to indicate to the user a warning of an upcoming power reduction to reduce battery consumption. After the timeout sequence of block 206 is initiated, the process continues to decision block 207.

In block 207, the microcontroller will initiate a second count-down timer and will determine (from the input received from the motion sensors) whether the movement has or has not occurred during the duration of the second count-down timer. If movement is sensed by the motion sensors within the time frame allocated for the second count-down timer, then the timeout sequence is stopped, the portable lighting device is returned to Normal Operating Mode, and the process is returned to block 202 where real-time motion sensing is again being transmitted to the MCU. If movement is not sensed by the motion sensors within the time frame allocated for the second count-down timer, then the process progresses to block 208.

In block 208, the MCU saves the current state settings and turns off all peripherals except the motion sensors (i.e. accelerometer, accelerometer/gyroscopic sensor). After block 208, the process continues to block 209. In block 208 the motion sensors are in a "wait for motion threshold" value to be achieved within the motion sensor before the motion sensor transmits data and control signal to the MCU to indicate movement. In other words, the "wait for motion threshold" value is programmed to wait for a motion threshold value to be achieved within the motion sensors before transmission of data to the MCU.

In block 209 the MCU initiates a low power standby mode whereby the MCU puts itself into a lower power state where it waits for interrupts generated by the motion sensors to come in. After block 209, the process progresses to decision block 210. In block 210, the motion sensor determines if its internal movement detected threshold value has been met. When the motion sensor detects a value meeting its internal threshold value for motion, then the motion sensor sends a signal to the MCU indicating movement, wherein then the process progresses to block 211. In block 211, the MCU restores the portable lighting device to its previously saved mode and the process returns to block 102.

FIG. 2C is an exemplary technical flow diagram describing the auto-off intelligence feature of the portable light device control module. The method shown in FIG. 2C may be implemented by means of an Accelerometer 1105 or Accelerometer/Gyro 1106 that is in communication with a microcontroller 1104, which is in communication with LED's as described in connection with FIGS. 13-17.

In block 101, Start: Initialize Control Module indicates the start of the method or process. In block 102, the Normal Operating Mode is presumed. Alternative Operating Modes are configured into the portable lighting device, which will be discussed in turn. In one embodiment, the Normal Operating Mode may be achieved upon power-on startup procedures of the portable lighting device or it may be achieved by intentionally navigating to this operating mode by applying differing users gestures available. After Normal Operating Mode is achieved, the process may continue to process block 201.

In block 212, the microcontroller clears the Ambient Light Sensor (ALS) timer and stores Accelerometer Vector. After the microcontroller clears the ALS timer and stores the accelerometer vector, then the process may continue to process block 214.

In block 214 the microcontroller reads the Ambient Light Sensor and store value as y and start a ALS timer, then proceeds to process block 216.

In block 216, the microcontroller gets the accelerometer and gyro data and reads ambient light sensor data, then proceeds to decision block 218.

In decision block 218, the microcontroller determines if the inertial sensor (i.e. combination accelerometer/gyroscopic sensor) data indicates movement. If movement is sensed, then the process returns to block 212, and if the movement is not sensed, then the process proceeds to decision block 220.

In decision block 220, the microcontroller determines if the ambient light reading the same as y (+/−1%). If the ambient light reading is the same as y then proceed to decision block 222, and if the ambient light reading not the same as y then return to block 212.

In decision block 222, the microcontroller determines if the pre-configured duration of 15 seconds (or any duration pre-configured) has elapsed on the ALS timer. If the pre-configured duration has not elapsed on ALS timer then return to block 216, otherwise, proceed to block 206.

In block 206, the microcontroller sends a signal to allow the LEDs to blink to indicate a warning, and the process proceeds to block 224.

In block 224, the microcontroller gets the accelerometer and gyroscopic sensor data 224 and proceeds to decision block 226.

In decision block 226, the microcontroller determines if the accelerometer/gyroscopic data indicates movement. If movement is found, then the return to block 212, if movement is not found, then the process proceeds to decision block 207.

In block 207, the microcontroller will initiate a second count-down timer and will determine (from the input received from the motion sensors) whether the movement has or has not occurred during the duration of the second count-down timer. If movement is sensed by the motion sensors within the time frame allocated for the second count-down timer, then the timeout sequence is stopped, the portable lighting device is returned to Normal Operating Mode, and the process is returned to block 202 where real-time motion sensing is again being transmitted to the MCU. If movement is not sensed by the motion sensors within the time frame allocated for the second count-down timer, then the process progresses to block 208.

In block 208, the MCU saves the current state settings and turns off all peripherals except the motion sensors (i.e. accelerometer, accelerometer/gyroscopic sensor). After block 208, the process continues to block 209. In block 208 the motion sensors are in a "wait for motion threshold" value to be achieved within the motion sensor before the motion sensor transmits data and control signal to the MCU to indicate movement. In other words, the "wait for motion threshold" value is programmed to wait for a motion threshold value to be achieved within the motion sensors before transmission of data to the MCU.

Figure 3:
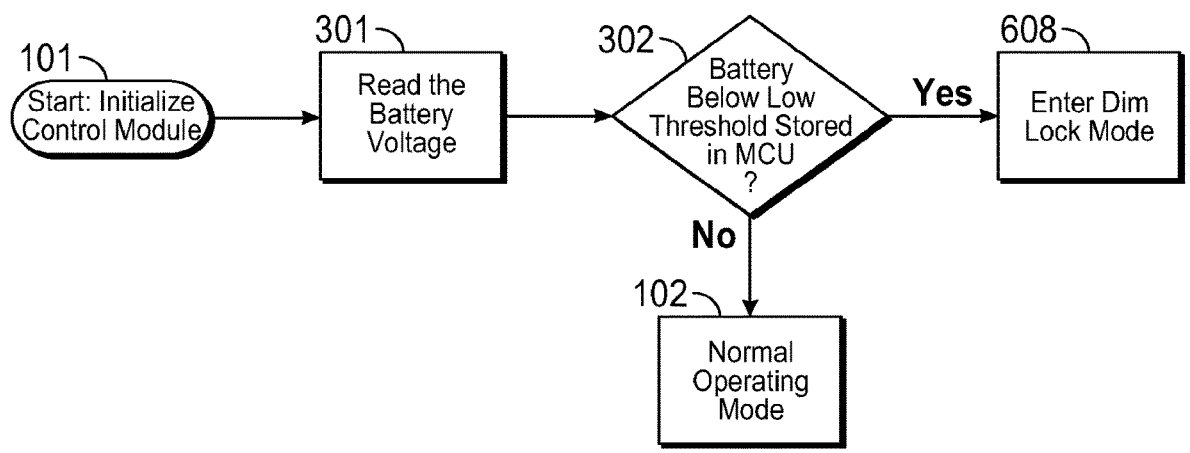
FIG. 3 is a flowchart of an exemplary method of battery intelligence feature of the portable light device control module.

In block 209 the MCU initiates a low power standby mode whereby the MCU puts itself into a lower power state where it waits for interrupts generated by the motion sensors to come in. After block 209, the process progresses to decision block 210. In block 210, the motion sensor determines if its internal movement detected threshold value has been met. When the motion sensor detects a value meeting its internal threshold value for motion, then the motion sensor sends a signal to the MCU indicating movement, wherein then the process progresses to block 211. In block 211, the MCU restores the portable lighting device to its previously saved mode and the process returns to block 102. FIG. 3 is a technical flow diagram describing the battery intelligence feature of the portable light device control module. The method shown in FIG. 3 may be implemented the microcontroller 1104, which is in communication with power source VBATT 1102 or VMCU 1101 as described in connection with FIGS. 13-17.

In some situations, a user may desire for the portable light device to automatically enter a lower power consumption mode when it's determined that the portable lighting device has a low amount of battery life to sustain its continued usage. Accordingly, the user may desire that the portable lighting device automatically enters a Dim Lock Mode if battery voltage levels are indicated to be in short supply to extend the usage of the portable lighting device.

One non-limiting advantage of the battery intelligence features is the ability to read battery voltage and transmit this voltage reading to the microcontroller, where the microcontroller has stored battery threshold values to determine if the mode of operation needs to be adjusted due to battery voltage reading provided.

In one embodiment of the disclosure, an auto low battery detection capability of the adaptive flashlight control module used to detect when the device has batteries or power source that are at less than 25% of capacity. In one embodiment, if the low battery detection capability detects a lower battery condition, then the microcontroller (MCU) may turn on "dim" mode in order to conserve resources, and the "dim mode" will persist unless the user utilizes a "twist and return" gesture or "whip" gesture in order to adjust to the mode of operation or ambient light configured modes which may be configured within the control modules controlling the flashlight.

In one embodiment, the auto low battery detection capability will logically detect the battery voltage using an internal band gap of the MCU. This band gap is set at 1V and can be read on one of the MCUs ADC channels. Since this voltage is always 1V, a reading can be taken and stored at a known battery voltage and programmed. Then any time the MCU reads the band gap voltage it can ratiometrically calculate the current battery voltage using the known battery voltage value it has stored in memory.

The battery intelligence feature enables the MCU to wake the portable lighting device up in a low power state to indicate to the user that the batteries are running low. It works by reading the battery voltage with the ADC and comparing it to a set of thresholds stored in the MCU. If the value read is at or below the "low battery threshold" then the device initializes in Dim Lock Mode instead of Normal mode.

In block 101, Start: Initialize Control Module indicates the start of the method or process. In block 301, the microcontroller reads the battery voltage value. The incoming battery voltage (VBATT) or the regulated voltage (VMCU) will be provided to the MCU in block 301. After reading the battery voltage or regulated voltage, the process continues to decision block 302. In decision block 302, the MCU reads and compares the battery voltage, or regulated voltage value received, using the ADC, to determine if the battery voltage value is below a "low battery threshold" stored in the MCU. If the battery voltage value is determined to be above the "low battery threshold," then the process continues to block 102 and Normal Operating Mode is enabled. If the battery voltage value is determined to be at or below the "low battery threshold," then the process continues to block 608, wherein the portable lighting device enters a Dim Lock Mode. This process may occur upon initial power-up of the portable lighting device, or during continued use of the portable lighting device when the MCU determines the battery voltage needs to be conserved.

Figure 4:
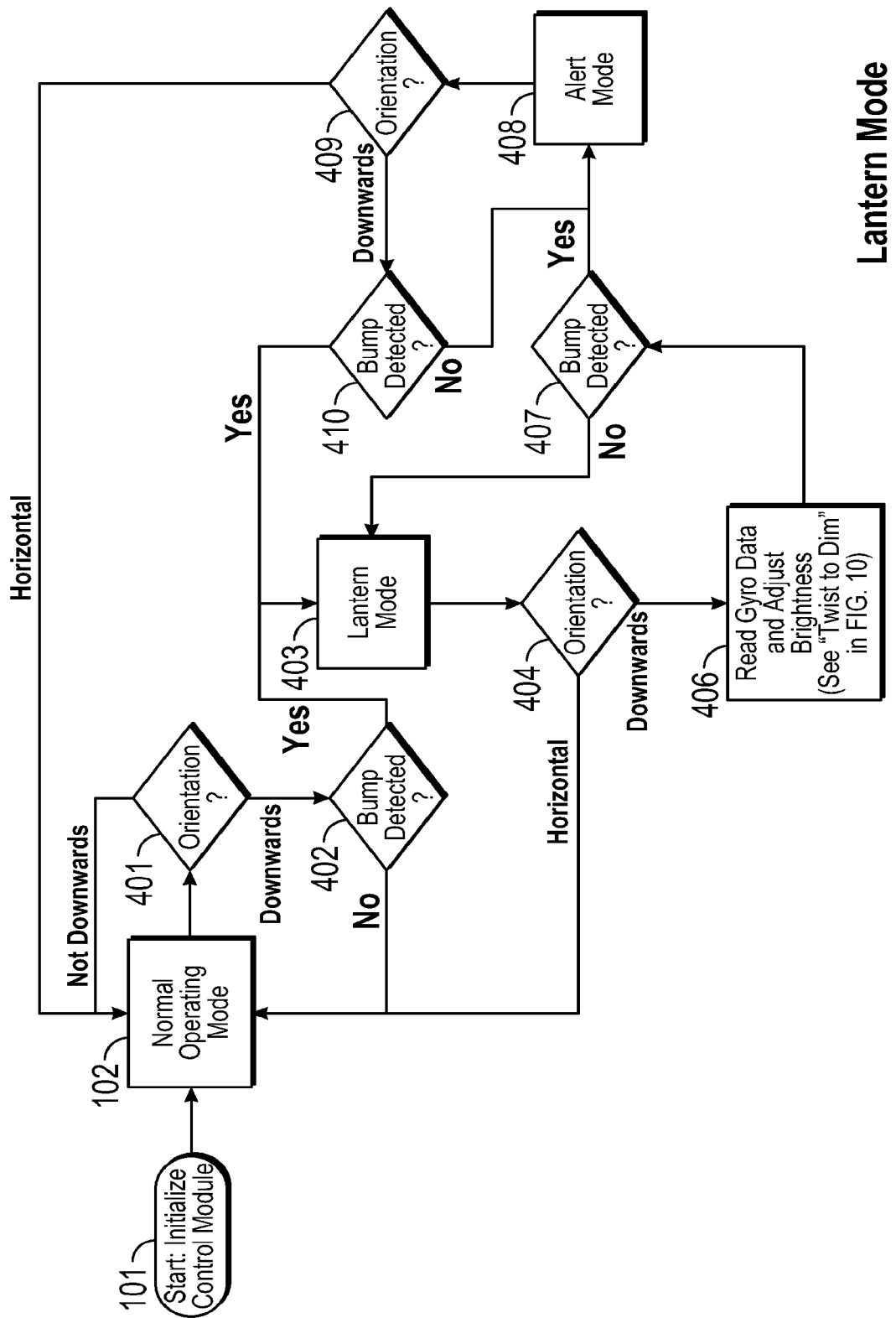
FIG. 4 is a flowchart of an exemplary method of lantern mode feature of the portable light device control module.

FIG. 4 is a technical flow diagram describing one embodiment of the lantern mode feature of the portable light device control module. The method shown in FIG. 4 may be implemented the accelerometer 1105 or accelerometer/gyro 1106 which is in communication with the microcontroller 1104, as described in connection with FIG. 13.

In some situations, a user may desire for the portable light device to automatically enter a lantern mode when the portable lighting device is placed in a downward (facedown) orientation and accelerated downwards at a rapid pace, then a quick, short and abrupt upward force applied upwards, hereafter referred to as a Bump gesture, or a Bump. A Bump gesture is measured by an accelerometer and determined by the MCU as such. The Bump gesture generates first a trough and a subsequent crest value captured by the accelerometer and transmitted to the MCU for analysis. Additionally, the user may desire to transition from lantern mode (white lantern light) to alert mode (red blinking lantern light), or vice versa, by applying a subsequent Bump gesture. Also, the ability to quickly exit the lantern mode by applying a simply holding the portable lighting device in a horizontal orientation.

Figure 5:
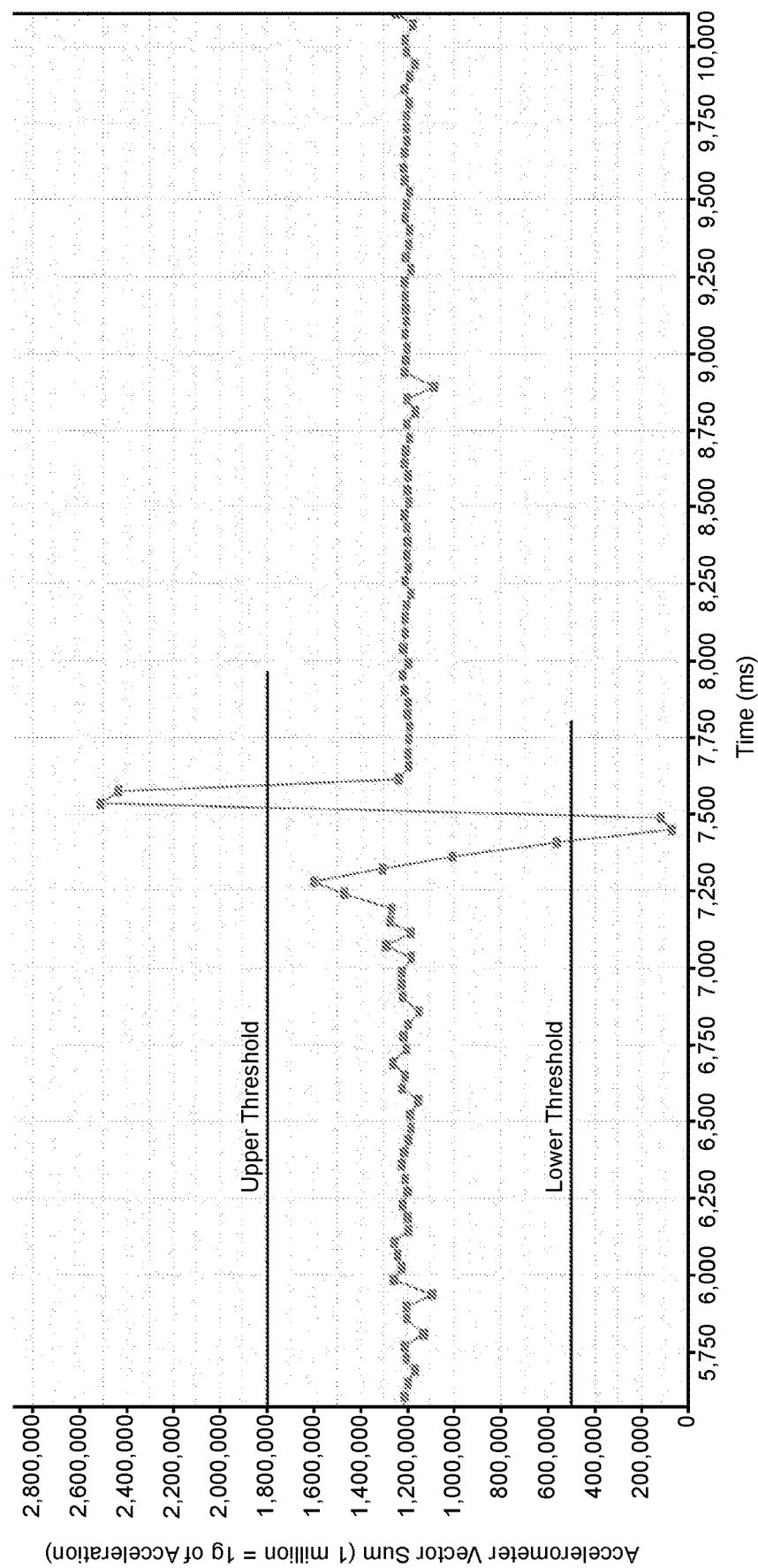
FIG. 5 is a graphical illustration showing an example representation of the Bump gesture measured by an accelerometer.

FIG. 5 illustrates the visual representation of the Bump gesture measured by an accelerometer in a wave cycle having a first trough and a subsequent crest value captured by the accelerometer and transmitted to the MCU for analysis. As shown in FIG. 5, the x-axis is time in milliseconds, and the y-axis is the numerical value of the accelerometer vector sum, wherein 1000000 (1 million) corresponds to 1 g of acceleration.

One non-limiting advantage of the lantern features is the ability have a dual-usage portable lighting device that operates as a flashlight and also as a lantern. In one embodiment, the lantern mode may be entered by orienting the portable lighting device in a downward facing position and applying a Bump gesture. The portable lighting device may exit lantern mode by orienting the portable lighting device in a horizontal position. Additionally, the brightness of the lantern mode may be adjusted using a twist to dim feature discussed in FIG. 12A.

The Lantern Operation as discussed in FIG. 4 of the portable lighting device has two separate modes: Lantern Mode and Alert Mode. Lantern Mode emits a white light out of the body of the portable lighting device and enables the user to dim this light by twisting the flashlight in the downwards position. The Alert Mode blinks a red light out of the body of the flashlight. In either of these modes, if the flashlight is downwards it checks for a bump, as described earlier. If a bump is detected in Lantern Mode, then the MCU transitions to Alert Mode. Likewise, if a bump is detected in Alert Mode then the MCU transitions to Lantern Mode. Also, in either mode, if the flashlight is (1) oriented horizontally, then the MCU will exit Lantern Operation and return to its Normal Operating mode wherein the Front-End LED's are turned-on, and the Back-End LED's are turned-off.

In block 101, Start: Initialize Control Module indicates the start of the method or process. In block 102, the Normal Operating Mode is presumed. Alternative Operating Modes are configured into the portable lighting device, which will be discussed in turn. In one embodiment, the Normal Operating Mode may be achieved upon power-on startup procedures of the portable lighting device or it may be achieved by intentionally navigating to this operating mode by applying differing users gestures available. After Normal Operating Mode is achieved, the process may continue to decision block 401.

In decision block 401, the motion sensor determines the orientation of the portable lighting device. If the orientation is not downward, then no changes occur, and the process returns to block 102. If the orientation is detected by the motion sensor to be downwards, then the process continues to decision block 402.

In block 402, the motion sensor transmits its readings to the MCU 1104; wherein the MCU determine if a Bump has been detected. If the MCU determines that no Bump is detected, then the process returns to block 102, Normal Operating Mode. If the MCU 1104 determine that a bump is detected by comparing the vector sum of the three accelerometer axes received with the pre-programmed thresholds stored in the MCU 1104, then the process progresses to block 403.

In block 403, the portable lighting device is in Lantern Mode. After the device has achieved Lantern Mode, then the process continues with decision block 404. In decision block 404, the motion sensor will determine the orientation of the portable lighting device. If the orientation is horizontal, then the process returns to block 102. If the orientation is downward, then the process continues to block 406.

In block 406, the user is permitted to adjust the brightness of lantern by twisting the portable lighting device either right or left while the device is in a downward (facedown) orientation to instantaneously adjust the light intensity (brightness) of the lantern LED's. In block 407, if a subsequent bump is not detected by the MCU due to receiving readings from the motion sensor that are insufficient to meet a threshold value stored in the MCU for a Bump gesture to be determined, then the process returns to block 403, Lantern Mode. In block 407, if a subsequent Bump is detected (regardless of orientation) by the MCU due to receiving readings from a motion sensor that meets the threshold values stored in the MCU for a Bump gesture, then the process continues to block 408.

In block 408, Alert Mode, the Back-End LED's blink a different color to indicate a different mode of operation. In one embodiment, the Lantern Mode may be a solid white light color, whereas the Alert Mode may be a blinking red light color. Once in block 408, the process continues to decision block 409 to determine when and if the orientation of the portable lighting device is changed. In block 409, the accelerometer determines the orientation of the portable lighting device. If it's determined that the portable lighting device orientation is downwards, then the process continues to decision block 410.

In block 410, a Bump is detected wherein the vector sum of the three accelerometer axes reaches thresholds programmed into the MCU. If a Bump is detected in Alert Mode, then the MCU transitions to Lantern Mode, therefore the process returns to block 403. If a bump is not detected in Alert Mode, then the MCU does not transition to Lantern Mode, therefore the process returns to block 408.

In block 409, If it's determined that the portable lighting device orientation is horizontal orientation, then the MCU transitions to Normal Operating Mode and discontinue of Lantern Mode or Alert Mode.

Figure 6:
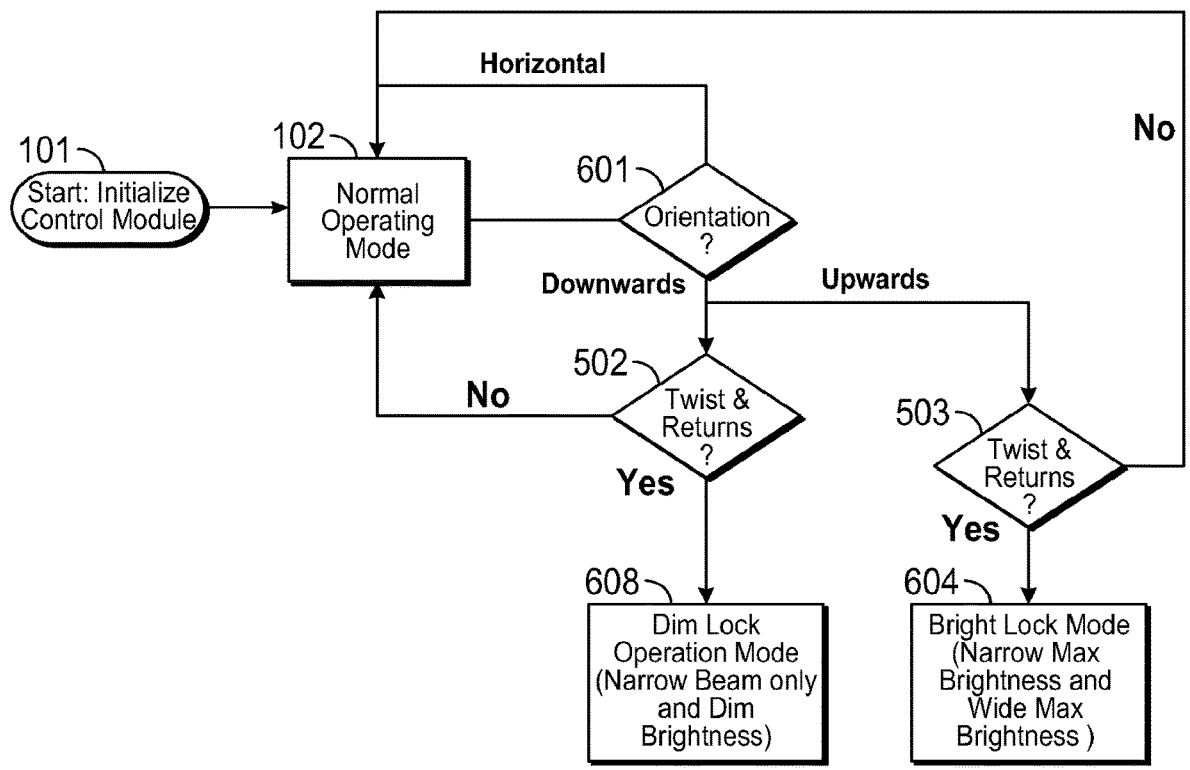
FIG. 6 is a flowchart of an exemplary method of lock beams entering with a twist feature of the portable lighting device control module.

FIG. 6 is a technical flow diagram an embodiment of the lock beams entering with a twist feature of the portable lighting device control module. The method shown in FIG. 6 may be implemented by integrating an accelerometer 1106, timer (not shown), microcontroller 1104, and LEDs. as shown in FIGS. 13-17.

Figure 11A:
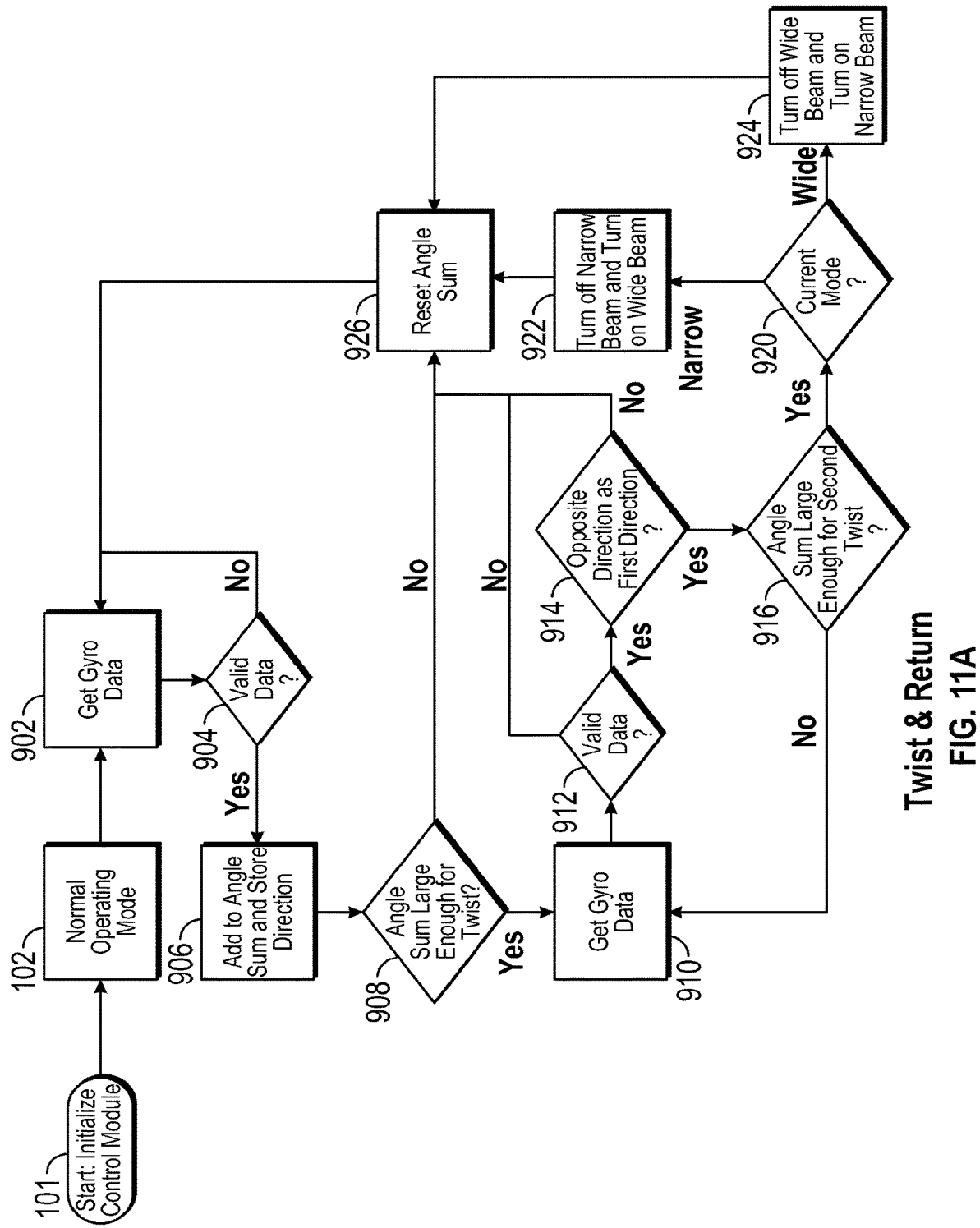
FIG. 11A is a flowchart of an exemplary method of twist and return feature of the portable lighting device.

In some situations, a user may desire for the portable light device to automatically enter a certain mode by simply orienting the lighting device in a certain orientation and performing a twist and return gesture, as explained in FIG. 11A. In one embodiment, a user may direct the lighting device in an upward facing orientation and subsequently perform a twist and return gesture, as explained in FIGS. 11A, 11B, 11C, and a Bright Lock Mode (i.e. Narrow Full Brightness and Wide Full Brightness) will automatically be initiated, wherein the user cannot exit this Bright Lock Mode unless an Exit Gesture is performed. In another embodiment, a user may direct the lighting device in a downward facing orientation and subsequently perform a twist and return gesture, as explained in FIGS. 11A, 11B, 11C, and a Dim Lock Operation Mode (Narrow Beam Only and Dim Brightness) will automatically be initiated, wherein the user cannot exit the Dim Lock Operation Mode unless an Exit Gesture is performed.

One non-limiting advantage of the portable lighting device control module is the ability to maintain a certain setting, essentially lock a setting into configuration, by simply pointing upwards and performing a twist and return gesture in order to lock in Bright Lock Mode or pointing downward and performing a twist and return gesture in order to lock in Dim Lock Mode.

In one embodiment, the logic may be carried out by microcontroller (MCU) wherein if MCU detects that the flashlight is pointed up, which is indicated by a maximum positive reading of Az. Thereafter, the MCU determines if a twist and return gesture has been performed. If a twist and return gesture is found to have been performed, then the MCU turns both LEDs on at full brightness. This state is held by the MCU until a subsequent twist and return gesture or whip gesture is detected.

In another embodiment, the logic may be carried out by microcontroller (MCU) wherein if MCU detects that the flashlight is pointed down, which is indicated by a maximum negative reading of Az. Thereafter, the MCU determines if a twist and return gesture has been performed. If a twist and return gesture is found to have been performed, then the MCU initiates Dim Lock Mode. This state is held by the MCU until a subsequent twist and return gesture or whip gesture is detected in order to exit a preconfigured locked mode.

There may be at least 2 "Lock Beam" modes of operation for the flashlight: Bright Lock mode and Dim Lock mode. Bright Lock mode is defined by maximum brightness on both Narrow and Wide LEDs. Dim Lock mode is defined by the Narrow beam only in its minimum brightness setting. In both of these settings, timeout is disabled (see below for an exception to this rule).

In block 101, Start: Initialize Control Module indicates the start of the method or process. In block 102, the Normal Operating Mode is presumed. Alternative Operating Modes are configured into the portable lighting device, which will be discussed in turn. In one embodiment, the Normal Operating Mode may be achieved upon power-on startup procedures of the portable lighting device or it may be achieved by intentionally navigating to this operating mode by applying differing users gestures available. After Normal Operating Mode is achieved, the process may continue to decision block 601.

In decision block 601, the accelerometer 1105 or accelerometer/gyro 1106 reads 3D axis information and provides these readings to the MCU which determines orientation of the portable lighting device. If the orientation is determined to be downwards, then the process continues to decision block 502. In decision block 502, the microcontroller 1104 determines if a twist and return gesture, as explained in FIGS. 11A, 11B, 11C, has been performed. If the twist and return gesture is not performed, then the process returns to block 102. If twist and return gesture is performed, then the process continues to process block 608. In process block 608, the portable lighting device enters a Dim Lock Operation Mode wherein the lighting is limited to Narrow Beam Only and Dim Brightness.

Figure 11B:
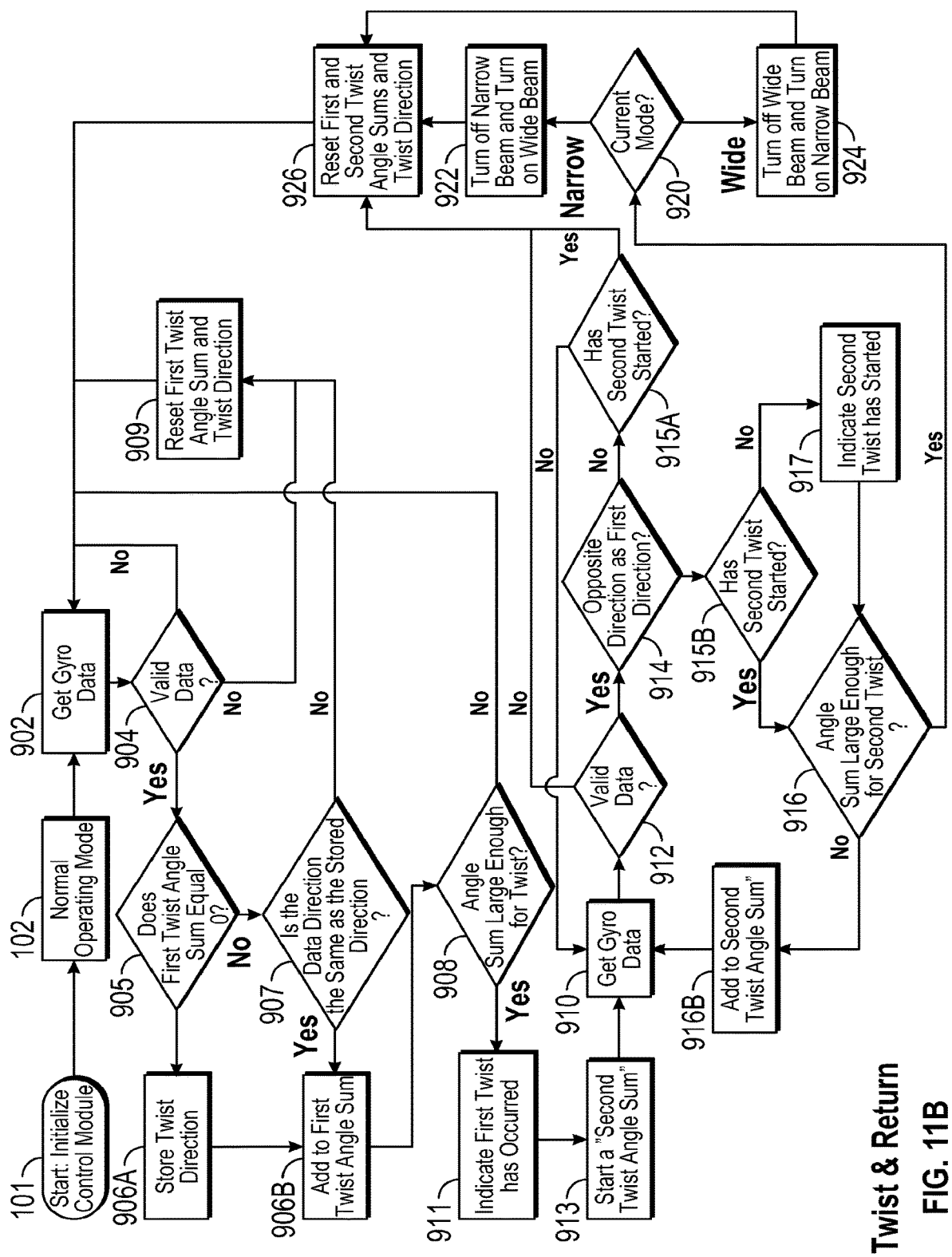
FIG. 11B is a flowchart of an exemplary method of twist and return feature of the portable lighting device.

In decision block 601, the accelerometer 1105 or accelerometer/gyro 1106 determines the orientation of the portable lighting device. If the orientation is determined to be upwards, then the process continues to decision block 503. In decision block 503, If a twist and return gesture, as, as explained in FIGS. 11A, 11B, 11C, is not detected, then the process returns to block 102. If a twist and return gesture is detected, then the process continues to process block 604. In process block 604, the portable lighting device enters a Bright Lock Mode wherein the lighting may be set to Narrow Full Brightness and Wide Full Brightness.

Figure 7:
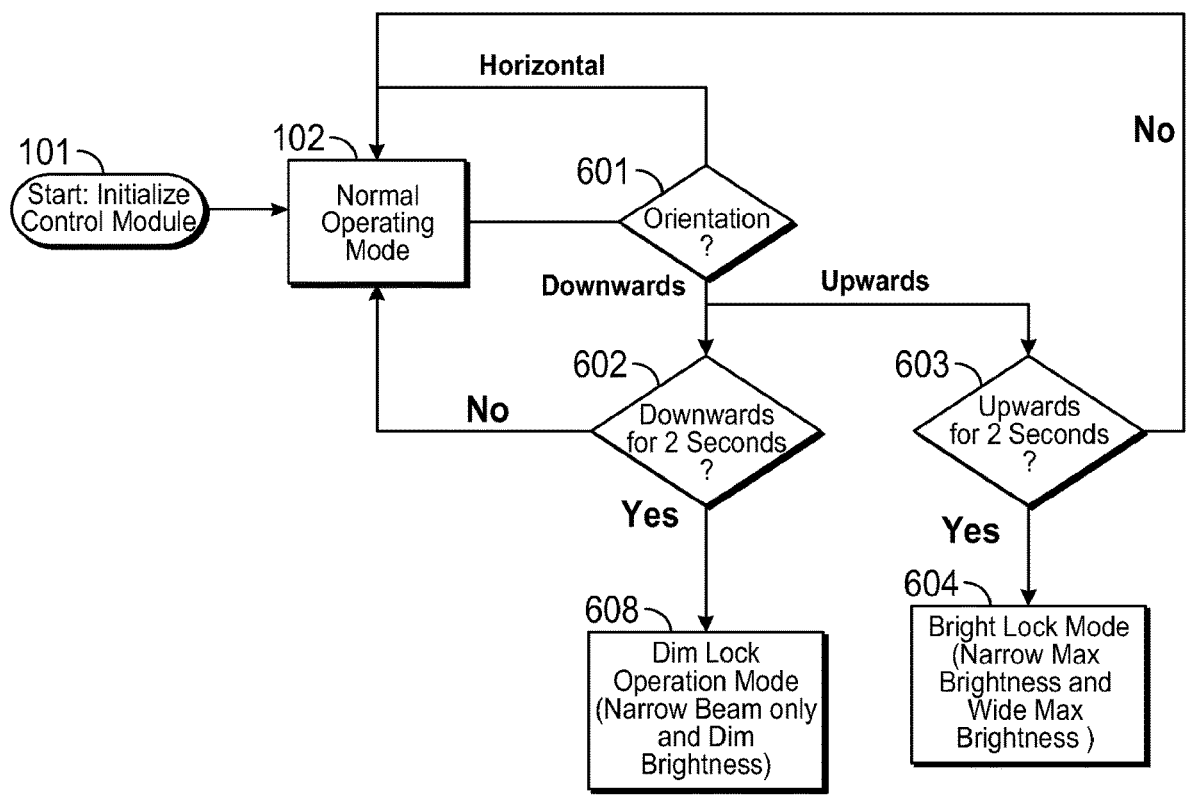
FIG. 7 is a flowchart of an exemplary method of lock beams entering feature of the portable lighting device control module.

FIG. 7 is a technical flow diagram an embodiment of the lock beams entering feature of the portable lighting device control module. The method shown in FIG. 7 may be implemented by integrating an accelerometer 1106, timer (not shown), microcontroller 1104, and LEDs. as shown in FIGS. 13-17.

In some situations, a user may desire for the portable light device to automatically enter a certain mode by simply orienting the lighting device in a certain orientation. In one embodiment, a user may direct the lighting device in an upward facing orientation for a specified amount of time and a Bright Lock Mode (i.e. Narrow Full Brightness and Wide Full Brightness) will automatically be initiated, wherein the user cannot exit this Bright Lock Mode unless an Exit Gesture is performed. In another embodiment, a user may direct the lighting device in a downward facing orientation for a specified amount of time and a Dim Lock Operation Mode (Narrow Beam Only and Dim Brightness) will automatically be initiated, wherein the user cannot exit the Dim Lock Operation Mode unless an Exit Gesture is performed.

One non-limiting advantage of the portable lighting device control module is the ability to maintain a certain setting, essentially lock a setting into configuration, by simply pointing upwards for certain amount of time (for example, 2 seconds) in order to lock in Bright Lock Mode or pointing downward for certain amount of time (for example, 2 seconds) in order to lock in Dim Lock Mode.

In one embodiment, the logic may be carried out by microcontroller (MCU) wherein if MCU detects that the flashlight is pointed up, which is indicated by a maximum positive reading of Az, then the MCU begins a timer. As long as the MCU keeps detecting that Az is above a certain "up threshold" (0.85 to be specific) the MCU keeps incrementing this timer. Once the timer reaches a value (120), which is between 1 and 2 seconds, the MCU turns both LEDs on at full brightness. This state is held by the MCU until a "twist and return" gesture or "whip" gesture is detected.

There may be at least 2 "Lock Beam" modes of operation for the flashlight: Bright Lock mode and Dim Lock mode. Bright Lock mode is defined by maximum brightness on both Narrow and Wide LEDs. Dim Lock mode is defined by the Narrow beam only in its minimum brightness setting. In both of these settings, timeout is disabled (see below for an exception to this rule). In one embodiment, to enter Bright Lock mode, the flashlight must be held upwards for approximately 2 seconds. In another embodiment, to enter Dim Lock mode, the flashlight must be held downwards for approximately 2 seconds.

In block 101, Start: Initialize Control Module indicates the start of the method or process. In block 102, the Normal Operating Mode is presumed. Alternative Operating Modes are configured into the portable lighting device, which will be discussed in turn. In one embodiment, the Normal Operating Mode may be achieved upon power-on startup procedures of the portable lighting device or it may be achieved by intentionally navigating to this operating mode by applying differing users gestures available. After Normal Operating Mode is achieved, the process may continue to decision block 601.

In decision block 601, the accelerometer 1105 or accelerometer/gyro 1106 reads 3D axis information and provides these readings to the MCU which determines orientation of the portable lighting device. If the orientation is determined to be downwards, then the process continues to decision block 602. In decision block 602, the microcontroller 1104 determines if the downward orientation is maintained by the portable lighting device for a specified amount of time (i.e. 2 seconds). If the downward orientation is not maintained for the specified time period, then the process returns to block 102. If the downward orientation is maintained for the specified time period, then the process continues to process block 608. In process block 608, the portable lighting device enters a Dim Lock Operation Mode wherein the lighting is limited to Narrow Beam Only and Dim Brightness.

In decision block 601, the accelerometer 1105 or accelerometer/gyro 1106 determines the orientation of the portable lighting device. If the orientation is determined to be upwards, then the process continues to decision block 603. In decision block 603, the microcontroller 1104 determines if the upward orientation is maintained by the portable lighting device for a specified amount of time (i.e. 2 seconds). If the upward orientation is not maintained for the specified time period, then the process returns to block 102. If the upward orientation is maintained for the specified time period, then the process continues to process block 604. In process block 604, the portable lighting device enters a Bright Lock Mode wherein the lighting may be set to Narrow Full Brightness and Wide Full Brightness.

Figure 8:
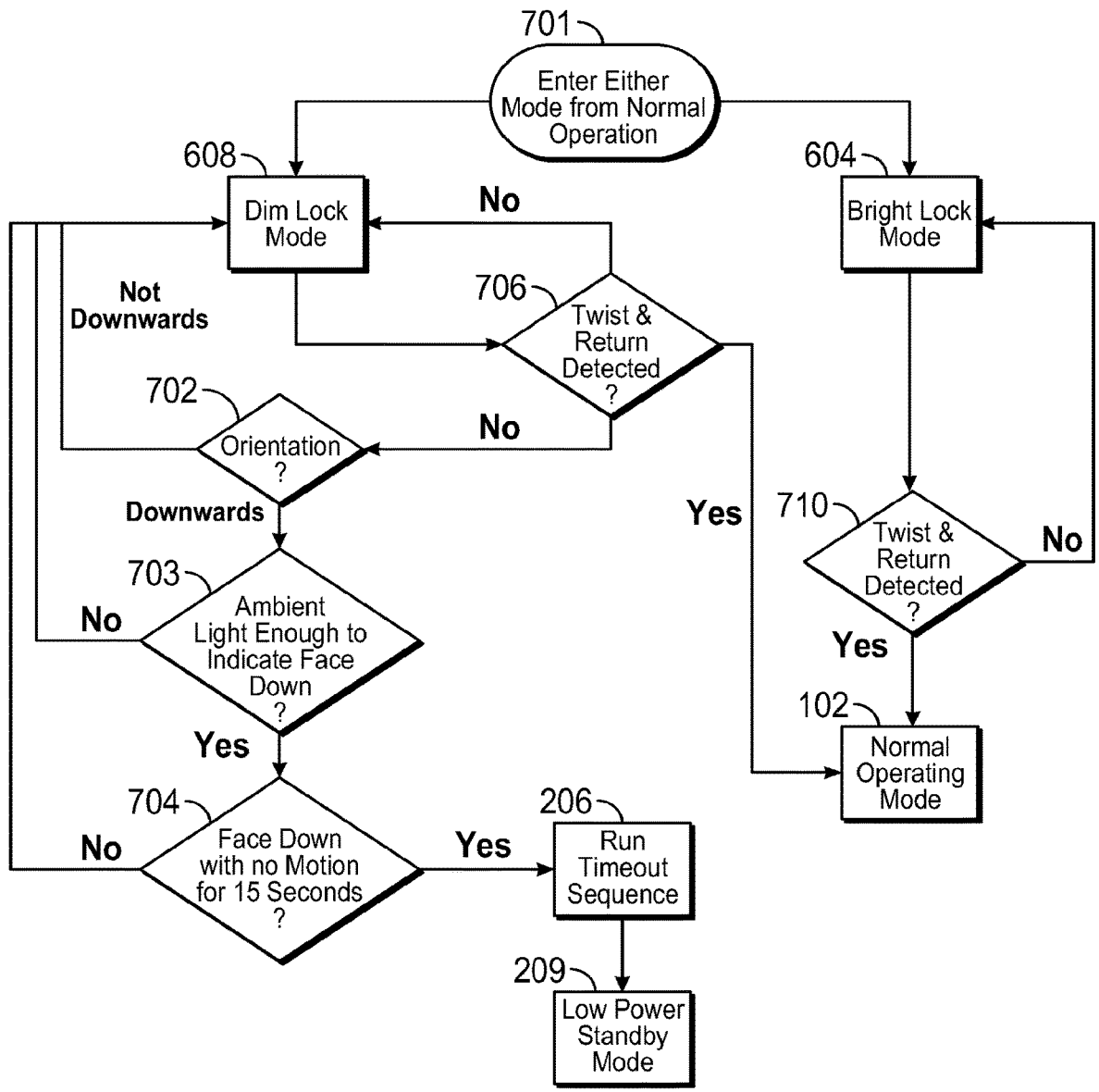
FIG. 8 is a flowchart of an exemplary method of lock beams operation and exiting feature using an accelerometer and gyroscopic sensor integrated into the portable lighting device control module.

In FIG. 8 is a technical flow diagram describing the lock beams operation and exiting feature using an accelerometer 1105 and accelerometer/gyroscopic sensor 1106 integrated into the portable lighting device control module. The method shown in FIG. 7 may be implemented by integrating an accelerometer 1106, accelerometer/gyroscopic sensor 1106, the gyroscopic sensor (not shown), ambient light sensor, microcontroller, time, power supply and LEDs, as described in connection with FIGS. 13-17.

One none-limiting advantage of the lock beams exiting features is that to exit a Dim Lock Mode or Bright Lock Mode, the user may maintain the lighting device in a non-downwards orientation, and perform a twist gesture to return to Normal Operating Mode.

In Dim Lock mode, the flashlight first detects orientation. If the orientation is upwards, the flashlight remains in Dim Lock mode. If a Twist and Return is detected in a horizontal orientation, the device moves back to Normal Operating Mode. If no twist is detected, the device remains in Dim Lock mode. This operating behavior is identical for the Bright Lock mode. For Bright Lock mode, a downwards orientation also causes the flashlight to remain in Bright Lock mode. The exception mentioned above: In Dim Lock mode, if the orientation is downwards, the device will read the ambient light sensor voltage with the ADC. If the value is at or above the threshold set to detect that the device is face down, it will allow the timeout to occur. If this reading is maintained without motion for 15 seconds, then the timeout process is started. If the device is oriented downwards, but the ADC reading is not enough to indicate the device is face down, then the device remains in Dim Lock mode and no timeout is allowed.

In one embodiment of the twist gesture capability of the adaptive flashlight control module, a user may hold a flashlight, in any position, while pointing at a target and twist his wrist between 0 to 90 degrees to allow the gyroscopic sensor (not shown) to measure the twist, and the control module will be able send a signal from the gyroscopic sensor (not shown) to the microcontroller 1104 and to the LED(s) in order to adjust light intensity or switch from wide beam to narrow beam, or from narrow beam to wide beam. In a sense, a user may be able to adjust the light beam directed at a target at any position or angle in a more instinctive manner using a one-handed twist gesture. In another embodiment of the disclosure, the user may only perform the twist gesture while the flashlight is in a horizontal position pointing towards a target. In yet another embodiment of the disclosure, a user may twist the flashlight in one direction at a minimum degree angle and then twist the flashlight back in the opposite direction in order to change the beam from wide to narrow, or narrow to wide while the flashlight is held in any position pointed at a target. For the control module to operate properly, the user may be required to wait a predetermined amount of time, generally, a split second in between consecutive twist gestures. Moreover, in the disclosure related to the requirement of a first and second gesture to adjust beams, in order for the control module to determine to record a first twist and a second twist request, the user may be required to perform both gesture in a reasonable amount of time, typically between a half of a second to a second, between these two gestures. In another embodiment of the disclosure, the twist gesture may be limited to switch the beams while the device is oriented in a horizontal position, and that if the flashlight is oriented in downward or upward position, then the twist gesture request will be disregarded by the control module. The adaptive flashlight control modules may require at least two seconds after the flashlight module is powered up to accept twist gesture requests from the user.

In one embodiment of the disclosure, orientation of the flashlight may be determined using an accelerometer 1105. Orientation is determined by the amount of force on the Az vector. Since Az points along the axis of the flashlight, it can be used to determine the orientation of the flashlight. When the device is not moving, only the force of gravity will act upon it. The accelerometer has been calibrated so that if the force of gravity is in parallel with one of its axes, it reads 1 or −1 on that axis and zero on all other axes. So, depending on what value between −1 and one that is read on the Az axis, the MCU 1104 can determine what direction the accelerometer 1105, and thus the entire flashlight, is facing.

The process begins at block 701. In block 701, the lighting device may exhibit either a Dim Lock Mode or a Bright Lock Mode.

In block 608, the lighting device is identified to be in Dim Lock Mode. After the mode is determined, then the process continues to decision block 706.

In block 706, the motion sensors read in data values and transmits these data values to the microcontroller, the microcontroller analyzes the data values provided by the motion sensors to determine if the movement detected is a Twist & Return gesture. A Twist & Return gesture is a user-initiated gesture, where the portable lighting device is pointed forward while horizontal using one hand, and is then twisted downwards by the same hand in either a right or left direction by the user up to 180 degrees of movement. A Twist & Return gesture is explained in FIGS. 11A, 11B, and 11C. If it's determined by the MCU that a Twist & Return gesture did not occur, then the attempted twist gesture is ignored, as if it did not occur, and the process progresses to decision block 702. If a twist gesture is recognized by the microcontroller, then the process continues to block 102, wherein the device is adjusted to Normal Operating Mode.

In decision block 702, the accelerometer 1105 or accelerometer/gyro 1106 measures acceleration and transmits these measurements to microcontroller 1104 to determine the orientation of the device. If the orientation is determined to be downwards facing, then the process continues to decision block 703. If the orientation is determined to be non-downward, then the process returns to block 608, Dim Lock Mode.

In block 703, the orientation is determined to be downward, and the ambient light sensor monitors 1110 the bounce back value (i.e. reflected light value) of the device and the microcontroller 1104 reads this bounce back value with its ADC to determine if the reflected light value received indicates a facedown configuration. If the reflected light value received does not indicate a facedown configuration, then the process returns to block 608, Dim Lock Mode. If the reflected light value received does indicate a facedown configuration, then the process continues to decision block 704.

In decision block 704, the microcontroller 1104 determines if there has been no-movement for a specific amount of time (i.e. 15 seconds). If there is movement, then the device returns to block 608, Dim Lock Mode is maintained. If the microcontroller 1104 determines that there has been no-movement for a specified duration, then the Run Timeout Sequence 206 is initiated.

In block 206, the Run Timeout Sequence is initiated which allows the device to blink for a few seconds to warn the user of impending Low Power Standby Mode if ignored. If the warnings given by the device are not responded to by the user, the device will enter block 209, a Low Power Standby Mode. In order to avoid continuing to Low Power Standby Mode, the user may perform a variety of gestures to keep the device powered on, including but not limited to, (1) pick up the device and start to use it, (2) pick up the device and maintain a horizontal position, (3) pick up the device and perform a Twist & Return gesture in the horizontal orientation, (4) pick up the device and perform a pointed up gesture to enable "Bright Mode", and (5) pick up the device and perform a pointed down gesture to enable the "Dim Mode".

In block 604, the lighting device is identified to be in Bright Lock Mode. After the mode is determined, then the process continues to decision block 710.

In block 710, the microcontroller 1104 determines if a Twist & Return gesture has been detected. Once the Twist & Return gesture is recognized by the microcontroller 1104, then the process continues to block 102, wherein the device is adjusted to Normal Operating Mode.

Figure 9:
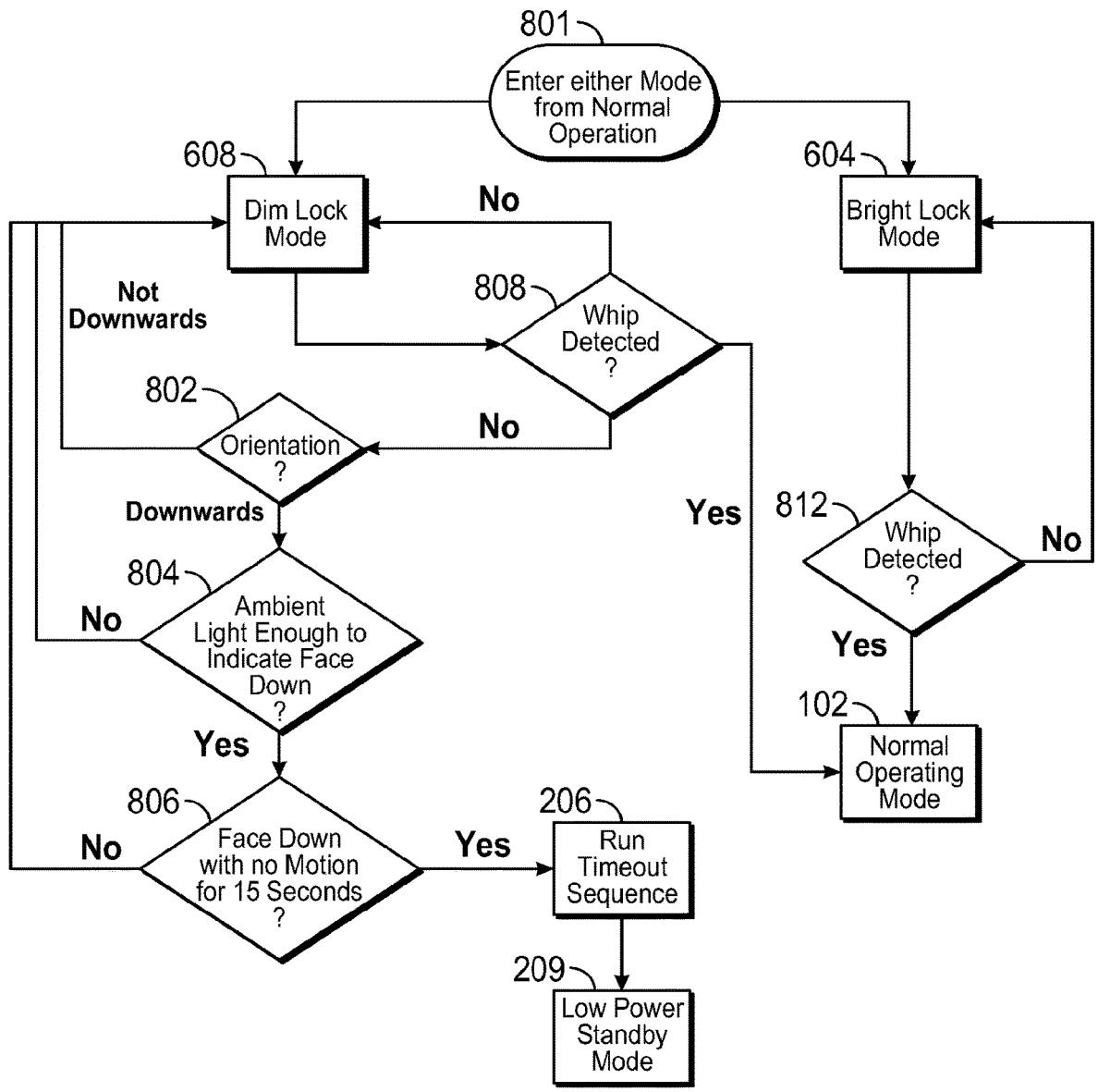
FIG. 9 is a flowchart of an exemplary method of lock beams operation and exiting feature using an accelerometer integrated into the portable lighting device control module.

FIG. 9 is a technical flow diagram describing the lock beams operation and exiting feature using an accelerometer integrated into the portable lighting device control module. The method shown in FIG. 9 may be implemented by integrating an accelerometer 1105, ambient light sensor 1110, microcontroller 1104, the timer inside the microcontroller (not shown), power supply (VBATT 1102, VMCU 1101) and LEDs, as described in connection with FIGS. 13-17.

One none-limiting advantage of the lock beams exiting features is that to exit a Dim Lock Mode or Bright Lock Mode, the user may whip the flashlight to return to Normal Operating Mode.

The process begins at block 801. In block 801, the lighting device may exhibit either a Dim Lock Mode or a Bright Lock Mode.

In block 608, the lighting device is identified to be in Dim Lock Mode. After the mode is determined, then the process continues to decision block 808.

In block 808, the motion sensors read in data values and transmit these data values to the microcontroller 1104, the microcontroller 1104 analyzes the data values provided by the accelerometer 1105 to determine if the movement detected is a Whip gesture. A Whip gesture is a user gesture whereby the user holds the portable lighting device in one hand, applies a steady force and acceleration in a single direction then then an abrupt stop. A Whip gesture is measured by an accelerometer and determined by the MCU as such. The Whip gesture generates a single crest value captured by the accelerometer and transmitted to the MCU for analysis. If it's determined by the MCU that a Whip gesture did not occur, then the attempted Whip gesture is ignored, as if it did not occur, and the process progresses to decision block 802. If a Whip gesture is recognized by the microcontroller, then the process continues to block 102, wherein the device is adjusted to Normal Operating Mode.

Figure 10:
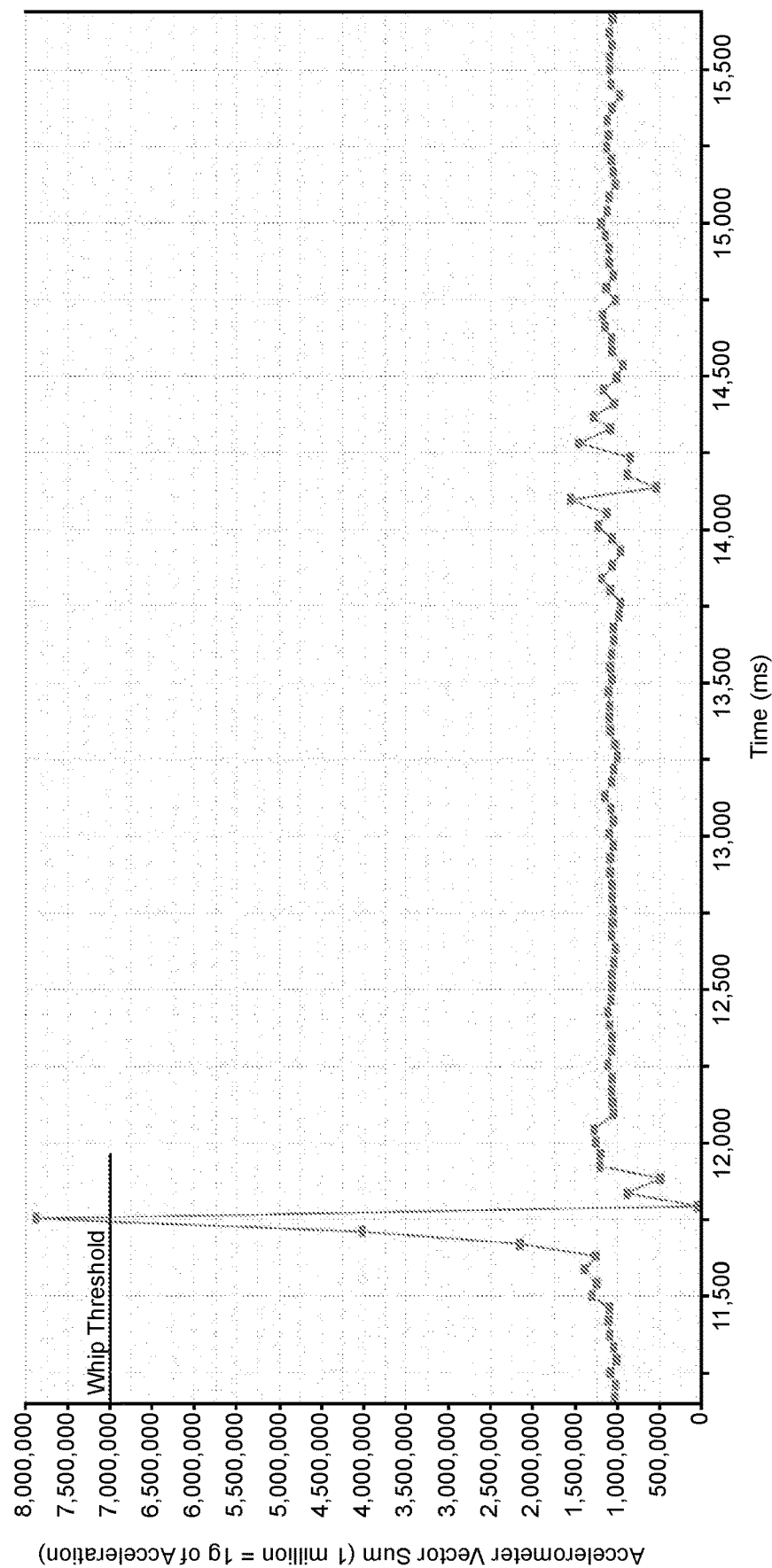
FIG. 10 is a graphical illustration showing an example representation of the Whip gesture measured by an accelerometer.

FIG. 10 illustrates the visual representation of the Whip gesture measured by an accelerometer in a wave cycle having a single crest value captured by the accelerometer and transmitted to the MCU for analysis. As shown in FIG. 10, the x-axis is time in milliseconds, and the y-axis is the numerical value of the accelerometer vector sum, wherein 1,000,000 (1 million) corresponds to 1 g of acceleration.

In decision block 802, the accelerometer measures acceleration and transmits these measurements to microcontroller to determine the orientation of the device. If the orientation is determined to be downwards facing, then the process continues to decision block 804. If the orientation is determined to be non-downward, then the process returns to block 608, Dim Lock Mode.

In block 804, the orientation is determined to be downward, and the ambient light sensor monitors the bounce back value (i.e. reflected light value) of the device and transmits this value to the microcontroller to determine if the reflected light value received indicates a facedown configuration. If the reflected light value received does not indicate a facedown configuration, then the process returns to block 608, Dim Lock Mode. If the reflected light value received does indicate a facedown configuration, then the process continues to decision block 806.

In decision block 806, the microcontroller determines if there has been no-movement for a specific amount of time (i.e. 15 seconds). If there is movement, then the device returns to block 608, Dim Lock Mode is maintained. If the microcontroller determines that there has been no-movement for a specified duration, then the Run Timeout Sequence 206 is initiated.

In block 206, the Run Timeout Sequence is initiated which allows the device to blink for a few seconds to warn the user of impending Low Power Standby Mode if ignored. If the warnings given by the device are not responded to by the user, the device will enter block 209, a Low Power Standby Mode. In order to avoid continuing to Low Power Standby Mode, the user may perform a variety of gestures to keep the device powered on, including but not limited to, (1) pick up the device and start to use it, (2) pick up the device and maintain a horizontal position, (3) pick up the device and perform a twist & return gesture in the horizontal orientation, (4) pick up the device and perform a pointed up gesture to enable "Bright Mode", and (5) pick up the device and perform a pointed down gesture to enable the "Dim Mode".

In block 604, the lighting device is identified to be in Bright Lock Mode. After the mode is determined, then the process continues to decision block 812.

In block 812, the microcontroller determines if a Whip gesture has been detected. Once the Whip gesture is recognized by the microcontroller, then the process continues to block 102, wherein the device is adjusted to Normal Operating Mode.

FIG. 11A is a technical flow diagram describing an embodiment of the twist and return feature of the portable lighting device. The method shown in FIG. 11A may be implemented by integrating gyroscopic sensor in communication with a microcontroller, as described in connection with FIGS. 13-17. Optionally, the twist and return feature of the portable lighting device may be implemented by integrating an accelerometer 1105 or accelerometer/gyro 1106, or gyroscopic sensor (not shown), and a microcontroller as described in FIGS. 13-17.

In some instances, the user would desire to use a one-handed Twist and Return gesture to adjust between differing modes within a portable lighting device.

The Twist and Return feature uses the gyroscope to detect if the device has twisted in either direction and returned to its approximate original orientation. This Twist and Return gesture can occur from any mode of operation if enabled; FIG. 11A describes the most frequent use case which occurs in Normal Operating Mode. In normal mode, the gyroscope data is read, and if that value is valid (it is above a certain minimum threshold and below a maximum threshold), then the device calculates an angle with that gyro data and adds it to the angle sum. The direction of this first angle is also stored as the twists first direction. If the gyro continues to receive data that indicates the twist is continuing in the same direction, it will continue to add those angles to the angle sum. If the angle is ever in the reverse direction, then the angle sum is reset. If the angle sum is ever above the threshold needed to count as a twist, then the device will enter a state where it knows the first twist has been detected. Once in this "second twist" state, the flashlight will allow the user to continue twisting the flashlight in the first twist direction until it comes to a stop. Once a stop is detected (i.e. lack of valid gyro data) then the device sets a timer. If this timer expires before a new valid angle indicates a twist in the opposite direction of the first twist direction, then the device returns to its normal operating state and resets the angle sum and the twist direction. If a valid angle is detected in the opposite direction of the first twist direction, the microcontroller starts a new sum and begins adding the gyro angles to it. If this second sum ever reaches the threshold necessary to count as a return twist, then the device switches modes (Wide→Narrow or Narrow→Wide) and returns to Normal Operation with all variables reset.

In one embodiment, the Microcontroller (MCU) uses the reading from a gyroscope and multiplies it by the sample rate to obtain the amount of degrees twisted by the user. As long as the gyroscope continues to read a twist above 60 degrees per second, the MCU keeps adding up the gyroscope readings. If the sum of these readings ever exceeds 30 degrees, then the MCU counts this as its first twist. Once the first twist has been detected, the MCU waits for a reading from the gyroscope indicating a twist in the opposite direction of the first. If this "opposite" twist is received, the total number of degrees is stored as the total first twist sum. The MCU then begins storing the opposite twist values in a new sum. If the sum of these opposite readings ever exceeds 75% of the total first twist sum, the MCU detects this as a second twist and adjusts the beam setting. In one embodiment related to beam adjustment during a twist gesture, once the second twist has been detected, the MCU may read the orientation of the device. If the orientation of the device is "horizontal," "diagonal," "downward," "upward" then the MCU switches the beam from a first setting to a preconfigured second beam setting depending on the orientation of the device.

In block 101, Start: Initialize Control Module indicates the start of the method or process. In block 102, the Normal Operating Mode is presumed. Alternative Operating Modes are configured into the portable lighting device, which will be discussed in turn. In one embodiment, the Normal Operating Mode may be achieved upon power-on startup procedures of the portable lighting device or it may be achieved by intentionally navigating to this operating mode by applying differing users gestures available. After Normal Operating Mode is achieved, the process may continue to process block 902.

In block 902, the gyroscopic sensor monitors and measures rotational data, provides these measurements to the microcontroller, and the process continues to decision block 904. In decision block 904, the microcontroller determines if the measurements provided by the gyroscopic sensor are within a valid range stored within the MCU. If the measurements provided are deemed valid, then the process continues to block 906. In block 906, the microcontroller calculates an angle with the provided measurements and adds it to the first angle sum value along with the directional value provided by the gyroscopic sensor. After the first angle sum value and direction is capture, then the process continues to decision block 908. In block 908, the MCU continues to receive data that indicates the twist is continuing in the same direction and continues to increment the first angle sum value until a first angle sum value threshold value has met or exceeded a stored first angle sum value stored in the MCU. At this point, the MCU stores the first angle sum value and is now focused on receiving gyroscopic sensor data related to angular rotation in the opposite direction, thus the process continues to block 910. In block 910, the gyroscopic sensor monitors and measures rotational data, provides these measurements to the microcontroller, and the process continues to decision block 912. In decision block 912, the microcontroller determines if the measurements provided by the gyroscopic sensor are within a valid range stored within the MCU. If the measurements provided are deemed invalid, then the process continues to block 926 to rest the first angle sum value stored in the MCU. If the measurements provided are deemed valid, then the process continues to block 914. In block 914, the MCU parses the gyro data received and determines if the rotation is in fact in the opposite direction as the first angle sum value. If the direction is not in the opposite direction as compared to the first angle rotation, then the first angel sum value is reset and the process proceeds to block 926. If the rotational direction is determined to be in the opposite direction as previously captured, then the process proceeds to decision 916. In block 916 the MCU compares the second angle sum value captured by the gyroscopic sensor for the second twist with the first angle sum value captured by the gyroscopic sensor for the first twist to determine if the second twist has reached the threshold necessary to count as a return twist. If the second angle sum value is determined to reach the threshold necessary to count as a return twist, then the process proceeds to decision block 920. If the second angle sum value is determined to not have reached the threshold necessary to count as a return twist, then the process returns to block 910. In decision 920, the MCU fetches the current mode. If the current mode is Wide Beam, then the process continues to block 924. If the current mode is Narrow Beam, then the process continues to block 922. In block 924, the MCU switches modes and turns off Wide Beam and initiates Narrow Beam. In block 922, the MCU switches modes and turns off Narrow Beam and turns on Wide Beam. After the MCU changes modes, then the process continues to block 926, wherein the Angle Sum Value is reset and the process returns to block 902.

FIG. 11B is a technical flow diagram describing an embodiment of the twist and return feature of the portable lighting device. The method shown in FIG. 11B may be implemented by integrating gyroscopic sensor in communication with a microcontroller, as described in connection with FIGS. 13-17. Optionally, the twist and return feature of the portable lighting device may be implemented by integrating an accelerometer 1105 or accelerometer/gyro 1106, or gyroscopic sensor (not shown), and a microcontroller as described in FIGS. 13-17.

In block 101, Start: Initialize Control Module indicates the start of the method or process. In block 102, the Normal Operating Mode is presumed. Alternative Operating Modes are configured into the portable lighting device, which will be discussed in turn. In one embodiment, the Normal Operating Mode may be achieved upon power-on startup procedures of the portable lighting device or it may be achieved by intentionally navigating to this operating mode by applying differing users gestures available. After Normal Operating Mode is achieved, the process may continue to process block 902.

In block 902, the gyroscopic sensor monitors and measures rotational data, provides these measurements to the microcontroller, and the process continues to decision block 904. In decision block 904, the microcontroller determines if the measurements provided by the gyroscopic sensor are within a valid range stored within the MCU. If the measurements provided are deemed valid, then the process continues to block 905 and if the measurements provided are deemed invalid then the process proceeds to process block 902 and block 909. In block 906, the microcontroller calculates an angle with the provided measurements and adds it to the first angle sum value along with the directional value provided by the gyroscopic sensor. After the first angle sum value and direction is capture, then the process continues to decision block 908. In decision block 905 the microcontroller determines if the first twist angle sum equals zero. If the microcontroller determines that the first angel twist sum equal zero, then the process continues to decision block 907 and if the microcontroller determines that the first angel twist sum does not equal zero, then the process continues to decision block 906A. In decision block 907 the microcontroller determines if the data direction is the same as the stored direction. If the microcontroller determines that the data direction is the same as the stored direction, then the process proceeds to process block 906B and if the microcontroller determines that the data direction is not the same as the stored direction, then the process continues to process block 909. In block 906A the microcontroller stores the twist direction in memory and proceeds to process block 906B. In block 906B the microcontroller adds the twist angle sum value received to the first twist angle sum, and the process proceeds to decision block 908. In block 908, the MCU continues to receive data that indicates the twist is continuing in the same direction and continues to increment the first angle sum value until a first angle sum value threshold value has met or exceeded a stored first angle sum value stored in the MCU. At this point, the MCU stores the first angle sum value (as shown in block 911) and is now focused on receiving gyroscopic sensor data related to angular rotation in the opposite direction (as shown in block 913), thus the process continues to block 910. In block 910, the gyroscopic sensor monitors and measures rotational data, provides these measurements to the microcontroller, and the process continues to decision block 912. In decision block 912, the microcontroller determines if the measurements provided by the gyroscopic sensor are within a valid range stored within the MCU. If the measurements provided are deemed invalid, then the process continues to block 926 to rest the first angle sum value stored in the MCU. If the measurements provided are deemed valid, then the process continues to block 914. In block 914, the MCU parses the gyro data received and determines if the rotation is in fact in the opposite direction as the first angle sum value. If the direction is not in the opposite direction as compared to the first angle rotation, then the MCU determines if the second twist has started as described in block 915A. If the second twist has not started, then the process returns to block 910, but if the second twist has started, but in the same direction as the first direction, then the process proceeds to process block 926 wherein the first and second twist angle sums and twist direction are reset and the process returns to process block 902. If the rotational direction is determined to be in the opposite direction as previously captured, then the process proceeds to decision 915B. In decision block 915B the MCU determines from the gyroscopic data received if a second twist has started. If the second twist has started, then the process proceeds to decision block 916 and if the second twist has not started, then the MCU indicates that a second twist has started (as shown in block 917) and proceeds to decision block 916. In block 916 the MCU compares the second angle sum value captured by the gyroscopic sensor for the second twist with the first angle sum value captured by the gyroscopic sensor for the first twist to determine if the second twist has reached the threshold necessary to count as a return twist. If the second angle sum value is determined to reach the threshold necessary to count as a return twist, then the process proceeds to decision block 920. If the second angle sum value is determined to not have reached the threshold necessary to count as a return twist, then the process continues to process block 916B. In process block 916B, the MCU adds the angle to the second twist angle sum and returns to block 910. In decision 920, the MCU fetches the current mode. If the current mode is Wide Beam, then the process continues to block 924. If the current mode is Narrow Beam, then the process continues to block 922. In block 924, the MCU switches modes and turns off Wide Beam and initiates Narrow Beam. In block 922, the MCU switches modes and turns off Narrow Beam and turns on Wide Beam. After the MCU changes modes, then the process continues to block 926, wherein the first and second twist angle sum value and direction is reset and the process returns to block 902.

In one embodiment of the Twist & Return feature, the MCU (receiving measurements from the accelerometer and/or the gyroscopic sensor) determines that a first angle sum value has been achieved in a first direction by surpassing a first pre-configured angle sum threshold value, then the MCU determines that a second angle sum value has been achieved in a second (opposite) direction by comparing against a second pre-configured angle sum threshold value stored in the MCU, or comparing that the second angle sum value is equal to or greater than the first angle sum value determined by the MCU.

In an alternative embodiment of the Twist & Return feature, the MCU may sum up the (in absolute value) an angle sum and then using the second twist to subtract (in absolute value) from that angle sum. Then, instead of the "Angle sum large enough for second twist" block it would check if the angle sum (shared between the first and second twist) is within a certain threshold of zero.

In yet another alternative embodiment of the Twist & Return feature, the accelerometer values (x, y, z) can be used to calculate a relative position. Then, as the flashlight device moves in a circle, the x, y and z values will change and give a new position. These differences can be used to calculate the angle change seen by the device and interpret it in the ways mentioned to create the twist and return gesture.

FIG. 11C is a more general approach to the Twist to Dim feature, that the process outlined in FIG. 11A or FIG. 11B.

Per FIG. 11C, in block 101, Start: Initialize Control Module indicates the start of the method or process. In block 102, the Normal Operating Mode is presumed. Alternative Operating Modes are configured into the portable lighting device, which will be discussed in turn. In one embodiment, the Normal Operating Mode may be achieved upon power-on startup procedures of the portable lighting device or it may be achieved by intentionally navigating to this operating mode by applying differing users gestures available. After Normal Operating Mode is achieved, the process may continue to process block 902.

In block 902, the gyroscopic sensor monitors and measures rotational data, provides these measurements to the microcontroller, and the process continues to decision block 904. In decision block 904, the microcontroller determines if the measurements provided by the gyroscopic sensor are within a valid range stored within the MCU. If the measurements provided are deemed valid, then the process continues to block 906B and if the microcontroller determines that the data is not valid, then the process continues to process block 909. In block 909, the MCU resets the first twist angle sum and twist direction and returns to process block 902. In block 906B the microcontroller adds the twist angle sum value received to the first twist angle sum, and the process proceeds to decision block 908. In block 908, the MCU continues to receive data that indicates the twist is continuing in the same direction and continues to increment the first angle sum value until a first angle sum value threshold value has met or exceeded a stored first angle sum value stored in the MCU. At this point, the MCU stores the first angle sum value (as shown in block 911) and is now focused on receiving gyroscopic sensor data related to angular rotation in the opposite direction (as shown in block 913), thus the process continues to block 910. In block 910, the gyroscopic sensor monitors and measures rotational data, provides these measurements to the microcontroller, and the process continues to decision block 912. In decision block 912, the microcontroller determines if the measurements provided by the gyroscopic sensor are within a valid range stored within the MCU. If the measurements provided are deemed invalid, then the process continues to block 923 to rest the first angle sum value stored in the MCU. If the measurements provided are deemed valid, then the process continues to block 916, if the values are deemed invalid then the process proceeds to process block 926 wherein the MCU resets all twist and return parameters. In block 916 the MCU compares the second angle sum value captured by the gyroscopic sensor for the second twist with the first angle sum value captured by the gyroscopic sensor for the first twist to determine if the second twist has reached the threshold necessary to count as a return twist. If the second angle sum value is determined to reach the threshold necessary to count as a return twist, then the process proceeds to decision block 921. If the second angle sum value is determined to not have reached the threshold necessary to count as a return twist, then the process continues to process block 916B. In process block 916B, the MCU adds the angle to the second twist angle sum and returns to block 910. In decision 921, the MCU changes modes. If the current mode is Wide Beam, then the MCU switches modes and turns off Wide Beam and initiates Narrow Beam. Alternatively, if the current mode is Narrow Beam then the MCU switches modes and turns off Narrow Beam and initiates Wide Beam. After the MCU has changed modes, then the process continues to block 923, wherein the first and second twist angle sum value and direction is reset and the process returns to block 902.

Figure 12A:
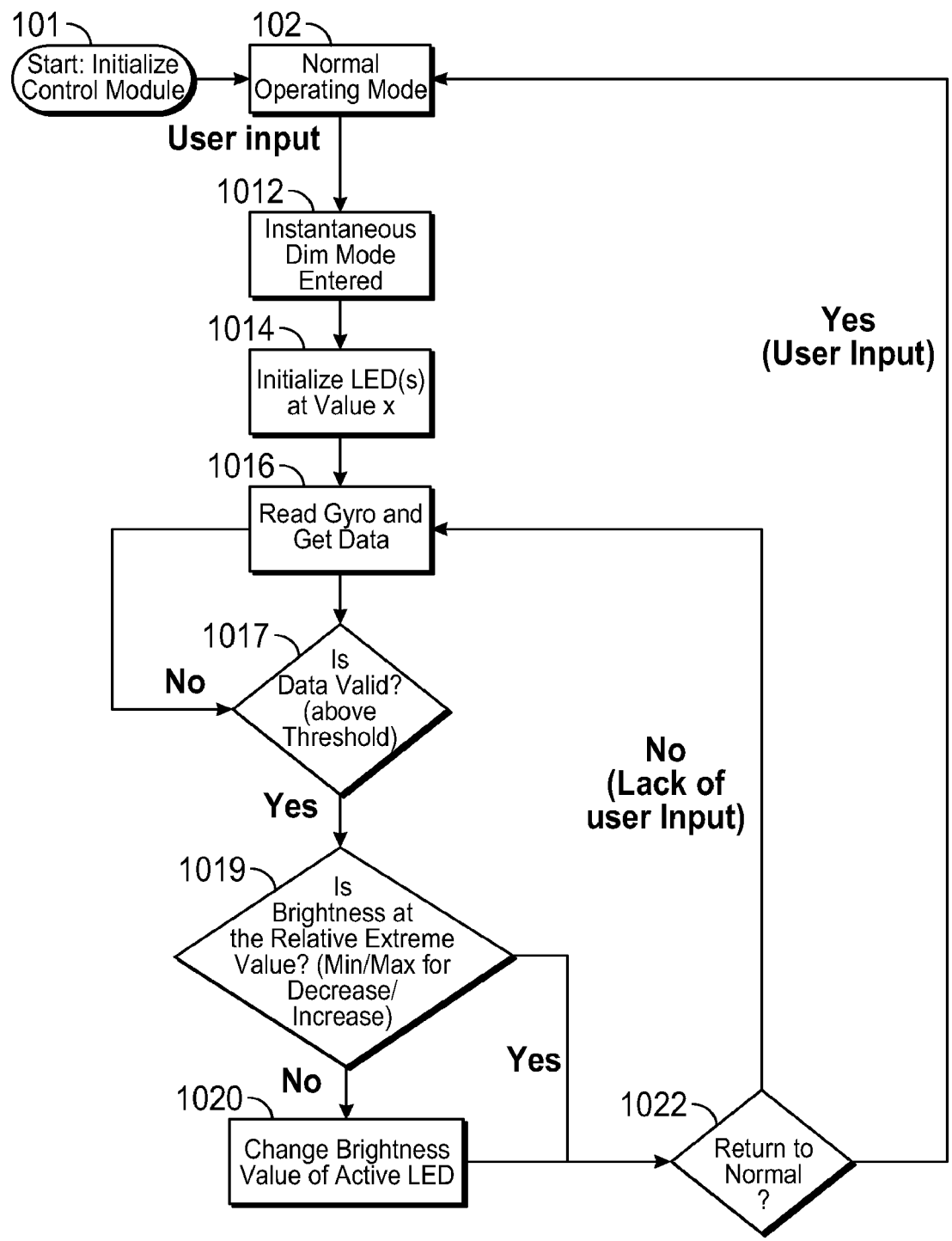
FIG. 12A is a flowchart of an exemplary method of "twist to dim" feature of the portable lighting device control module.

FIG. 12A is a technical flow diagram describing twist to dim feature of the portable lighting device control module. The method shown in FIG. 12A may be implemented by the gyroscopic sensor (not shown) and LEDs which are in communication with the microcontroller 1104, as shown in connection with FIGS. 13-17.

In some situations, a user may desire to adjust the light intensity of the portable lighting device by merely twisting the handle in a single direction. A user may desire to have this twist to dim feature be applied to either the lantern mode or the flashlight mode of the portable lighting device.

In one embodiment of the twist to dim capability (twist to dim), the user may have the portable lighting device in a horizontal orientation, pointed forward, and twist in either right or left direction, and the light intensity will be increased or decreased in real-time based on the angle of rotation provided by the user. In another embodiment of the twist to dim capability (twist to dim), the user may have a portable lighting device in a downward orientation, and allow the user to twist either right or left direction, and the light intensity will be increased or decreased in real-time based on the angle of rotation provided by the user. Alternative initial orientations of the portable lighting device are also contemplated and would function the same way.

The Twist to Dim feature enables instantaneous dimming using the gyroscope data to adjust the (Pulse Width Modulation) PWM settings of the flashlight. As applied to the Lantern Mode, once the Lantern Mode is entered (via a downwards bump) the flashlight turns on the Lantern LEDs at a PWM value x and reads the gyroscope. The gyro data is read as degrees per second and this value is used in a formula to change the PWM value. Essentially, the PWM becomes a function of x and the angle read by the gyroscope. The mathematical formula applied is as follows: Resulting Light Intensity(D)=Original Light Intensity (A)+Direction (C)*Scaling Factor (E)*Angular Twist (B). Note: C is either 1 (if twisting right) or −1 (if twisting left), E is a scaling factor which would translate the angle measured in degrees per second by the gyroscope to a usable change in PWM value.

The MCU is programmed to hold the PWM at a maximum and minimum value, so any twist indicating an increase above the maximum or a decrease below the minimum is ignored.

In block 101, Start: Initialize Control Module indicates the start of the method or process. In block 102, the Normal Operating Mode is presumed. Alternative Operating Modes are configured into the portable lighting device, which will be discussed in turn. In one embodiment, the Normal Operating Mode may be achieved upon power-on startup procedures of the portable lighting device or it may be achieved by intentionally navigating to this operating mode by applying differing users gestures available. After Normal Operating Mode is achieved, the process may continue to block 1012 after receipt of user gestures.

In block 1012, the MCU receives user gestures (i.e. user input), and the MCU determines that the Twist to Dim Mode is requested by the user. After the Twist to Dim Mode has been entered, then the process continues to block 1014. In block 1014, the MCU initializes LEDs at a value x, specific to the Mode entered into using user gestures. After the LEDs are initialized at a value x, then the process continues to block 1016. In block 1016, the MCU receives measurement data from the gyroscopic sensor. After the MCU gets data from the gyroscopic sensor, then the process continues to block 1017.

In block 1017, the MCU determines if the data from the gyroscopic sensor received meets or exceeds a threshold value, if so, it's valid and the process continues to block 1019, if not it's invalid, and the process returns to block 1016 to read data from the gyroscopic sensor. In block 1019, the MCU determines if the brightness value requested by the user (provided by the gyroscopic sensor data to the MCU) is above or below a min. and max value range configured within the microcontroller. If it's determined that the brightness value requested is outside an acceptable range configured within the microcontroller, then highest or lowest brightness value will be selected (or the user requested brightness level will be ignored by the MCU) and the process continues to process block 1022.

If it's determined that the brightness value requested is within the range configured within the microcontroller min and max values, then the process continues to block 1020.

In block 1020, the MCU converts the received measurements data from the gyroscopic sensor to an angle value and this angle value is used in a stored algorithm to change the PWM value to change the brightness level of the LEDs in proportion to the angle read in by the gyroscopic data. After LED intensity continues as adjusted until a user gesture (i.e. user input) is received to request a change. After the MCU adjusts the LED's, the process continues to decision block 1022. In decision block 1022, the MCU determines if user gestures (i.e. user input) has been received to request mode adjustment. If a user gesture is not received (i.e. lack of user input), then the process continues to block 1016 to read gyroscopic sensor data in real-time. If user gesture is received (i.e. user input is received), then the process returns to block 102 to Normal Operating Mode or other alternative modes requested by the user.

Figure 12B:
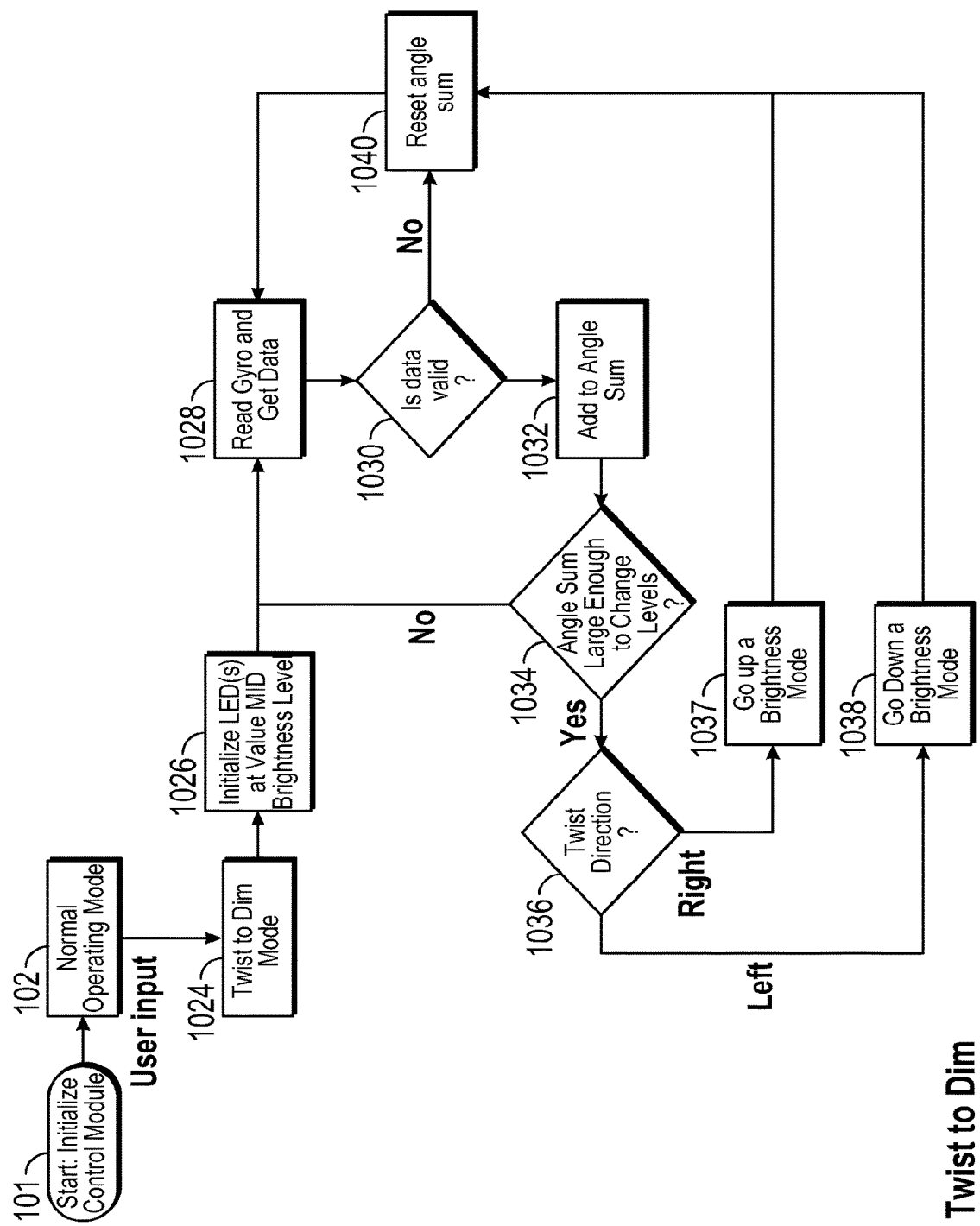
FIG. 12B is a technical flow diagram describing twist to dim feature of the portable lighting device control module.

FIG. 12B is a technical flow diagram describing twist to dim feature of the portable lighting device control module. The method shown in FIG. 12B may be implemented by the gyroscopic sensor (not shown) and LEDs which are in communication with the microcontroller 1104, as shown in connection with FIGS. 13-17.

In some situations, a user may desire to adjust the light intensity of the portable lighting device by merely twisting the handle in a single direction. A user may desire to have this twist to dim feature be applied to either the lantern mode or the flashlight mode of the portable lighting device.

Twist to Dim functionality allows the user to change between fixed brightness settings by twisting the device. When the user enters Twist to Dim mode, the MCU gets a reading from the gyroscope and determines if the data is valid. To determine if the data is valid, the MCU checks if the strength of the gyro reading is above a certain threshold. If the data is valid then the MCU will add the value to an angle sum. This will repeat until either the data is not valid, in which case the MCU resets the angle sum, or the angle sum reaches a value which the MCU counts as a valid twist. This value can be either negative or positive depending on which direction the user is turning the device. After a twist has been detected, the MCU checks the direction of the twist; indicated by the sign of the angle sum. If it is negative (left), the brightness will go down a level. If the sign of the angle sum is positive (right) the brightness will go up a level. After this occurs, the MCU will reset the angle sum and begin reading again until twist to dim mode is exited. The modes of brightness can be any number of values. In one embodiment, four brightness level modes may be configured: Low, Medium, Medium-high and High.

In one embodiment of the disclosure of the twist to dim feature, the process begins with initializing the control module 101 and progressing to a Normal Operating Mode 102 and waiting for user input. Once a user performs a gesture (i.e. bump or whip, or an alternative gesture) to initialize the twist to dim mode 1024, then the process proceeds to block 1026.

In block 1026, the MCU initializes LED(s) at value MID brightness level and proceeds to block 1028.

In block 1028, the MCU reads gyroscopic data and proceeds to decision block 1032 to determine if the gyroscopic data received is valid. If the MCU determines that the gyroscopic data is not valid, then the process proceeds to process block 1040 to reset the Angle Sum value in the MCU and return to block 1028. If the MCU determines that the gyroscopic data is valid, then the process proceeds to process block 1032 to add the gyroscopic data to the Angle Sum value in the MCU and proceed to decision block 1034.

In decision block 1034, the MCU determines if the Angle Sum value is large enough to change levels. If it's determined that the Angle Sum value is insufficient (not large enough) to change levels, then the process returns to block 1028. If it's determined that the Angle Sum value is sufficient to change levels, then the process proceeds to decision block 1036.

In decision block 1036 the MCU analyzes the twist direction as being right or left direction. If the MCU determines that the twisting is to the right, then the process proceeds to process block 1037 to increase brightness (go up in brightness) and return to block 1040 to reset the Angle Sum value in the MCU. If the MCU determines that the twisting is to the left, then the process proceeds to process block 1038 to decrease brightness (go down in brightness) and return to block 1040 to reset the Angle Sum value in the MCU.

Distance Detection

The disclosure contemplates the use of distance sensing technology to integrate into the circuit of the control module. In one embodiment, the distance sensor integrated into the control module is a laser distance sensor using Class 1 NIR (Near Infrared) or Red dot laser) sensor. In another embodiment, the distance sensor integrated into the control module is an ultrasonic distance sensor which senses distance using sound. The distance sensors described to introduce a technology which can be used to alter the light output of the light source based on distance to target. Distance sensing can increase both safety and user satisfaction.

In one embodiment, an ultrasonic sensor provides an easy method of distance measurement. The ultrasonic sensor may perform measurements between moving or stationary objects. The ultrasonic sensor may interface to a microcontroller for quick integration. A single I/O pin is used to trigger an ultrasonic burst (well above human hearing) and then "listen" for the echo return pulse. The sensor measures the time required for the echo return and returns this value to the microcontroller as a variable-width pulse via the same I/O pin.

Voice Recognition

In one embodiment of the disclosure, a voice recognition capability of the adaptive flashlight control module. In one exemplary embodiment, the user may pre-configured speak commands into the flashlight receiver module (i.e. a microphone) which will be sent to the MCU to control and adjust the beam intensity or beam configuration as a result of the user's voice requested command. The control module may comprise a voice recognition module which may include a voice recognition sensor and voice recognition software. The voice recognition sensor will be configured to listen to user's input requests, and the voice recognition software will be configured to receive input received by the voice recognition sensor, logically interpret those requests based on software functions preconfigured in the software to transmit requests to the MCU to adjust the light intensity or light configuration output as a result of the user voice activated request.

Locating flashlights in the dark can be challenging. Personal injury can result from tripping over obstructions or stubbing toes while navigating a dark area. The ability to use sound to command the flashlight to power on can potentially make the unit easier to find and light the path to its actual physical location. Also, "where are you" functionality would provide the ability to use the sound sensor to modify the beam shape and intensity would be useful when working on something that requires both hands. Giving commands to make the light brighter while working under a vehicle would be an example use case.

Touch Sensors

In one embodiment of the disclosure, the touch-based illumination capability of the control module. The capability would allow the user to use at least one touch pad integrated into the outer casing of the flashlight device to transmit signals to the control module to adjust the light intensity upward or downward. Optionally, the capability would allow the user to use at least one touch pad integrated into the outer case of the flashlight device in order to transmit a signal to the control module that the flashlight device is currently in-use by a user, or not-in use by the user and to turn off the LED(s) of the flashlight device. The control module may comprise a touch sensor which would integrate with a touch (pressure) pad to allow the user to adjust light intensity adaptively by allowing the user to press firmly or lightly upon a touch pad to adjust the light intensity, or measure the duration for which the user had touched the touch pad in order to adjust light intensity output, or, allow the touch pad to adjust the light intensity as the user maintains pressure gradually. In an alternative embodiment, the touch sensor may integrate with a touch (single touch) dimmer to adjust light intensity discharged by the flashlight device, whereby the user touches the dimmer once to get High intensity, a second time to get Medium intensity, a third time to get Low intensity, and a fourth time to turn off the flash light device, and this cycle rotates until the user finds a suitable light intensity value he desires.

Microwave Sensors

In one embodiment of the disclosure, the control module having a microcontroller, an inertial sensor (accelerometer and/or gyroscopic sensor) and a motion sensor (PAIR, Microwave, etc.) integrated therein in order to detect motion external to the portable lighting device maintaining the control module. On an exemplary embodiment, a portable lighting device may initiate a standby mode to reduce power consumption if the inertial sensors detect absence of motion, and the microcontroller can be pre-programmed to wake up the portable lighting device into Normal Operating Mode if a motion sensor (PAIR, Microwave, or alternative motion sensor) detects motion occurring outside the portable lighting device, such as a hand wave in close proximity to the portable lighting device that is laying down on a flat surface or mounted onto a surface for easy access.

FIGS. 13-17 illustrate varying configurations which may be used to achieve the disclosed functionality. Each configuration can be operated with either just an accelerometer or both an accelerometer and gyroscope. The gyroscope enables the twist to change mode feature, and on the Lantern Mode, it enables the dimming of the area light.

Each configuration contains an ambient light sensor read by the Microcontroller's (MCU) onboard ADC to enable the auto dimming feature.

Figure 13:
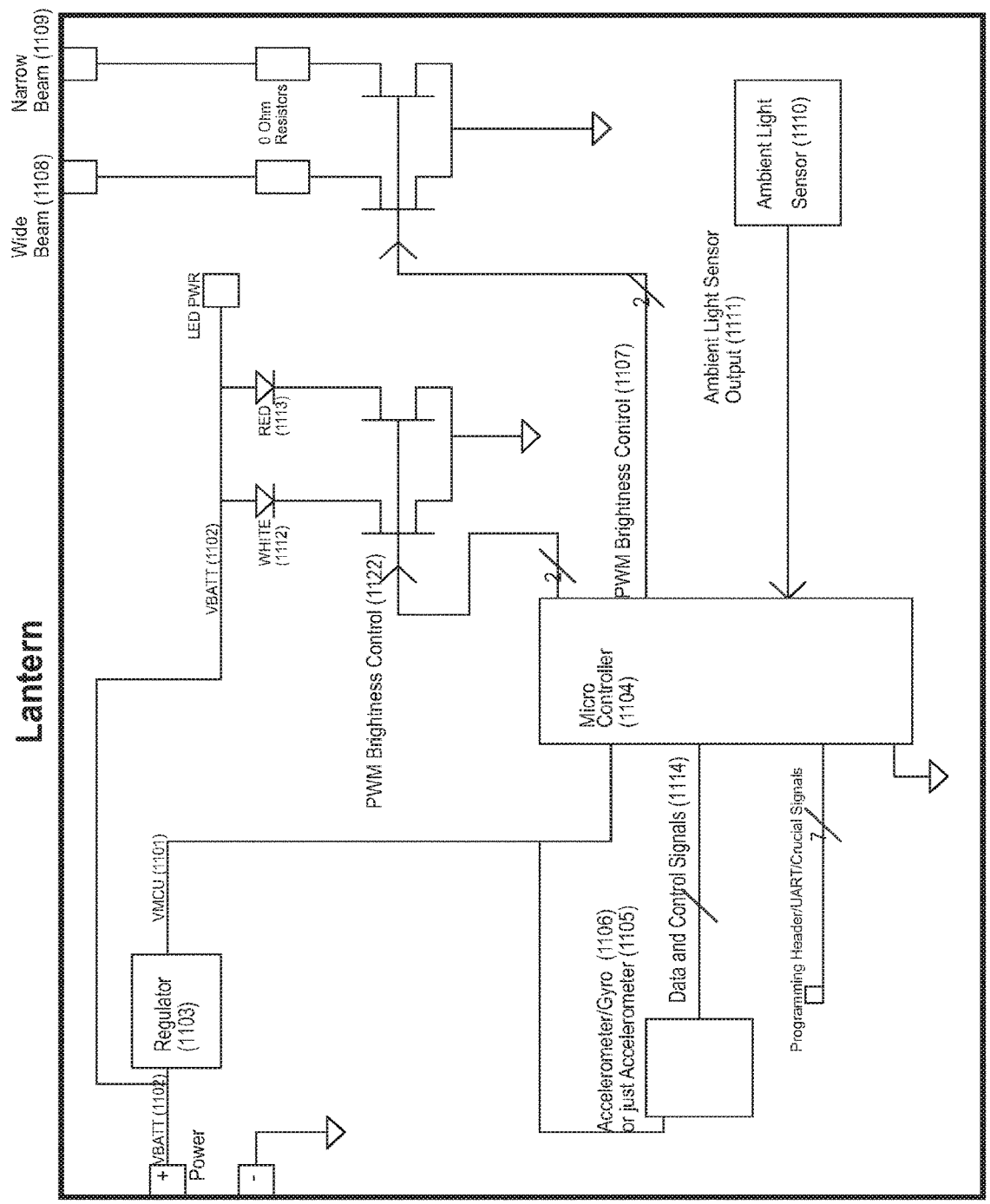
FIG. 13 is an exemplary circuit block diagram showing one embodiment of the of the lantern configuration.

FIG. 13 is a circuit block diagram of the Lantern configuration. The Lantern configuration contains four separate Light Emitting Diode (LED) channels which are each controlled by a separate pulse width channel from the MCU 1104. The White 1112 and Red 1113 channels are facing backwards LEDs on the board. They illuminate when the device is bumped in the downward position. The Wide Beam 1108 and Narrow Beam 1109 LEDs are off the board but are controlled by Field Effect Transistors (FETs) through Pulse Width Modulation on the board. The Wide Beam 1108 and Narrow Beam 1109 LEDs face forwards. When these are on, the backwards facing LEDs are off and vice versa. The Regulator 1103 is a Low Dropout Voltage Regulator (LDO) and is present to keep a steady voltage at a suitable level for both the MCU 1104 and the sensors.

The circuit block diagram as shown in FIG. 13 illustrates an exemplary embodiment of the Lantern Mode integrated into the portable lighting device. The incoming battery voltage VBATT 1102 passes through a Regulator 1103 to generate a regulated voltage VMCU 1101 desirable for the MCU 1104 and other peripheral components within the circuit. The VMCU 1101 provides regulated voltage to the MCU 1104 in order to initiate the Accelerometer sensor 1105 or Accelerometer/Gyroscopic sensor 1106, transmit Pulse Width Modulation (PWM) brightness control 1107 requests to the LED's, and receive ADC input 1111 from the Ambient Light sensor 1110, and perform internal computations and data storage procedures. After the Accelerometer sensor 11050 or Accelerometer/Gyroscopic sensor 1106 is initialized by the MCU 1104, these sensor transmits their measurement reading to the MCU 1101 for computation and further processing. The MCU reads the voltage created by the Ambient Light sensor 1110, using it Analog to Digital Converter (ADC) input 1111. The MCU 1104 transmits PWM brightness control 1107 requests to the LED's configured at the Front End of the portable lighting device. The LED's configured at the Front End of the portable lighting device may be Wide Beam LED 1108; Narrow Beam LED 1109, Other LED. Similarly, the MCU 1104 transmits PWM brightness control 1122 request to the LED's configured at the Back End of the portable lighting device (which permit for Lantern Mode). The LED's configured at the Back End of the portable lighting device may be White LED 1112; Red LED 1113, or alternative color LED. Moreover, FIG. 13 circuit block diagram may be modified to incorporate a motion sensor (PAIR, Microwave, or other motion sensors) in order for the MCU to receive input feed from the motion sensor to determine external motion to the control module, wherein the MCU can analyze the input feed received from the motion sensor to make light and power adjustments to perform different lighting and power operations to operate in an efficient manner.

Figure 14:
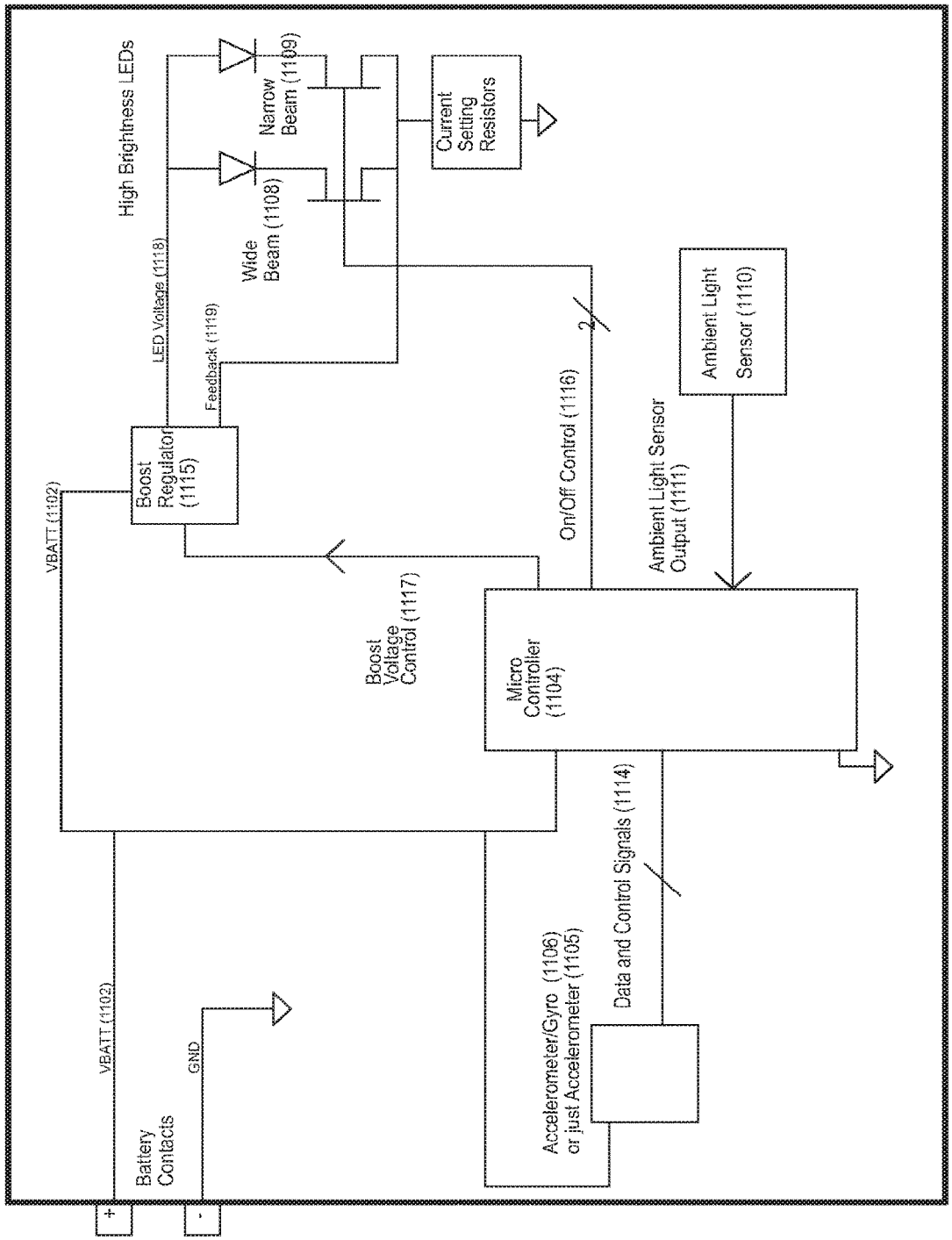
FIG. 14 is an exemplary circuit block diagram showing one embodiment of the boost regulator with LED configuration.

FIG. 14 is a circuit block diagram of the Boost Regulator with LED configuration. This Boost regulator with LEDs contains the 2 LED channels. The LEDs can either be on the board or off the board. The regulator is present to control the LEDs. In this configuration, the LEDs have a higher voltage than the battery. The regulator can be configured in either a constant current or constant voltage mode. The MCU 1104 can control the FETs beneath the LEDs either through the use of PWM or a simple on/off operation. The current setting resistors can be used to set the max current used by the LEDs. They can be omitted if the FETs are controlled with PWM. The PWM can be added on top of the resistors. No LDO is needed since the battery voltage is inside the operating range of the MCU 1104. This configuration is used typically for a 2 Cell battery configuration or lower.

The circuit block diagram as shown in FIG. 14 illustrates an exemplary embodiment of the Boost Regulator with LEDs integrated into the portable lighting device. The incoming battery voltage (VBATT) 1102 travels directly to the MCU 1104 and other peripheral components within the circuit. The VBATT 1102 provides voltage to the MCU 1104 in order to initiate the Accelerometer sensor 1105 or Accelerometer/Gyroscopic sensor 1106, transmit Pulse Width Modulation (PWM) brightness 1116 control requests to the LED's, and receive ADC input 1111 from the Ambient Light sensor 1110, and perform internal computations and data storage procedures. After the Accelerometer sensor 1105 or Accelerometer/Gyroscopic sensor 1106 is initialized by the MCU 1104, these sensor transmits their measurement reading to the MCU 1104 for computation and further processing. The MCU reads the voltage created by the Ambient Light sensor 1110, using it Analog to Digital Converter (ADC) input 1111. The MCU 1104 transmits PWM brightness control 1116 requests to the LED's configured at the Front End of the portable lighting device. The LED's configured at the Front End of the portable lighting device may be Wide Beam LED 1108; Narrow Beam LED 1109, Other LED. The MCU 1104 transmits Boost Voltage Control 1117 to the Voltage Booster 1115 to provide sufficient LED Voltage 1118 to the Front-End LED's to support Brightness Mode voltage requirements. The Boost Regulator 1115 receives a Feedback Response 119, which is a voltage value, from LED's to operate efficiently.

Figure 15:
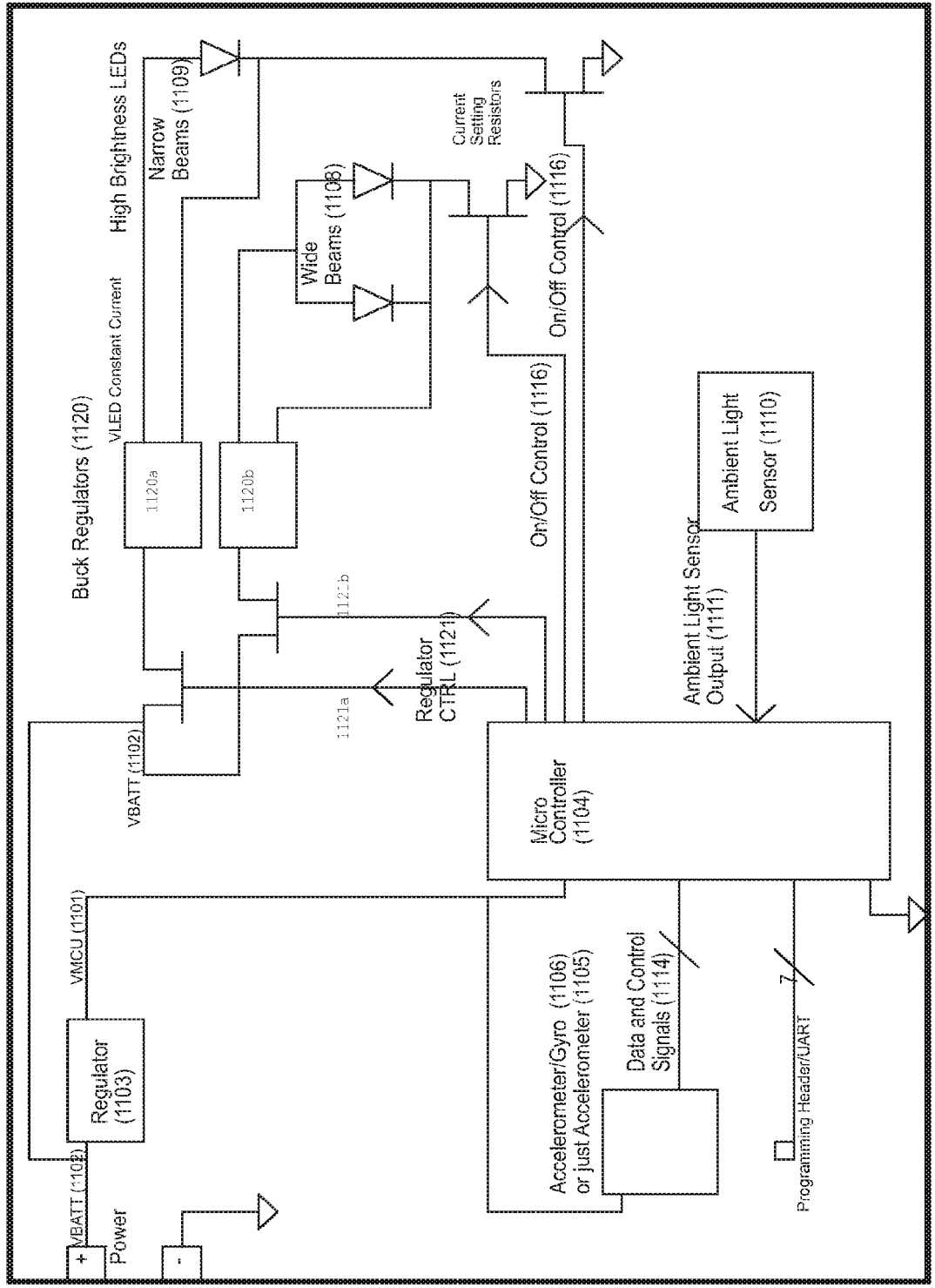
FIG. 15 is an exemplary circuit block diagram showing one embodiment of the buck regulator with LEDs.

FIG. 15 is a circuit block diagram of the Buck Regulator with LEDs. The Buck Regulator with LED configuration is the same as the Boost regulator configuration except the battery voltage is higher than the LEDs and MCU voltage. The Buck regulators can operate in either of the configurations described in the boost regulator configuration.

The circuit block diagram as shown in FIG. 15 illustrates an exemplary embodiment of the Buck Regulator 1120 with LED integrated into the portable lighting device. The incoming battery voltage (VBATT) 1102 passes through a Regulator 1103 to generate a regulated voltage (VMCU) 1101 desirable for the MCU 1104 and other peripheral components within the circuit. The VMCU 1101 provides a regulated voltage to the MCU 1104 to initiate the Accelerometer sensor 1105 or Accelerometer/Gyroscopic sensor 1106, transmit on/off control 1106 requests to the LED's, and receive ADC input 1111 from the Ambient Light sensor 1110, and perform internal computations and data storage procedures. After the Accelerometer sensor 1105 or Accelerometer/Gyroscopic sensor 1106 is initialized by the MCU 1104, these sensor transmits their measurement reading to the MCU 1104 for computation and further processing. The MCU reads the voltage created by the Ambient Light sensor 1110, using it Analog to Digital Converter (ADC) input 1111. The MCU 1104 transmits On/Off control requests 1116 to the LED's configured at the Front End of the portable lighting device. The LED's configured at the Front End of the portable lighting device may be Wide Beam LED 1108; Narrow Beam LED 1109, Other LED. Also, the MCU 1104 provides Regulator Control 1121 requests to the Buck Regulators 1120 to reduce voltage transmitted to the LED because the Power Supply may be too strong for the LED's. The Buck Regulators 1120 provide VLED constant current to the Narrow Beam LED 1109; Wide Beam LED 1108, or other LEDs (not shown).

Figure 16:
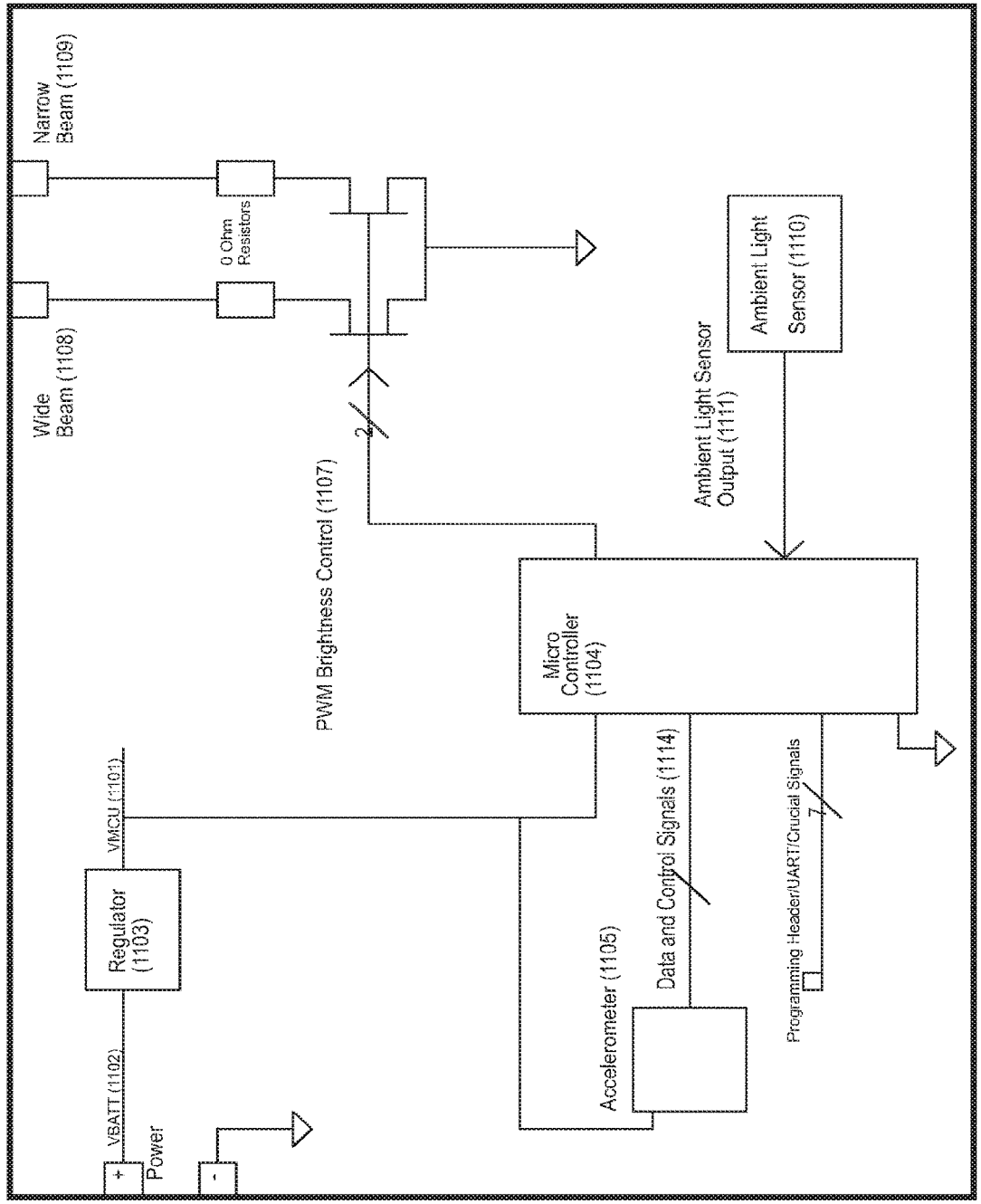
FIG. 16 is an exemplary circuit block diagram showing one embodiment of the accelerometer-only configuration.

FIG. 16 is a circuit block diagram of the Accelerometer Only configuration. The Accelerometer Only configuration shows what the module would look like with just an accelerometer. In this configuration, the device can use the Lock beam functions, the auto-off and the auto-dimming. The Whip gesture is used with this configuration to exit the lock beam functions. We are currently working to implement the twist and return gesture to change modes in this configuration.

The circuit block diagram as shown in FIG. 16 illustrates an exemplary embodiment of the Accelerometer Only with LED integrated into the portable lighting device. The incoming battery voltage (VBATT) 1102 passes through a Regulator 1103 to generate a regulated voltage (VMCU) 1101 desirable for the MCU 1104 and other peripheral components within the circuit. The VMCU 1101 provides a regulated voltage to the MCU 1104 to initiate the Accelerometer sensor 1105, transmit Pulse Width Modulation (PWM) brightness control 1107 requests to the LED's, and receive ADC input 1111 from the Ambient Light sensor 1110, and perform internal computations and data storage procedures. After the Accelerometer sensor 1105 is initialized by the MCU 1104, the Accelerometer sensor 1105 transmits their measurement reading to the MCU 1104 for computation and further processing. The MCU reads the voltage created by the Ambient Light sensor 1110, using it Analog to Digital Converter (ADC) input 1111. The MCU 1104 transmits PWM brightness control requests 1107 to the LED's configured at the Front End of the portable lighting device. The LED's configured at the Front End of the portable lighting device may be Wide Beam LED 1108, Narrow Beam LED 1109, Other LED (not shown).

Figure 17:
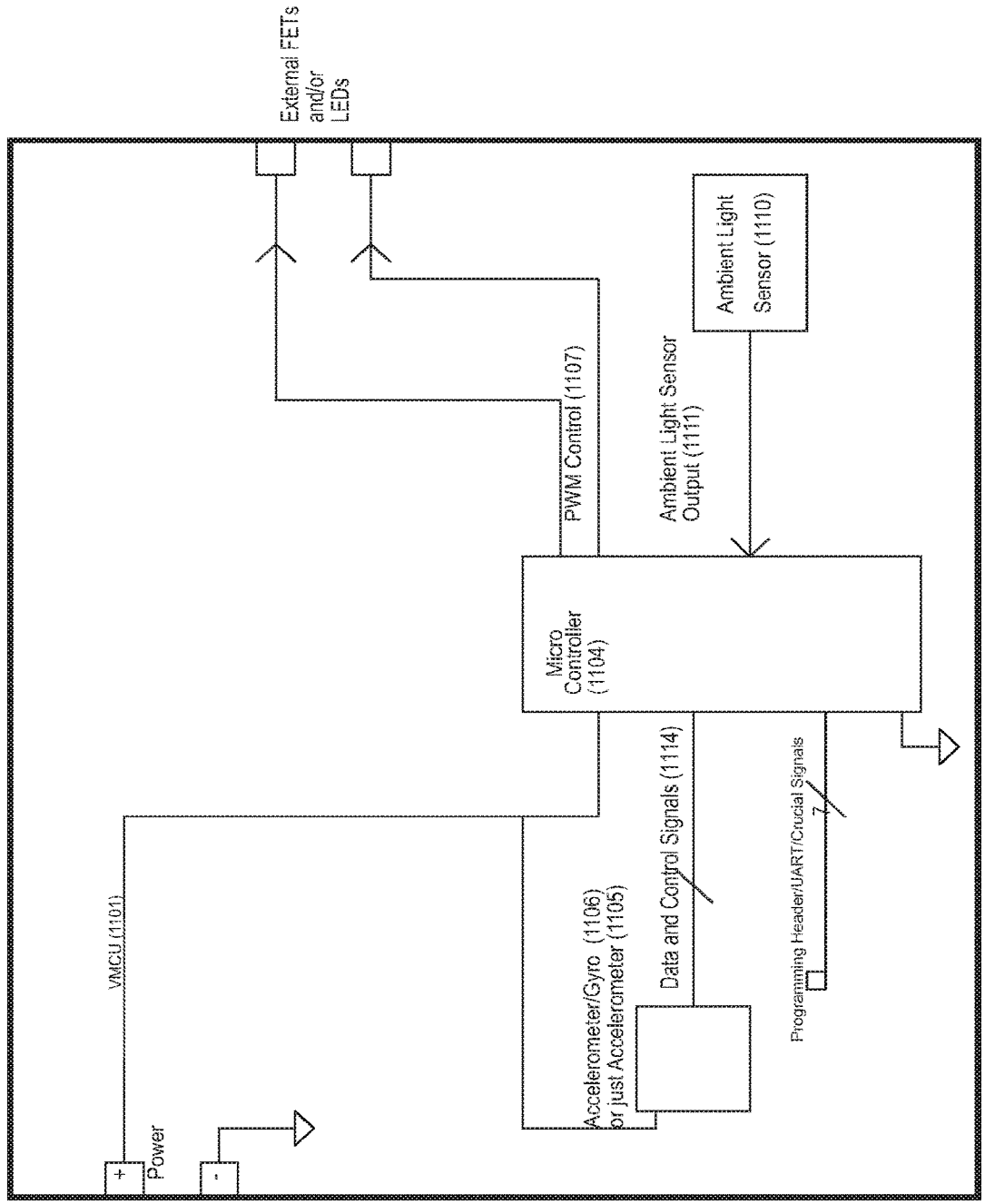
FIG. 17 is an exemplary circuit block diagram showing one embodiment of the control module configuration.

FIG. 17 is a circuit block diagram of the Control Module configuration. This Control Module configuration shows the minimum components that could be used to implement all of the features we have. The PWM control would control the LEDs either on or off the board. The Ambient Light Sensor is needed for the auto dimming. The Accelerometer and Gyro (or just accelerometer) gives all the gesture-based features.

The circuit block diagram as shown in FIG. 17 illustrates an exemplary embodiment of the Control Module with LEDs integrated into the portable lighting device. The incoming battery voltage (VBATT) 1102 travels directly to the MCU 1104 and other peripheral components within the circuit. The VBATT 1102 provides voltage to the MCU 1104 in order to initiate the Accelerometer sensor 1105 or Accelerometer/Gyroscopic sensor 1106, transmit Pulse Width Modulation (PWM) brightness control 1107 requests to the LED's, and receive ADC input 1111 from the Ambient Light sensor 1110, and perform internal computations and data storage procedures. After the Accelerometer sensor 1105 or Accelerometer/Gyroscopic sensor 11106 is initialized by the MCU 1104, these sensor transmits their measurement reading to the MCU 1104 for computation and further processing. The MCU reads the voltage created by the Ambient Light sensor 1110, using it Analog to Digital Converter (ADC) input 1111. The MCU 1104 transmits PWM brightness control 1107 requests to the LED's configured at the Front End of the portable lighting device. The LED's configured at the Front End of the portable lighting device may be Wide Beam LED 1108 as shown in FIG. 11A, Narrow Beam LED 1109 as shown in FIG. 11A, Other LED.

In one embodiment, there may be a case in some circumstances, but when the gyro is present, you can perform the twist gesture (i.e. twist and return, twist to dim) while the flashlight is in any direction (other than complete up or complete down).

In one embodiment, an accelerometer only control module able to perform the requested functionality of twist and return and/or twist to dim, without the requirement of having gyroscopic sensor installed within the control module.

Figure 18A:
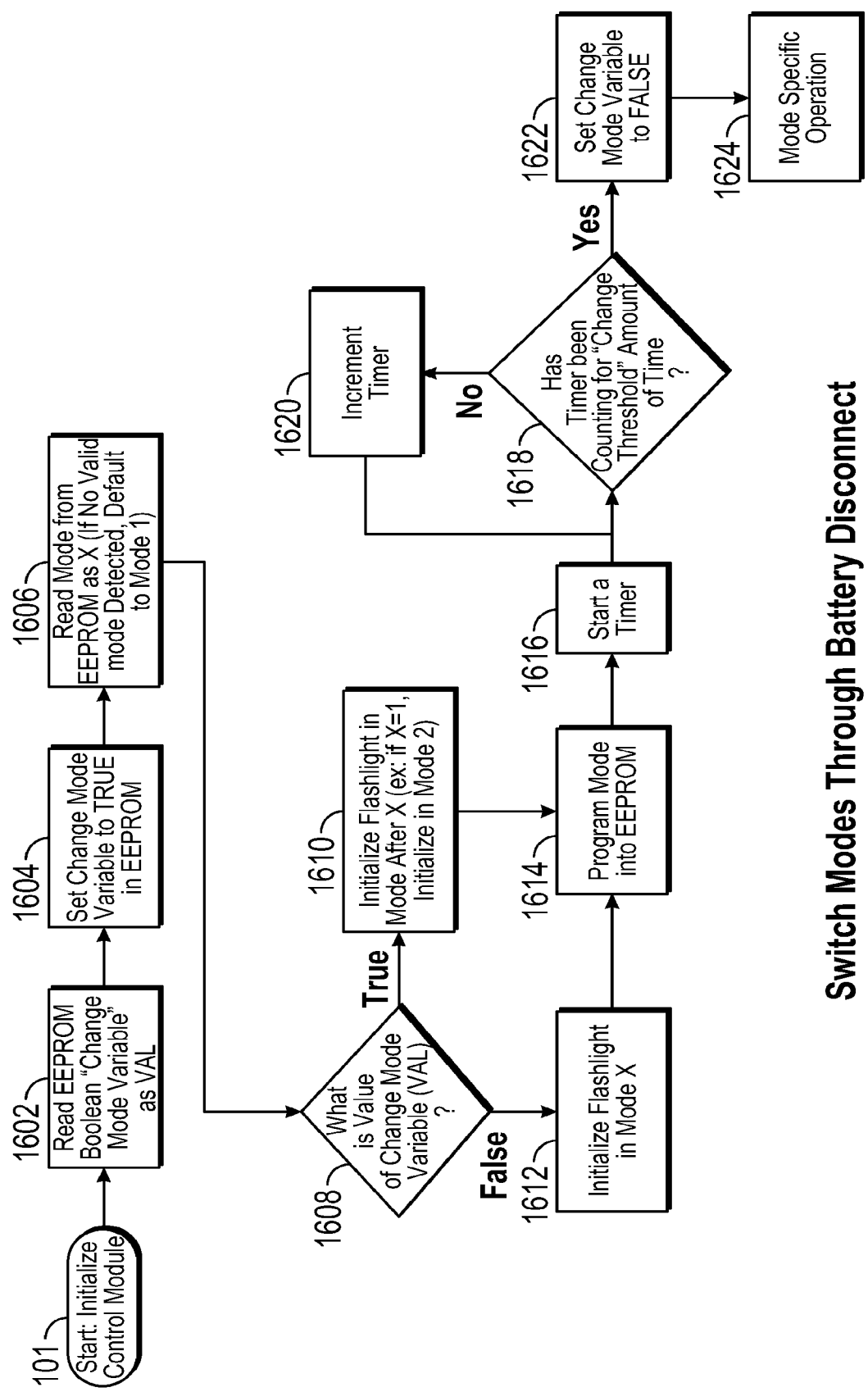
FIG. 18A is a technical flow diagram describing the switch modes through battery disconnect feature of the portable lighting device control module.

FIG. 18A is a technical flow diagram describing the switch modes through battery disconnect feature of the portable lighting device control module. The method shown in FIG. 18A may be implemented by the non-volatile memory in communication with the microcontroller 1104, as shown in connection with FIGS. 13-17.

In one embodiment of the disclosure, a user is able to switch between different modes available within a flashlight control module, and save, in memory, the last mode for which the user was using prior to the flashlight being shut off. Also, if the user is toggling between setting in a quick fashion, and a permanent mode is not selected prior to the flashlight begin turned on, then the next time that the flashlight is turned on, it will increment to the next available mode.

In an exemplary embodiment, a user turns the device off before the "change threshold" is reached. In this embodiment, when the device is reinitialized, the change mode variable will be read as TRUE and thus the flashlight will initialize in the next mode after X in the progression (ex: if X=1 it will initialize in Mode 2). In a second embodiment, the user turns the device off after the "change threshold" is reached. In this second embodiment, when the device is reinitialized, the change mode variable will be read as FALSE and thus the flashlight will initialize in the Mode X read from the EEPROM. EEPROM is electrically erasable programmable read-only memory and is a type of non-volatile memory used in computers and other electronic devices to store relatively small amounts of data.

Each time the flashlight is turned on, the Change Mode Variable is first read (assume variable VAL) and then set to TRUE. VAL is then used to determine if the previous power cycle indicates that the flashlight should stay in its current mode or advance to the next mode. If VAL is TRUE then the mode will advance, if VAL is FALSE then the flashlight will stay in the mode it is in.

Now since the Change Mode Variable (VAL) is set to TRUE in the EEPROM immediately after reading it. This way, if the "change threshold" amount of time is not reached before power is removed from the device, the device will read VAL as TRUE and advance modes next time the power is applied.

After the initialization and once the flashlight is on in a given mode a timer begins. Once this timer has been going for "change threshold" amount of time, the Program will set the change mode variable to FALSE in the EEPROM. That way, next time the flashlight is power cycled it will read VAL as FALSE and will not advance to the mode.

In block 101, Start: Initialize Control Module indicates the start of the method or process, and then the process progresses to block 1602. In block 1602 the microcontroller reads the EEPROM Boolean "Change Mode Variable" as VAL, then the process progresses to block 1604. In block 1604, the microcontroller sets the "Change Mode Variable" to TRUE in EEPROM, then the process progresses to block 1606. In block 1606, the microcontroller reads Mode value from EEPROM as X (if no valid mode detected, default to Mode 1), then the process progresses to block 1608. In block 1608, the microcontroller determines what is the value of Change Mode Variable (VAL). If the Change Mode Variable (VAL) is TRUE, then the process progresses to block 1610. In block 1610, the microcontroller initializes flashlight in mode after X (ex: if X=1, initialize in mode=2), then the process proceeds to block 1614. If the Change Mode Value (VAL) is FALSE, then the process progresses to block 1612. In block 1612, the microcontroller initializes flashlight in Mode=X, then the process proceeds to block 1614. In block 1614, the microcontroller programs Mode into EEPROM, and then the process progresses to block 1616. In block 1616, the microcontroller starts a change threshold timer, then the process progresses to decision block 1618. In decision block 1618, the microcontroller determines if the threshold timer has reached the "Change Threshold" value amount of time. If it's determined that the count-down timer has not been reached, then the process proceeds to block 1620. In block 1620, the change threshold time is incremented and the process returns to decision block 1618. If it's determined that the count-down timer has been reached, then the process proceeds to block 1622. In block 1622, the microcontroller sets the Change Mode Variable (VAL) in the EEPROM to FALSE, and proceeds to process block 1624. In process block 1624, the microcontroller performs Mode Specific Operation.

Figure 18B:
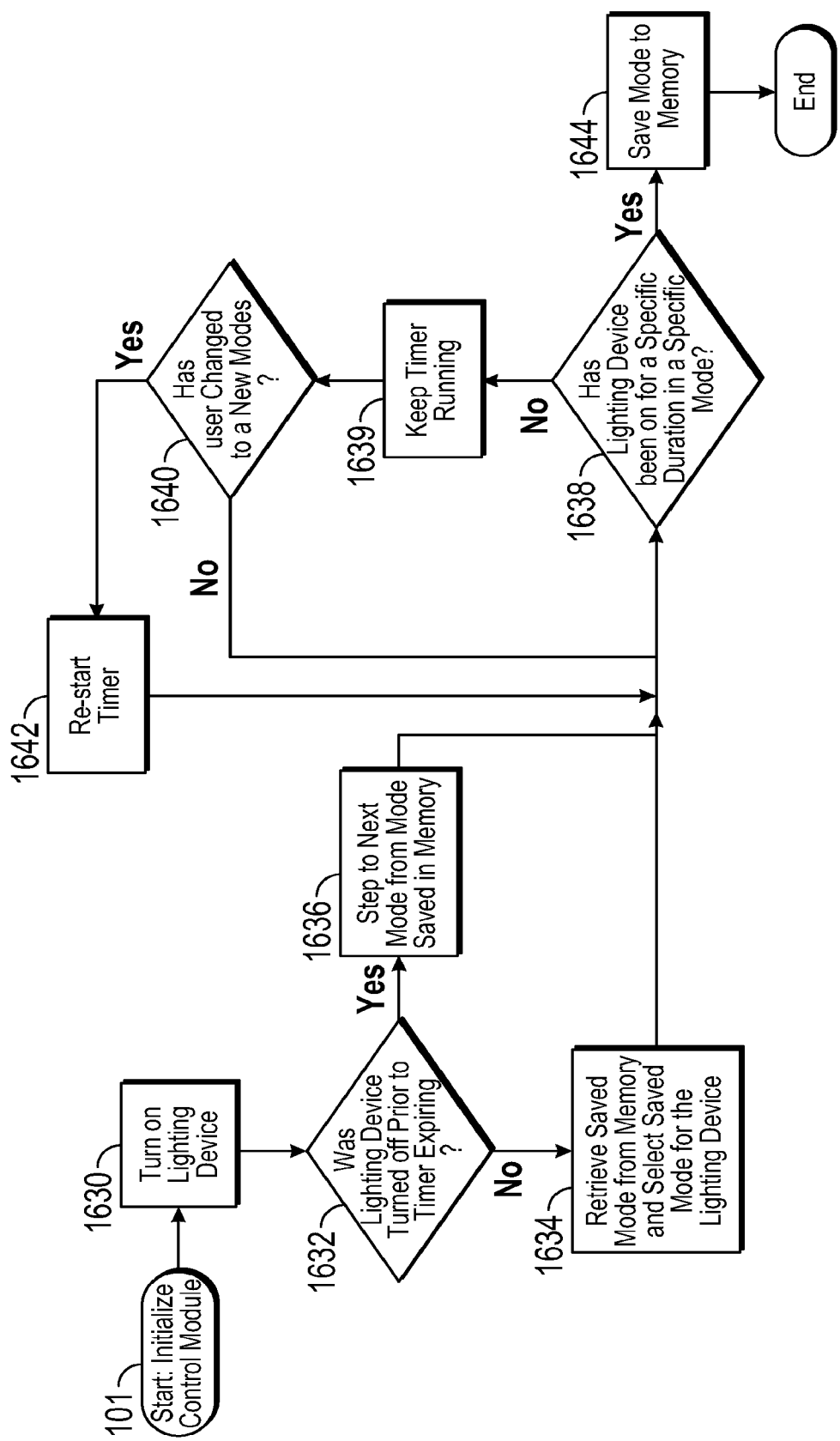
FIG. 18B is an exemplary flow diagram of switch modes through battery disconnect.

FIG. 18B is an exemplary flow diagram of switch modes through battery disconnect. In process begin at starting node 101 wherein the process initializes the control module, then the process proceeds to process block 1630 wherein the microcontroller initializes to turn on lighting device to allow a first light mode operation to be operational. Then, the process proceeds to decision block 1632, wherein the microcontroller determines if the lighting device turned off prior to a save last mode timer expiring. If the microcontroller determines that the lighting device was turned off by the user prior to the save last mode timer expiring, then the process proceeds to process block 1636, otherwise, the process proceeds to process block 1634.

In process block 1634, wherein the lighting device was not turned off prior to a save last mode timer expiring, the MCU retrieves the saved mode from memory and selects the saved mode as the operation mode for the lighting device, and proceeds to decision block 1638.

In process block 1634, wherein the lighting device was turned off prior to a save last mode timer expiring, the MCU steps to the next mode in the available lighting modes available within the control module and selects that next mode as the operational mode for the lighting device, and proceeds to decision block 1938.

In decision block 1638, the MCU determines if the lighting device been ON for a specified duration in a specific mode of operation. If it's determined that the lighting device has maintained a specific mode for a specific duration then the process proceeds to process block 1644 to save the mode of operation to memory, then the process terminates.

In decision block 1638, if it's determined that the lighting device has not maintained a specific mode for a specific duration then the process proceeds to process block 1639. In process block 1639, the save last mode timer is maintained while the lighting device is maintained in a specified mode without any mode adjustments, then the process proceeds to decision block 1640.

In decision block 1640, the MCU determines if the user has changed the modes of the lighting device by means of a gesture or button actuation. If it's determined that the mode has been maintained, then the process returns to decision block 1638. If it's determined that the mode has changed, then the process proceeds to process block 1642 wherein a save last mode timer is reset, and the process returned to decision block 1638.

Figure 19A:
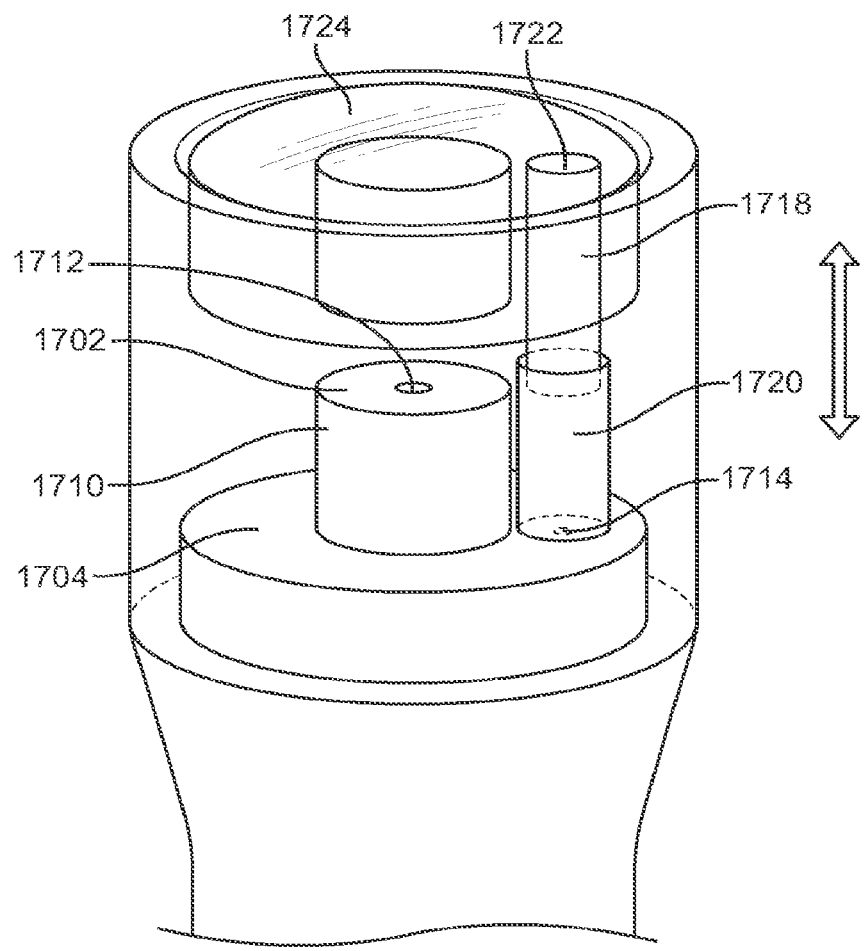
FIG. 19A is an exemplary illustration of a portable scoping flashlight having a control module integrated therein.
Figure 19B:
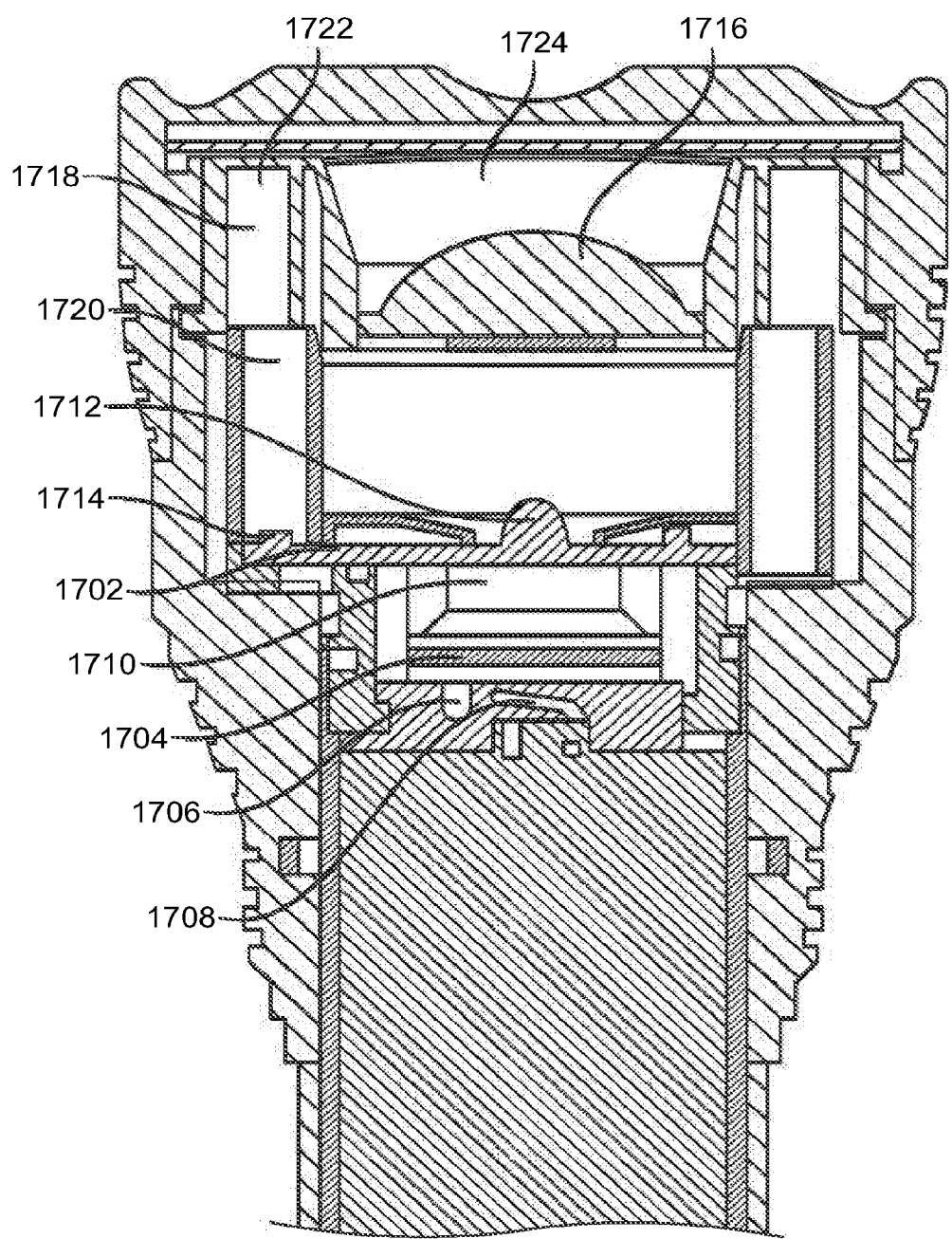
FIG. 19B is an exemplary illustration of a portable flashlight having a control module, a separate LED board comprising an ambient light sensor and an LED light shown in a collapsed position for a scoping flashlight.
Figure 19C:
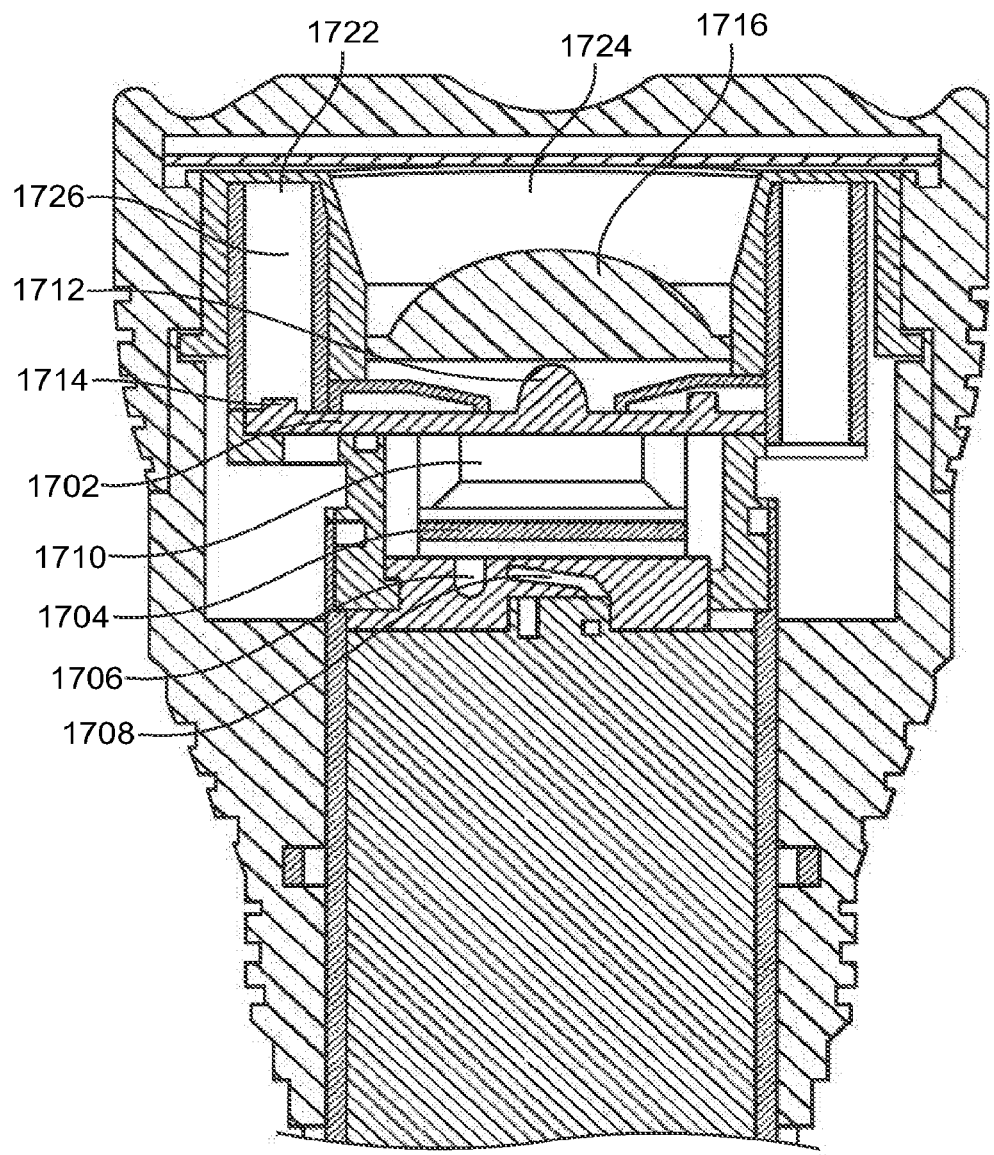
FIG. 19C is an exemplary illustration of a portable flashlight having a control module, a separate LED board comprising an ambient light sensor and an LED light shown in an expanded position for a scoping flashlight.

This process describes the logic the MCU applies to save last mode used by the portable lighting device implementing a control module to know what lighting mode to adopt when a user re-initiates a request to use the portable lighting device at a future time, after the user has previously used the device on at least one prior instance. FIGS. 19A, 19B, and 19C are of a slide focus head assembly having an ambient light sensor. In one embodiment, a slide focus lens head assembly for a flashlight having an LED and ambient light sensor embedded therein to permit a user to switch between wide beam and narrow beam LED modes by mechanical means and still have the capability to adjust LED light intensity based on ambient light sensor data transmitted to the MCU to adjust pulse width module values of the LED's within the head assembly because of the external light values measured by the ambient light sensor.

An ambient light sensor affixed to printed circuit board assembly facing outward towards a lens head assembly of a flashlight device. The ambient light sensor surrounded by a first cylindrical tube assembly attached to the printed circuit board assembly, wherein the first cylindrical tube vertically attached to the printed circuit board assembly. The first cylindrical tube assembly having a second cylindrical tube assembly threaded therein to allow the lens head assembly of the flashlight to adjust outward and inward (i.e. slide focus). The second tube assembly threaded to the first cylindrical tube assembly along Its bottom portion and the lens head assembly of the flashlight along its top portion. The first cylindrical tube assembly and the second cylindrical tube assembly creating a collapsible and adjustable tube assembly to allow for mechanical slide focus for the flashlight device and provides a cylindrical tunnel for which light waves may pass through to the ambient light sensor. An LED affixed on the printed circuit board assembly along its center portion, wherein the LED is facing outward towards the lens head assembly.

In on embodiment, a slide focus flashlight allowing for wide beam and narrow beam (spot light) configurations by means of a twisting of a head assembly, wherein a collapsed slide focus initiates a wide beam and an expanded slide focus initiates a narrow beam, further configured to integrate an ambient light sensor to dynamically adjust light intensity within the specified mode selected by the user.

FIG. 19A is an exemplary illustration of a portable flashlight having a control module 1704 residing below a mounting piece 1710 connected to a LED board 1702 having an LED light 1712. Furthermore, the Control Module 1704 having an ambient light sensor 1714 configured within an empty cavity lower portion 1720 and empty cavity top portion 1718 having an open or clear top hole 1722 to allow external light to reach the ambient light sensor 1714 residing at the bottom of the empty cavity lower portion 1720.

The disclosure contemplates that a single board can be manufactured that incorporates all the necessary components (MCU, multiple sensors, LED connections, Power Terminal, Ground Terminal) in addition to LED's used to provide light output to the lighting device. In an alternative embodiment, the disclosure contemplates that two or more boards can be manufactured, wherein a single board is an integrated control module having a subset of sensors and a microcontroller, and an LED board having another subset of sensors and LED lights, and possibly other LED lights residing within a third LED board.

FIG. 19B is an exemplary illustration of a portable flashlight having a control module, a separate LED board comprising an ambient light sensor and an LED light shown in a collapsed position for a scoping flashlight. The spring 1708 (positive end) and the pin 1706 (negative end) are shown below the control module 1704 to provide power to the control module 1704. The control module 1704 is connected to the LED board 102 by wire or alternative electronic connection means having a mounting piece 1710 between them. The LED board 1702 having at least one LED 1712 and at least one ambient light sensor 1714. The ambient light sensor housed within a hollow cavity expanded 1728 having an empty cavity top portion 1718 and an empty cavity bottom portion 1720, wherein the top portion 1718 and the bottom portion 1720 are configured to slide into one another in a collapsed scope mode with an open top end (hole) 1722 to allow light to enter the cavity expanded 1728 and reach the ambient light sensor 1714. Finally, the flashlight having a lens 1716 and lens assembly 1724.

FIG. 19C is an exemplary illustration of a portable flashlight having a control module, a separate LED board comprising an ambient light sensor and an LED light shown in an expanded position for a scoping flashlight. The spring 1708 (positive end) and the pin 1706 (negative end) are shown below the control module 1704 to provide power to the control module 1704. The control module 1704 is connected to the LED board 102 by wire or alternative electronic connection means having a mounting piece 1710 between them. The LED board 1702 having at least one LED 1712 and at least one ambient light sensor 1714. The ambient light sensor housed within a hollow cavity collapsed 1726 and an open top end (hole) 1722 to allow light to enter the cavity collapsed 1726 and reach the ambient light sensor 1714. Finally, the flashlight having a lens 1716 and lens assembly 1724.

Figure 20:
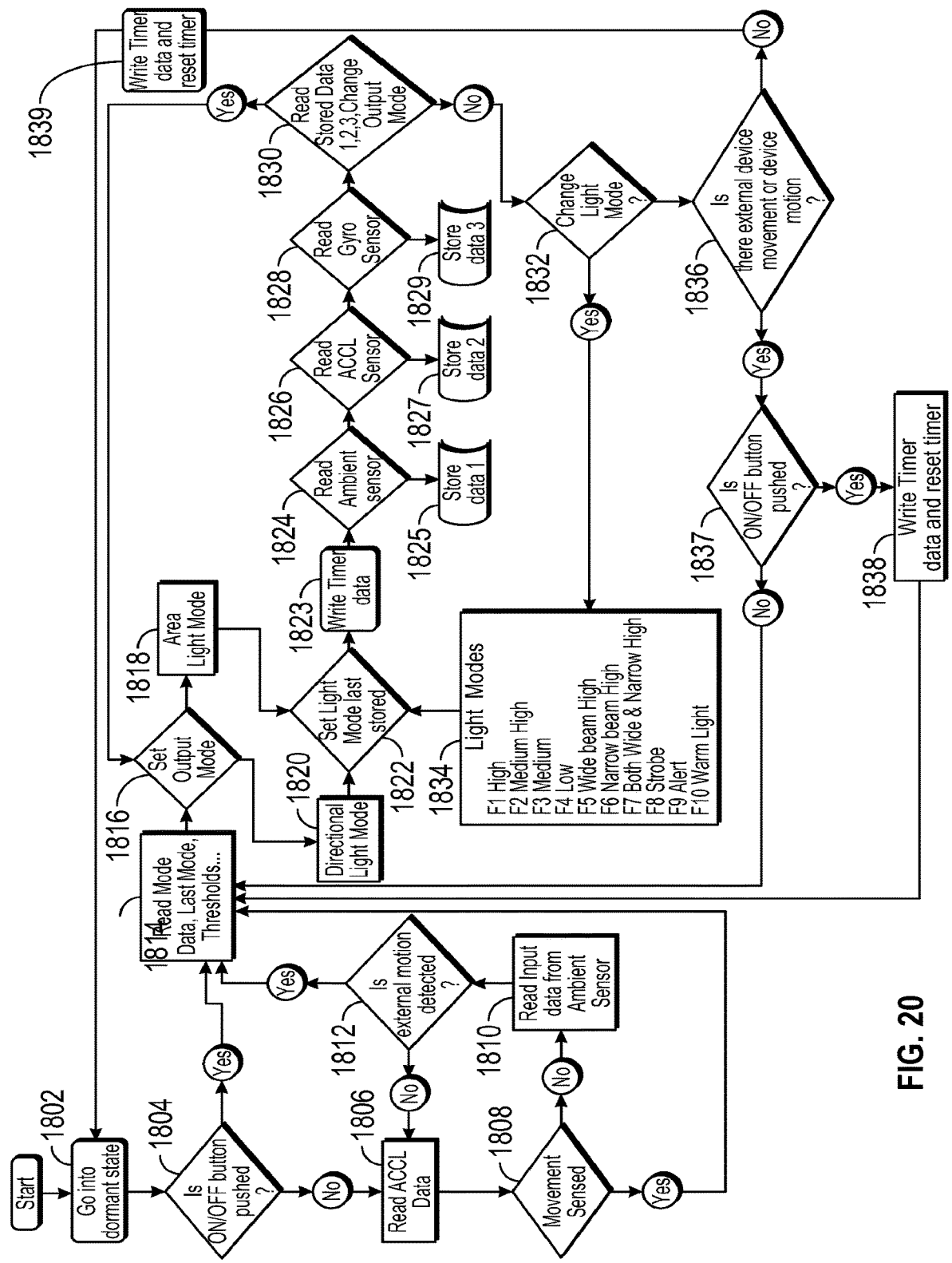
FIG. 20 is an exemplary diagram illustrating the plurality of capabilities available within the control module.

FIG. 20 is an exemplary diagram illustrating the plurality of capabilities available within the control module and the logical decision implemented within the MCU to allow for changes in mode output selection, lighting mode selection, and transitioning from an ON mode to a dormant mode and vis versa.

In one embodiment of the disclosure, the portable lighting device utilizing the control module may begin in dormant state 1802 (i.e. low power standby mode) wherein the battery is efficiently using its access to power resources to adjust modes as a result of sensing absence of motion both internally and externally of the control module. Then, the process continues to decision block 1804 wherein the ON/OFF button is pushed 1804 to indicate interest of the user to turn On or Off the portable lighting device. If the user selects to turn off the portable lighting device, then this process with terminate and the device will shut off. If the user selects to turn on the portable lighting device by physically pushing the On/Off button, then the process proceeds to block 1814. In absence of pushing of the On/Off Mode button, the process logic within the MCU proceeds to read accelerometer data 1806 to determine if motion has been sensed. In block 1808, the MCU determines from the accelerometer data input feed if movement has been sensed, if movement is sensed, then the process proceeds to process block 1814, and if movement is not sensed, then the process proceeds to process block 1810. In block 1810 the MCU reads input data from the Ambient Light Sensor and then in block 1812 determines if external motion has been sensed in response to the ambient light sensor input data received. If external motion is not sensed, then the lighting device continues in dormant state and returns to block 1806 to read accelerometer data. If, on the other hand, the MCU determines that there is external motion detected, then the process proceeds to block 1814.

In block 1814 the MCU reads Output Mode data, Light Mode date, last Saved Mode data from memory, and compares against threshold values stored in the program logic and memory, then the process proceeds to decision block 1816.

In block 1816, the MCU determines the output mode gesture performed by the user by analyzing ambient light sensor data, accelerometer data, and gyroscopic sensor data. If the output gesture performed by the user using the lighting device indicates an area light, then the process proceeds to Area Light Mode 1818 and proceeds to decision block 1822. If the output gesture performed by the user using the lighting device indicates a directional light, then the process proceeds to Directional Light Mode 1820 and proceeds to decision block 1822. Area Light Mode can be described as lantern mode, or where the backend LED's (White LED, and Red LED, other LEDs) are initiated by the MCU. Directional Light Mode can be described as the traditional flashlight mode, wherein the frontend LED's (Wide Beam LED, Narrow Beam LED, other LEDs) are initiated by the MCU.

In decision block 1822, the MCU determines the light mode gesture performed by the user by analyzing ambient light sensor data, accelerometer data, and gyroscopic sensor data. If the light mode gesture performed by the user using the lighting device indicates a specific pre-defined light mode then the MCU will initiate this mode, otherwise it may return to last saved light mode, or it may progress to the light mode proceeding the last saved mode if it's been indicated that the lighting device was shut-off prior to the expiration of the 'save last mode timer', it all depends on the input the MCU receives and the program logic pre-programmed into the MCU to handle these permutations. Exemplary light modes include: High, Medium High, Medium, Low, Wide Beam High, Narrow Beam High, Both Wide and Narrow High, Strobe, Alert, Warm Light, as well as other modes reasonably configurable within the MCU and LED connections within the Control Module. When the Control Modul sets a Light Mode, it simultaneously starts a 'save last mode timer' and proceeds to decision block 1824.

In decision block 1824 the MCU reads ambient light sensor input, and simultaneously proceeds to decision block 1826 and in Store Data block 1825 to store the ambient light sensor data in memory.

In decision block 1826 the MCU reads the accelerometer sensor input, and simultaneously proceeds to decision block 1828 and Store Data block 1827 to store accelerometer data into memory.

In decision block 1828 the MCU reads the gyroscopic sensor input, and simultaneously proceeds to decision block 1830 and Store Data block 182 to store gyroscopic data into memory.

Also, it's worth mentioning, that the decision blocks 1824, 1826 and 1828 may be interchanged in terms of synchronization or order of the input received from these sensors defined in these blocks, and the disclosure related to the control module would still operate in the same manner. Also, it's worth noting, that the decision block 1828 and 1829 may be omitted from the flow diagram logical process if the control module supports only an ambient light sensor and an accelerometer.

In decision block 1830 the MCU reads stored data in Store Data Block 1825 related to ambient light sensor data, Store Data Block 1827 related to accelerometer sensor data, and Store Data Block 1829 related to gyroscopic sensor data and changes Output Mode based on gesture(s) performed by a user using the lighting device which are captured by the ambient light sensor, accelerometer, and gyroscopic sensor. If the Output Mode is changed due to gestures performed by the user, then the process returns to decision block 1816. If the Output Mode is not changed due to gestures performed by the user, then the process proceeds to decision block 1832.

In decision block 1832, the microcontroller determines if the gestures performed by the user using the lighting device which are captured by the ambient light sensor, accelerometer, and gyroscopic sensor will result in a Light Mode change. If the Light Mode is changed due to gestures performed by the user, then the process proceeds to process block 1834, wherein the Light Mode is adjusted to the appropriate Light Mode pre-configured in the microcontroller suitable for the gesture performed by the user then returns to decision block 1822. Listing of possible Light Modes include: High, Medium High, Medium, Low, Wide Beam High, Narrow Beam High, Both Wide & Narrow High, Strobe, Alert, Warm Light. If the Light Mode is not changed due to gestures performed by the user, then the process proceeds to decision block 1836.

In decision block 1836, the microcontroller determines if there is external device movement or device motion. If no external device movement or device motion is detected by the microcontroller, then the process proceeds to process block 1839 to write timer data and reset timer and return to dormant state as specified in decision block 1802. If external movement or device motion is detected by the microcontroller, then the process proceeds to decision block 1837 to determine if the ON/OFF Mode button has been pushed.

In decision block 1837 the microcontroller determines if the On/Off Mode button has been pushed. If the On/Off Mode button has been pushed, then the process proceeds to process block 1838 to write timer data and reset timer, then return to process block 1814. If the On/Off Mode button has not been pushed, then the process returns directly to process block 1814.

FIGS. 21A, 21B, 21C, and 21D are exemplary illustrations of different views of one embodiment of the Control Module having both an Accelerometer and a Gyroscopic Sensor. In one embodiment, the control module is a printed circuit board comprising a plurally of components which will be enumerated in turn herein. The Control Module 1704 may comprise a Battery Power Connection 1906 and a Battery Ground Connection along a first side. Along a second side, the Control Module 1704 may comprise a power terminal 1902, a ground terminal 1904, an ambient light sensor, 1110, an accelerometer/gyroscopic sensor 1106, a microcontroller 1104, a lantern connection 1112, a red alter connection 1113, a wide beam connection 1108, and a narrow beam connection 1109. FIG. 21B is the side view of the Control Module 1407. FIG. 21C is the back view of the Control Module illustrating the Battery Power Connection 1906 and the Battery Ground Connection 1908. FIG. 21D is a perspective view thereof.

FIGS. 22A, 22B, 22C, and 22D are exemplary illustrations of different views of one embodiment of the Control Module having an Accelerometer. In one embodiment, the control module is a printed circuit board comprising a plurally of components which will be enumerated in turn herein. The Control Module 1704 may comprise a Battery Power Connection 1906 and a Battery Ground Connection along a first side. Along a second side, the Control Module 1704 may comprise a power terminal 1902, a ground terminal 1904, an ambient light sensor, 1110, an accelerometer 1105, a microcontroller 1104, a lantern connection 1112, a red alter connection 1113, a wide beam connection 1108, and a narrow beam connection 1109. FIG. 21B is the side view of the Control Module 1407. FIG. 21C is the back view of the Control Module illustrating the Battery Power Connection 1906 and the Battery Ground Connection 1908. FIG. 21D is a perspective view thereof.

Although this invention has been described in terms of certain preferred embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

We claim:

1. A lighting control module for use with a multipurpose lighting device, the lighting control module comprising:
    a microcontroller having a plurality of lighting device output modes stored in memory;
    one or more sensors, each being configured to detect motion of the multipurpose lighting device and transmit data to the microcontroller, and
    wherein the lighting control module is configured to receive power from a battery of the multipurpose lighting device,
    wherein the microcontroller is configured to select a first mode of the plurality of lighting device output modes and adjust an intensity of one or more light sources of the multipurpose lighting device using pulse width modulation brightness controls responsive to the data received from the one or more sensors.

2. The lighting control module of claim 1, wherein the one or more sensors comprise an inertial sensor.

3. The lighting control module of claim 2, wherein the inertial sensor comprises an accelerometer.

4. The lighting control module of claim 3, wherein the inertial sensor further comprises a gyroscope,
    wherein the inertial sensor is configured to detect and measure real-time motion and orientation of the multipurpose lighting device,
    wherein the data comprises real-time motion and orientation measurements.

5. The lighting control module of claim 2, wherein the one or more sensors further comprise a motion sensor.

6. The lighting control module of claim 5, wherein the motion sensor comprises a PAIR sensor or a microwave sensor.

7. The lighting control module of claim 5, wherein the motion sensor is configured to detect real-time motion external to the multipurpose lighting device.

8. The lighting control module of claim 1, where:
    the microcontroller is configured to initiate a standby mode when a first motion is not detected for a first pre-configured amount of time, and
    the microcontroller is configured to initiate an operating mode when, during the standby mode, a second motion is detected for a second pre-configured amount of time.

9. The lighting control module of claim 8, wherein the operating mode is a lighting mode in use immediately preceding initiation of the standby mode.

10. The lighting control module of claim 8, wherein, upon initiation of the standby mode, the microcontroller is configured to save current state settings and disable all peripherals except the one or more sensors.

11. The lighting control module of claim 8, wherein the microcontroller is configured to disrupt the standby mode when the microcontroller detects a low battery condition during the standby mode.

12. The lighting control module of claim 11, where the microcontroller is configured to initiate a dim lock mode upon disruption of the standby mode when the standby mode is disrupted due to detection of the low battery condition.

13. The lighting control module of claim 1, wherein the microcontroller is configured to compare the data received from the one or more sensors to threshold values stored in the microcontroller,
    wherein the microcontroller is configured to adjust the first mode and the intensity of the one or more light sources only when the threshold values are met or exceeded.

14. The lighting control module of claim 1, wherein the one or more sensors are pre-programmed with one or more threshold values for motion detection,
    wherein the one or more sensors are configured to transmit motion data to the microcontroller only when the one or more threshold values are met or exceeded.

15. The lighting control module of claim 1, wherein the microcontroller includes logic pre-programmed to detect an occurrence of one or more gestures based on a motion detected by the one or more sensors,
    wherein the microcontroller is configured to initiate a lighting device output mode upon the occurrence of the one or more gestures.

16. The lighting control module of claim 15, wherein the one or more gestures comprise at least one of a bump gesture, a twist gesture, a twist-and-return gesture, and a whip gesture of the multipurpose lighting device.

17. The lighting control module of claim 1, further comprising a voltage detection module,
    wherein the microcontroller is configured to compare real-time battery voltage information received from the voltage detection module to battery threshold values stored in the microcontroller to determine an adjustment of a current mode of operation.

18. The lighting control module of claim 17, wherein the microcontroller is configured to automatically adjust power consumption of the multipurpose lighting device based on remaining battery life measured by the microcontroller.

19. The lighting control module of claim 17, wherein the microcontroller is configured to initiate a dim mode when a low battery condition is detected.

20. The lighting control module of claim 1, further comprising:
    one or more connections configured to communicate with a directional light source; and the one or more connections are configured to communicate with an area light source.

\* \* \* \* \*